US012553991B2

(12) United States Patent
Won et al.

(10) Patent No.: US 12,553,991 B2
(45) Date of Patent: Feb. 17, 2026

(54) LIDAR DEVICE

(71) Applicant: SOS LAB Co., Ltd., Gwangju (KR)

(72) Inventors: Bum Sik Won, Seoul (KR); Jong Kyu Jung, Yongin-si (KR); Sung Ui Hwang, Jeollanam-do (KR); Dong Kyu Kim, Gwangju (KR); Ji Seong Jeong, Gwangju (KR); Jun Hwan Jang, Seongnam-si (KR)

(73) Assignee: SOS LAB Co., Ltd., Gwangju (KR)

(*) Notice: Subject to any disclaimer, the term of this patent is extended or adjusted under 35 U.S.C. 154(b) by 1021 days.

(21) Appl. No.: 17/686,996

(22) Filed: Mar. 4, 2022

(65) Prior Publication Data

US 2022/0260688 A1 Aug. 18, 2022

Related U.S. Application Data

(63) Continuation of application No. PCT/KR2020/011860, filed on Sep. 3, 2020.

(60) Provisional application No. 62/896,462, filed on Sep. 5, 2019.

(51) Int. Cl.
G01S 7/481 (2006.01)
G01S 17/08 (2006.01)
G02B 26/12 (2006.01)

(52) U.S. Cl.
CPC ............ G01S 7/4817 (2013.01); G01S 7/4811 (2013.01); G01S 7/4815 (2013.01); G01S 17/08 (2013.01); G02B 26/124 (2013.01)

(58) Field of Classification Search
CPC ....... G01S 7/4817; G01S 7/4815; G01S 17/08
USPC .......................................................... 356/4
See application file for complete search history.

(56) References Cited

U.S. PATENT DOCUMENTS

| 3,944,323 | A  | 3/1976  | Starkweather    |
| 5,006,721 | A  | 4/1991  | Cameron et al.  |
| 5,268,565 | A  | 12/1993 | Katoh et al.    |
| 5,493,388 | A  | 2/1996  | Adachi          |
| 6,104,524 | A  | 8/2000  | Hisano et al.   |
| 6,304,321 | B1 | 10/2001 | Wangler et al.  |
| 6,317,202 | B1 | 11/2001 | Hosokawa et al. |

(Continued)

FOREIGN PATENT DOCUMENTS

| CN | 101071285 A | 11/2007 |
| CN | 102736075 A | 10/2012 |

(Continued)

OTHER PUBLICATIONS

U.S. Notice of Allowance, re U.S. Appl. No. 16/240,512, dated Dec. 11, 2023.

(Continued)

*Primary Examiner* — Robert W Hodge
*Assistant Examiner* — Kara Richter
(74) *Attorney, Agent, or Firm* — Knobbe, Martens, Olson & Bear, LLP

(57) ABSTRACT

The present invention is related to a Light Detecting And Ranging (LiDAR) device configured to measure a distance using a laser, the LiDAR device including: a first laser emitting unit configured to output a first laser; a second laser emitting unit configured to output a second laser; a scanning unit configured to form a first field of view (FOV) using the first laser and a second FOV using the second laser; and a detecting unit configured to measure a distance to an object using the first and second lasers.

10 Claims, 31 Drawing Sheets

(56) References Cited

U.S. PATENT DOCUMENTS

| | | |
|---|---|---|
| 7,235,778 B2 | 6/2007 | Asai |
| 8,619,237 B2 | 12/2013 | Hillman et al. |
| 10,133,144 B2 | 11/2018 | Inada et al. |
| 10,261,389 B2 | 4/2019 | Skirlo et al. |
| 10,324,170 B1 | 6/2019 | Engberge, Jr. et al. |
| 10,408,416 B2 | 9/2019 | Khorasaninejad et al. |
| 10,422,990 B2 | 9/2019 | Inada et al. |
| 10,557,924 B1 | 2/2020 | Jang et al. |
| 10,578,721 B2 | 3/2020 | Jang et al. |
| 10,591,598 B2 | 3/2020 | Jeong et al. |
| 10,613,224 B2 | 4/2020 | Jeong et al. |
| 10,705,190 B2 | 7/2020 | Jang et al. |
| 11,493,630 B2 | 11/2022 | Jeong et al. |
| 11,808,889 B2 | 11/2023 | Jenog et al. |
| 11,953,596 B2 | 4/2024 | Jeong et al. |
| 11,953,626 B2 | 4/2024 | Jeong et al. |
| 2003/0043364 A1 | 3/2003 | Jamieson et al. |
| 2004/0036630 A1 | 2/2004 | Jamieson et al. |
| 2005/0173770 A1 | 8/2005 | Linden et al. |
| 2005/0179976 A1 | 8/2005 | Davis et al. |
| 2005/0219504 A1 | 10/2005 | Adachi et al. |
| 2005/0280879 A1 | 12/2005 | Gibson et al. |
| 2006/0169880 A1 | 8/2006 | Asai |
| 2007/0023621 A1 | 2/2007 | Blick et al. |
| 2007/0071056 A1 | 3/2007 | Chen |
| 2007/0266574 A1 | 11/2007 | Ikeuchi et al. |
| 2008/0174845 A1 | 7/2008 | Shikii et al. |
| 2009/0004151 A1 | 1/2009 | Abediasl |
| 2009/0073417 A1 | 3/2009 | Urata et al. |
| 2009/0321633 A1 | 12/2009 | Blick et al. |
| 2010/0002278 A1 | 1/2010 | Maeno et al. |
| 2011/0204327 A1 | 8/2011 | Hiruma et al. |
| 2011/0248880 A1 | 10/2011 | Miyahara et al. |
| 2012/0140240 A1 | 6/2012 | Hillman et al. |
| 2012/0273662 A1 | 11/2012 | Caldwell et al. |
| 2013/0313517 A1 | 11/2013 | Choi |
| 2014/0009747 A1* | 1/2014 | Suzuki ................. G01S 7/4817 356/4.01 |
| 2014/0078514 A1 | 3/2014 | Zhu |
| 2014/0224989 A1 | 8/2014 | Long et al. |
| 2014/0233599 A1 | 8/2014 | Park et al. |
| 2014/0286367 A1 | 9/2014 | Scofiled et al. |
| 2015/0131080 A1 | 5/2015 | Retterath et al. |
| 2015/0219764 A1 | 8/2015 | Lipson |
| 2015/0293225 A1 | 10/2015 | Riley et al. |
| 2015/0346340 A1 | 12/2015 | Yaacobi et al. |
| 2016/0047896 A1* | 2/2016 | Dussan ................. G01S 17/89 356/4.01 |
| 2016/0266242 A1 | 9/2016 | Gilliland et al. |
| 2016/0341399 A1 | 11/2016 | Raz et al. |
| 2017/0082263 A1 | 3/2017 | Byrnes et al. |
| 2017/0153528 A1 | 6/2017 | Kim et al. |
| 2017/0184705 A1 | 6/2017 | Fujii et al. |
| 2017/0235126 A1 | 8/2017 | DiDomenico |
| 2017/0242103 A1 | 8/2017 | Dussan |
| 2017/0287151 A1 | 10/2017 | Han et al. |
| 2017/0358204 A1 | 12/2017 | Modica et al. |
| 2018/0039102 A1 | 2/2018 | Baik et al. |
| 2018/0045953 A1 | 2/2018 | Fan et al. |
| 2018/0059221 A1 | 3/2018 | Slobodyanyuk et al. |
| 2018/0059408 A1 | 3/2018 | Murayama |
| 2018/0062341 A1 | 3/2018 | Kim et al. |
| 2018/0062345 A1* | 3/2018 | Bills ................. G01S 7/4815 |
| 2018/0107157 A1 | 4/2018 | Park et al. |
| 2018/0113200 A1 | 4/2018 | Steinberg et al. |
| 2018/0120434 A1 | 5/2018 | Jeong et al. |
| 2018/0129866 A1 | 5/2018 | Hicks et al. |
| 2018/0216797 A1 | 8/2018 | Khorasaninejad et al. |
| 2018/0224574 A1 | 8/2018 | Lee et al. |
| 2018/0252857 A1 | 9/2018 | Glik et al. |
| 2018/0284237 A1 | 10/2018 | Campbell et al. |
| 2018/0301875 A1 | 10/2018 | Burroughs et al. |
| 2018/0332677 A1 | 11/2018 | Ku et al. |
| 2018/0351092 A1 | 12/2018 | Giessen et al. |
| 2019/0004151 A1 | 1/2019 | Abediasl |
| 2019/0011556 A1 | 1/2019 | Pacala et al. |
| 2019/0025409 A1 | 1/2019 | Kawazoe et al. |
| 2019/0025509 A1 | 1/2019 | Kim et al. |
| 2019/0041500 A1 | 2/2019 | Isono |
| 2019/0107623 A1* | 4/2019 | Campbell ............. G01S 7/4865 |
| 2019/0137075 A1 | 5/2019 | Aieta et al. |
| 2019/0154816 A1 | 5/2019 | Hughes et al. |
| 2019/0154877 A1 | 5/2019 | Capasso et al. |
| 2019/0183635 A1 | 6/2019 | Macinnis |
| 2019/0196068 A1 | 6/2019 | Tsai et al. |
| 2019/0204423 A1 | 7/2019 | O'Keeffe |
| 2019/0212419 A1 | 7/2019 | Jeong et al. |
| 2019/0235060 A1 | 8/2019 | Iwasawa et al. |
| 2019/0243208 A1 | 8/2019 | Peng et al. |
| 2019/0256995 A1 | 8/2019 | Leach et al. |
| 2019/0271769 A1 | 9/2019 | Raly et al. |
| 2019/0293765 A1 | 9/2019 | Jeong et al. |
| 2019/0302022 A1 | 10/2019 | Sun et al. |
| 2019/0302325 A1 | 10/2019 | Sorbel et al. |
| 2019/0310351 A1* | 10/2019 | Hughes ................ G02B 26/101 |
| 2019/0317011 A1 | 10/2019 | Hu |
| 2020/0284880 A1* | 9/2020 | Bartlett ................ G01S 7/4817 |
| 2020/0319316 A1 | 10/2020 | Jang et al. |
| 2020/0379090 A1* | 12/2020 | Nothern, III .......... G01S 7/4815 |
| 2022/0146644 A1* | 5/2022 | Butler ................ G02B 26/101 |
| 2023/0045515 A1 | 2/2023 | Jeong et al. |
| 2024/0125903 A1* | 4/2024 | Nguyen ................ H01S 5/0207 |

FOREIGN PATENT DOCUMENTS

| | | |
|---|---|---|
| CN | 103403577 A | 11/2013 |
| CN | 107085298 A | 8/2017 |
| CN | 107272212 A | 10/2017 |
| JP | H01-133017 A | 5/1989 |
| JP | H01-262520 A | 10/1989 |
| JP | H03-002512 A | 1/1991 |
| JP | H06-078924 B2 | 10/1994 |
| JP | H07-72239 A | 3/1995 |
| JP | H08-184673 A | 7/1996 |
| JP | H09-274076 A | 10/1997 |
| JP | H11-006973 A | 1/1999 |
| JP | H11-072517 A | 3/1999 |
| JP | 2000-009422 A | 1/2000 |
| JP | 2003-121546 A | 4/2003 |
| JP | 2004-317134 A | 11/2004 |
| JP | 2005-024894 A | 1/2005 |
| JP | 2005-107070 A | 4/2005 |
| JP | 2005-227219 A | 8/2005 |
| JP | 2007-088601 A | 4/2007 |
| JP | 2007-525025 A | 8/2007 |
| JP | 4023426 B2 | 12/2007 |
| JP | 2008-033135 A | 2/2008 |
| JP | 2008-298520 A | 12/2008 |
| JP | 2009-033656 A | 2/2009 |
| JP | 2009-098111 A | 5/2009 |
| JP | 2010-014680 A | 1/2010 |
| JP | 2010-038859 A | 2/2010 |
| JP | 2010-060309 A | 3/2010 |
| JP | 2010-071725 A | 4/2010 |
| JP | 2011-160433 A | 8/2011 |
| JP | 2011-203122 A | 10/2011 |
| JP | 2011-257193 A | 12/2011 |
| JP | 2011-257221 A | 12/2011 |
| JP | 2012-117996 A | 6/2012 |
| JP | 2014-006110 A | 1/2014 |
| JP | 2014-020889 A | 2/2014 |
| JP | 2014032149 A | 2/2014 |
| JP | 2014-071029 A | 4/2014 |
| JP | 2014-071038 A | 4/2014 |
| JP | 2014-115182 A | 6/2014 |
| JP | 2014-161899 A | 9/2014 |
| JP | 2014-235075 A | 12/2014 |
| JP | 2015-178975 A | 10/2015 |
| JP | 2016-033482 A | 3/2016 |
| JP | 2016-035411 A | 3/2016 |
| JP | 6090433 B2 | 3/2017 |
| JP | 2017-090144 A | 5/2017 |
| JP | 2017150990 A | 8/2017 |
| JP | 2017-198845 A | 11/2017 |

(56) References Cited

FOREIGN PATENT DOCUMENTS

| | | |
|---|---|---|
| JP | 2018-005183 A | 1/2018 |
| KR | 0136171 B1 | 1/1998 |
| KR | 1998-050810 U | 10/1998 |
| KR | 2001-0081616 A | 8/2001 |
| KR | 2001-0090649 A | 10/2001 |
| KR | 10-2004-0091500 A | 10/2004 |
| KR | 10-2006-0080359 A | 7/2006 |
| KR | 10-2009-0092609 A | 9/2009 |
| KR | 10-2011-0061787 A | 6/2011 |
| KR | 10-2011-0075755 A | 7/2011 |
| KR | 10-2011-0131789 A | 12/2011 |
| KR | 10-2012-0001321 A | 1/2012 |
| KR | 10-2013-0010956 A | 1/2012 |
| KR | 10-2012-0096941 A | 8/2012 |
| KR | 10-2014-0025041 A | 3/2014 |
| KR | 10-2015-0004743 A | 1/2015 |
| KR | 10-2016-0096454 A | 8/2016 |
| KR | 10-1687994 B1 | 12/2016 |
| KR | 10-2017-0063196 A | 6/2017 |
| KR | 10-2017-0069702 A | 6/2017 |
| KR | 10-2017-0071181 A | 6/2017 |
| KR | 10-2017-0104879 A | 9/2017 |
| KR | 10-2017-0114242 A | 10/2017 |
| KR | 10-2017-0135415 A | 12/2017 |
| KR | 10-2018-0008655 A | 1/2018 |
| KR | 10-2018-0011453 A | 2/2018 |
| KR | 10-2018-0013598 A | 2/2018 |
| KR | 10-2018-0015489 A | 2/2018 |
| KR | 10-2018-0029585 A | 3/2018 |
| KR | 10-2018-0032709 A | 4/2018 |
| KR | 10-2018-0046081 A | 5/2018 |
| KR | 10-2018-0051225 A | 5/2018 |
| KR | 10-1887477 B1 | 8/2018 |
| KR | 10-2019-0011497 A | 2/2019 |
| KR | 10-1947404 B1 | 2/2019 |
| KR | 10-1979374 B1 | 5/2019 |
| KR | 10-2009025 B1 | 8/2019 |
| KR | 10-2019-0130495 A | 11/2019 |
| WO | WO 2016/168173 A1 | 10/2016 |
| WO | WO 2017/143217 A1 | 8/2017 |
| WO | WO 2017/168500 A1 | 10/2017 |

OTHER PUBLICATIONS

U.S. Final Office Action, re U.S. Appl. No. 16/884,748, dated Feb. 8, 2024.

U.S. Notice of Allowance, U.S. Appl. No. 17/949,443, dated Nov. 21, 2023, in 12 pages.

Zhou, "Efficient Silicon Metasurfaces for Visable Light," ACS Photonics, 2017, 4, 544-551.

U.S. Notice of Allowance re U.S. Appl. No. 16/884,748, dated Jun. 27, 2024.

Decker, et al., "High-Efficiency Dielectric Huygens' Surfaces," Advanced Optical Materials, 3: 813-820 (2015).

Monticone, et al., "Full Control of Nanoscale Optical Transmission with a Composite Metascreen," Phys. Rev. Lett. 110, 203903 (2013), (Year: 2013).

Pfeiffer, et al., "Efficient Light Bending with Isotropic Metamaterial Huygens' Surfaces," Nano. Lett. 2014, 14, 5, 2491-2497 (2014).

PCT International Search Report and Written Opinion, PCT Application No. PCT/KR2020/011860, Dec. 18, 2020, 17 pages.

Chinese Office Action, re CN Application No. 20180090950.4, dated Sep. 1, 2023.

Chinese Office Action, re CN Application No. 201811224331.8, dated Oct. 9, 2022.

Chinese Office Action, re CN Application No. 201910130712.8, dated Nov. 2, 2022.

Chinese Notice of Allowance, re CN Application No. CN 201910130712.8, dated Jun. 30, 2023.

Chinese Office Action, re CN Application No. 201910167782.0, dated Nov. 16, 2022.

European Extended Search Report and Written Opinion, re EP Application No. 18898056.9, dated Sep. 10, 2021, 8 pages.

International Search Report and Written Opinion, re PCT Application No. PCT/KR2018/014921, dated Mar. 6, 2019, 22 pages.

International Search Report and Written Opinion, re PCT Application No. PCT/KR2018/014923, dated Mar. 6, 2019, 19 pages.

International Search Report and Written Opinion, re PCT Application No. PCT/KR2019/010954, dated Dec. 19, 2019, 14 pages.

Korean Notice of Allowance, KR Application No. 10-2018-0002494, dated Nov. 22, 2019, 4 pages.

Korean Notification of Reason for Refusal, KR Application No. 10-2018-0002494, dated Jun. 2, 2019, 9 pages.

Korean Notification of Reason for Refusal, KR Application No. 10-2018-0026560, dated Nov. 19, 2019, 11 pages.

Korean Notice of Final Rejection, KR Application No. 10-2018-0026560, dated Apr. 20, 2020, 7 pages.

Korean Notice of Allowance, KR Application No. 10-2018-0026560, dated Nov. 23, 2020, 4 pages.

Korean Notification of Reason for Refusal, KR Application No. 10-2018-0027385, dated Jul. 7, 2019, 6 pages.

Korean Notification of Reason for Refusal, KR Application No. 10-2018-0027385, dated Dec. 22, 2019, 11 pages.

Korean Notice of Allowance, KR Application No. 10-2018-0027385, dated Aug. 4, 2020, 5 pages.

Korean Office Action, KR Application No. 10-2018-0081896, dated Dec. 14, 2018, 5 pages.

Korean Office Action, KR Application No. 10-2018-0081897, dated Nov. 1, 2018, 11 pages.

Korean Notice of Allowance, KR Application No. 10-2018-0081897, dated Feb. 1, 2019, 5 pages.

Korean Office Action, KR Application No. 10-2018-0081898, dated Dec. 18, 2018, 5 pages.

Korean Notice of Allowance, KR Application No. 10-2018-0081898, dated Apr. 16, 2019, 4 pages.

Korean Office Action, KR Application No. 10-2018-0095385, dated Nov. 26, 2018, 6 pages.

Korean Notice of Allowance, KR Application No. 10-2018-0095385, dated Mar. 26, 2019, 5 pages.

Korean Notice of Allowance, KR Application No. 10-2018-0095385, dated May 30, 2019, 2 pages.

Korean Notice of Allowance, KR Application No. 10-2018-0099340, dated Jan. 1, 2019, 7 pages.

Korean Office Action, KR Application No. 10-2018-0100701, dated Nov. 26, 2018, 6 pages.

Korean Notice of Allowance, KR Application No. 10-2018-0100701, dated Mar. 29, 2019, 3 pages.

Korean Notice of Allowance, KR Application No. 10-2018-0120184, dated Nov. 21, 2018, 6 pages.

Korean Office Action, KR Application No. 10-2018-0126278, dated Dec. 19, 2018, 6 pages.

Korean Notice of Allowance, KR Application No. 10-2018-0126278, dated Feb. 28, 2019.

Korean Office Action, KR Application No. 10-2018-014972, date Feb. 7, 2019, 11 pages.

Korean Notice of Allowance, KR Application No. 10-2018-0143973, dated Jul. 31, 2019, 2 pages.

Korean Office Action, KR Application No. 10-2018-0143974, dated Jan. 30, 2019, 9 pages.

Korean Office Action, KR Application No. 10-2018-0143975, dated Sep. 23, 2019, 11 pages.

Korean Notice of Allowance, KR Application No. 10-2018-0143975, dated Aug. 4, 2020, 2 pages.

Korean Notification of Reason for Refusal, KR Application No. 10-2019-0017433, dated May 7, 2020, 12 pages.

Korean Notice of Allowance, KR Application No. 10-2020-0112473, dated Apr. 20, 2021.

Korean Notice of Allowance, KR Application No. 10-2020-0146383, dated May 25, 2022.

U.S. Office Action, U.S. Appl. No. 16/140,272, dated Apr. 8, 2019, 9 pages.

U.S. Office Action, re U.S. Appl. No. 16/240,512, dated Jan. 13, 2022, 22 pages.

U.S. Office Action, re U.S. Appl. No. 16/240,512, dated Aug. 10, 2023.

(56) References Cited

OTHER PUBLICATIONS

U.S. Final Office Action, re U.S. Appl. No. 16/240,512, dated Aug. 12, 2022.
U.S. Office Action, U.S. Appl. No. 16/291,813, dated Oct. 31, 2019, 16 pages.
U.S. Office Action, U.S. Appl. No. 16/455,645, dated Oct. 9, 2019, 9 pages.
U.S. Office Action, U.S. Appl. No. 16/709,729, dated Mar. 3, 2023.
U.S. Notice of Allowance, U.S. Appl. No. 16/709,729, dated Aug. 17, 2023.
U.S. Office Action, re U.S. Appl. No. 16/884,748, dated Aug. 23, 2023.
U.S. Office Action, U.S. Appl. No. 17/949,443, dated Jan. 12, 2023, 20 pages.
U.S. Office Action, U.S. Appl. No. 17/949,443, dated Jul. 19, 2023 in 11 pages.
Yilmaz, et al., "Tunable Metasurfaces With Liquid Crystals," SPIE Photonics Europe, Proceedings vol. 10671, Metamaterials XI: 106712N (2018) (Year: 2018).

\* cited by examiner

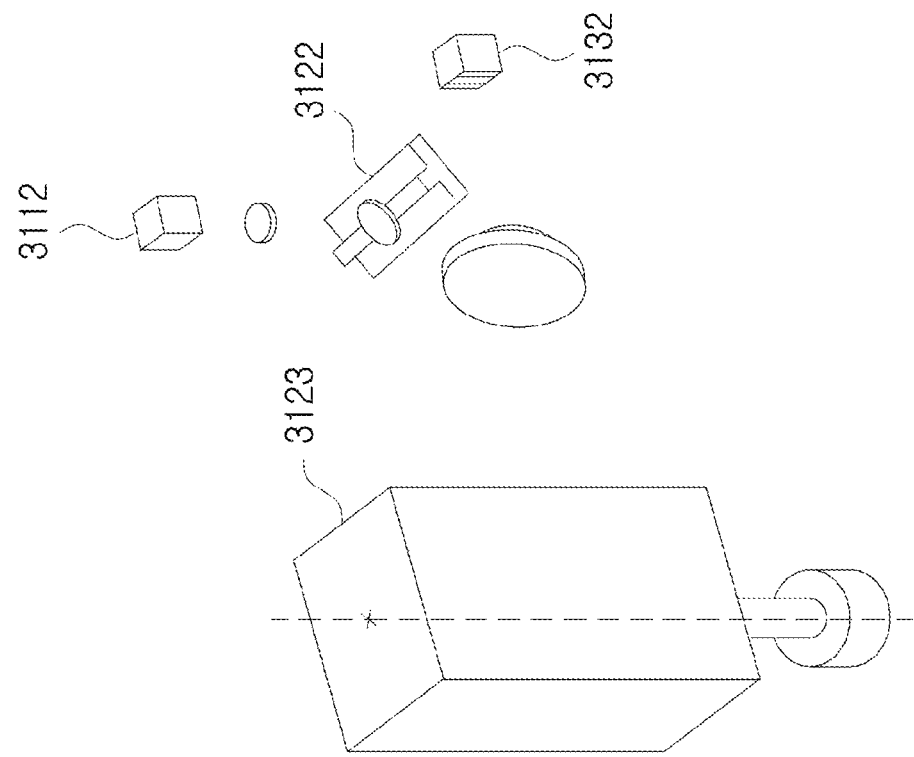
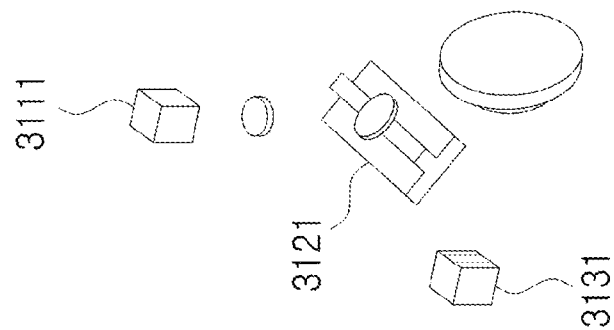
FIG. 21

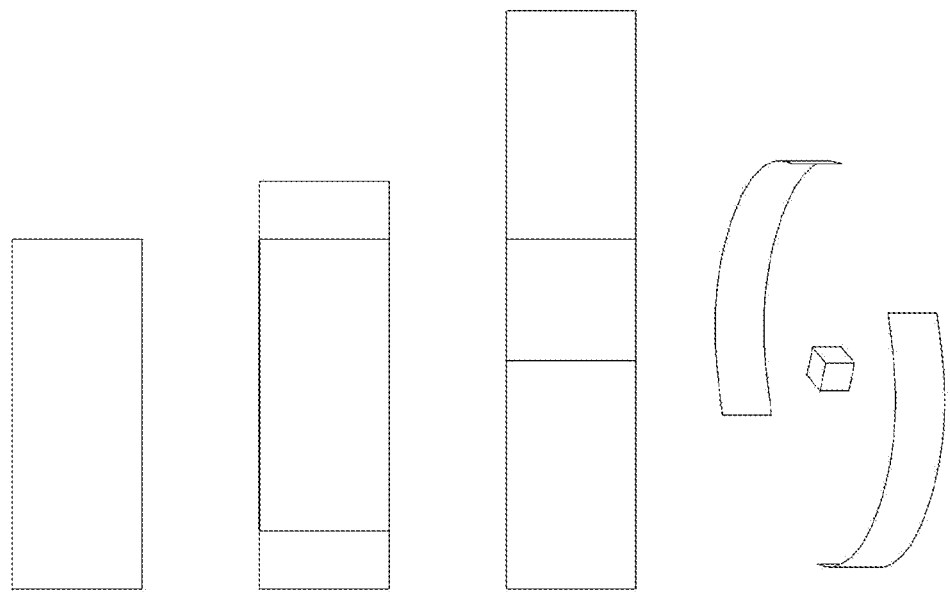
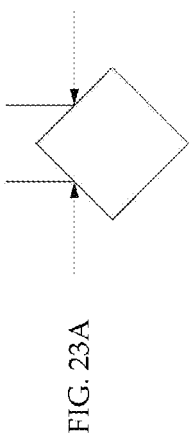
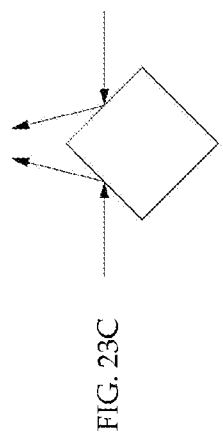
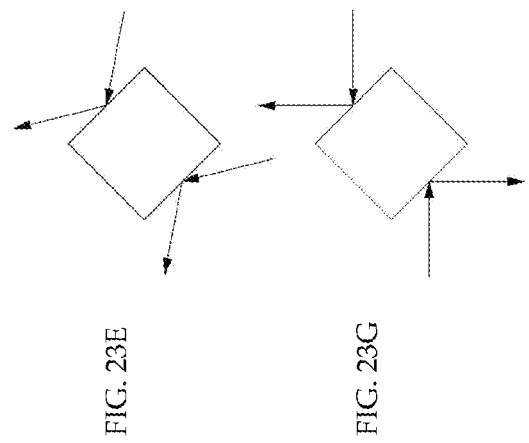

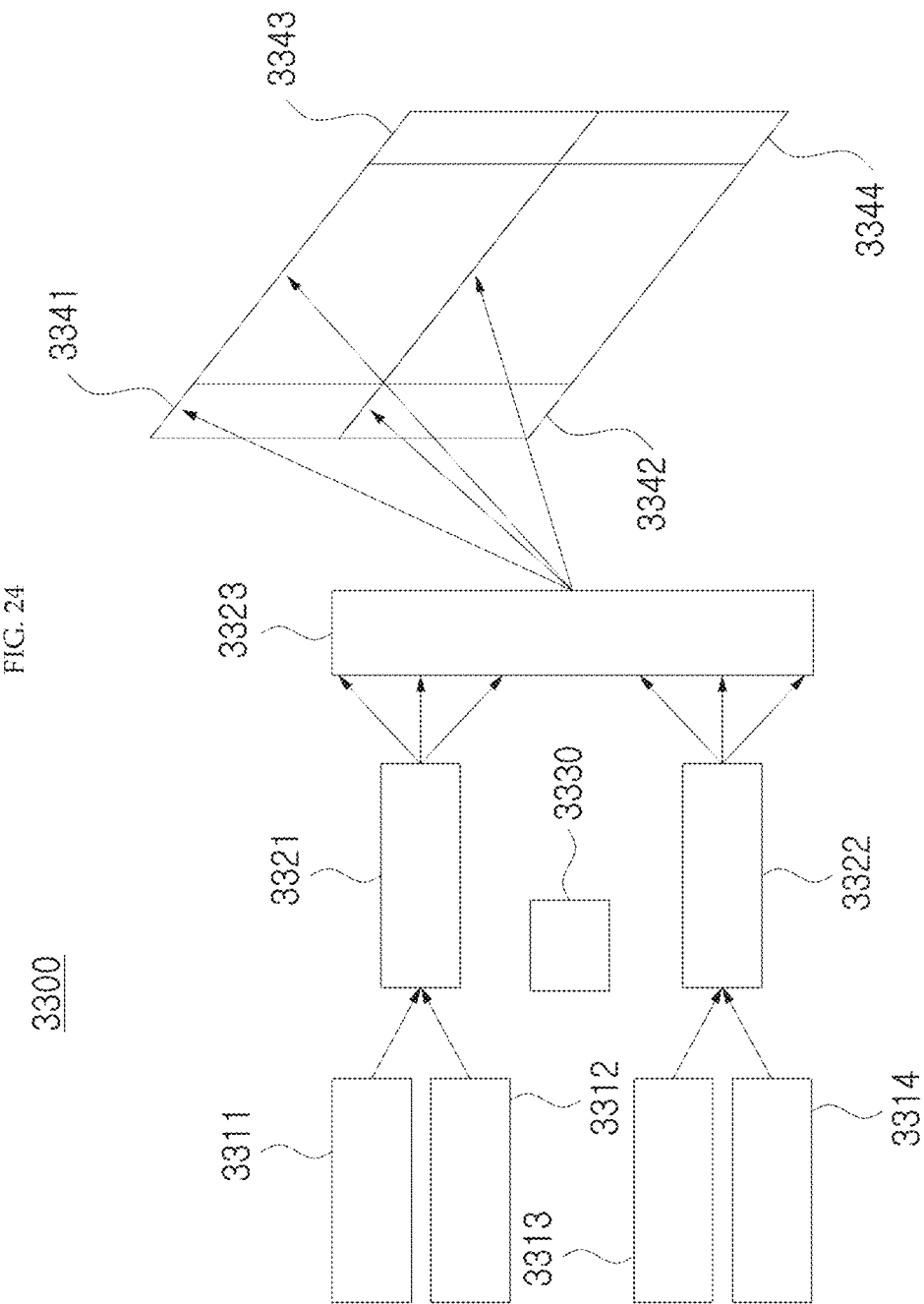

FIG. 31
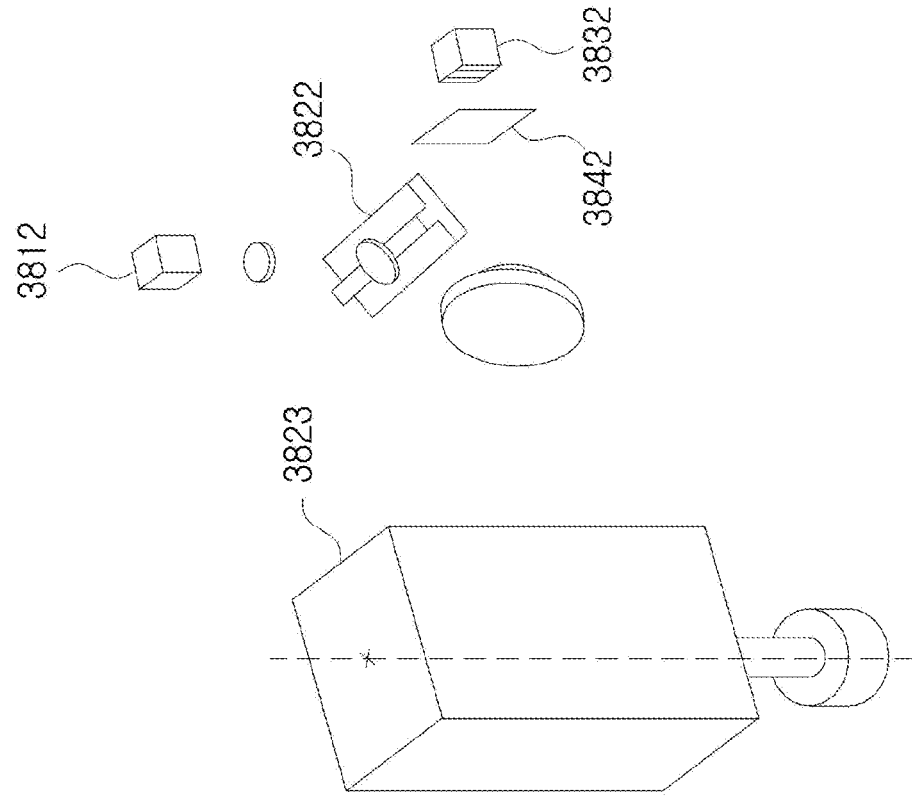
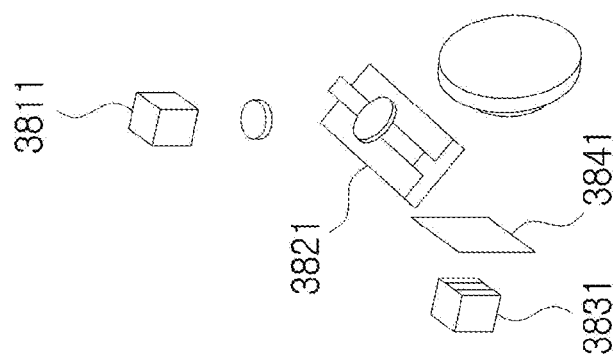

LIDAR DEVICE

CROSS-REFERENCE TO RELATED APPLICATIONS

This application is a bypass continuation application of International PCT Application No. PCT/KR2020/011860 filed on Sep. 3, 2020, which claims priority to U.S. Provisional Application No. 62/896,462 filed on Sep. 5, 2019, which are incorporated by reference herein in their entirety.

TECHNICAL FIELD

The present disclosure relates to a LiDAR device configured to obtain distance information of an object using a laser. More particularly, the present disclosure relates to a LiDAR device configured to radiate out a laser toward a scan area and detect a laser reflected from an object existing on the scan area to obtain distance information.

BACKGROUND

A Light Detecting And Ranging (LiDAR) device is a device that detects a distance to an object using laser. In addition, the LiDAR device is a device capable of obtaining location information about objects that exist in the vicinity by generating a point cloud using laser. In addition, research on weather observation, 3D mapping, autonomous vehicles, autonomous drones, unmanned robot detecting units, and the like using LiDAR devices is being actively conducted.

A conventional LiDAR device has expanded a scan area by mechanically rotating the LiDAR device itself or using a diffusion lens. However, when the LiDAR device itself is mechanically rotated, there are thermal problems occurring by a lot of lasers or in stability, durability, and the like according to mechanical rotation. In addition, when the LiDAR device expands the scan area using the diffusion lens, there is a problem in that a measurement distance is reduced due to diffusion of the laser.

Recently, in order to solve such a problem, research to minimize the mechanical rotation of the LiDAR device itself or to expand the scan area with a stable mechanical scan and to improve the performance of the LiDAR device is ongoing.

SUMMARY

According to an embodiment, A LiDAR (Light Detection And Ranging) device for measuring a distance using a laser, comprising: a first laser emitting unit configured to emit a first laser, a second laser emitting unit configured to emit a second laser, a scanning unit configured to form a first FOV (Field of View) using the first laser and form a second FOV (Field of View) using the second laser, a detecting unit for measuring a distance between an object using the first laser and the second laser, wherein the scanning unit includes a first scanning unit configured to form a first vertical FOV using the first laser and form a second vertical FOV using the second laser and a second scanning unit configured to form a first horizontal FOV using the first laser and form a second horizontal FOV using the second laser, wherein the first scanning unit and the second scanning unit are arranged such that a size of the first horizontal FOV is greater than a size of the first vertical FOV, and a size of the second horizontal FOV is greater than a size of the second vertical FOV, wherein an angle between the first laser and the second laser irradiated to the first scanning unit is designed such that a distance between a center of the first vertical FOV and a center of the second vertical FOV is greater than a distance between a center of the first horizontal FOV and a center of the second horizontal FOV.

According to another embodiment, A LiDAR (Light Detection And Ranging) device for measuring a distance using a laser, comprising: a laser emitting unit configured to emit at least two of lasers, a scanning unit configured to form a first FOV (Field of View) and a second FOV (Field of View) using the at least two of lasers, a detecting unit for measuring a distance between an object using the at least two of lasers, wherein the scanning unit is arranged such that a size of the first FOV and the second FOV is the same and a scan pattern in the first FOV and a scan pattern in the second FOV is the same, wherein an angle between the at least two of lasers irradiated to the scanning unit is designed such that at the same distance from the LiDAR device, a distance between a center of the first FOV and a center of the second FOV in a first direction is greater than a distance between the center of the first FOV and the center of the second FOV in a second direction perpendicular to the first direction.

According to still another embodiment, A LiDAR (Light Detection And Ranging) device for measuring a distance using a laser, comprising: a first laser emitting unit configured to emit a first laser, a second laser emitting unit configured to emit a second laser, a first scanning unit configured to form a first vertical FOV (Field of view) using the first laser and a second vertical FOV (Field of view) using the second laser and a second scanning unit configured to form a first horizontal FOV using the first laser and a second horizontal FOV using the second laser, wherein an angle between the first laser and the second laser irradiated to the first scanning unit is designed such that an angle formed by a center of the first vertical FOV, a center of the second vertical FOV and the LiDAR device is to be at least a size of the first vertical FOV or a size of the second vertical FOV.

The technical solution of the present disclosure is not limited to the above-described solutions, and solutions not mentioned will be clearly understood by those of ordinary skill in the art to which the present disclosure belongs from the present specification and the accompanying drawings.

As described above, according to the present disclosure, a Light Detecting and Ranging (LiDAR) device including a plurality of lasers emitting devices can be provided.

According to the present disclosure, the LiDAR device forming a plurality of Field of Views (FOVs) can be provided.

According to the present disclosure, the LiDAR device having extended FOVs can be provided.

The advantageous effects of the present disclosure are not limited to the above-described effects, and effects not mentioned will be clearly understood by those of ordinary skill in the art to which the present disclosure belongs from the present specification and accompanying drawings.

BRIEF DESCRIPTION OF DRAWINGS

FIG. 21 is a view describing a LiDAR device according to an embodiment.

FIGS. 23A to 23H is a view describing arrangements and FOVs of a LiDAR device according to an embodiment.

FIG. 24 is a view describing a LiDAR device according to an embodiment.

FIG. 31 is a view describing a LiDAR device according to an embodiment.

DETAILED DESCRIPTION

Figure 1:
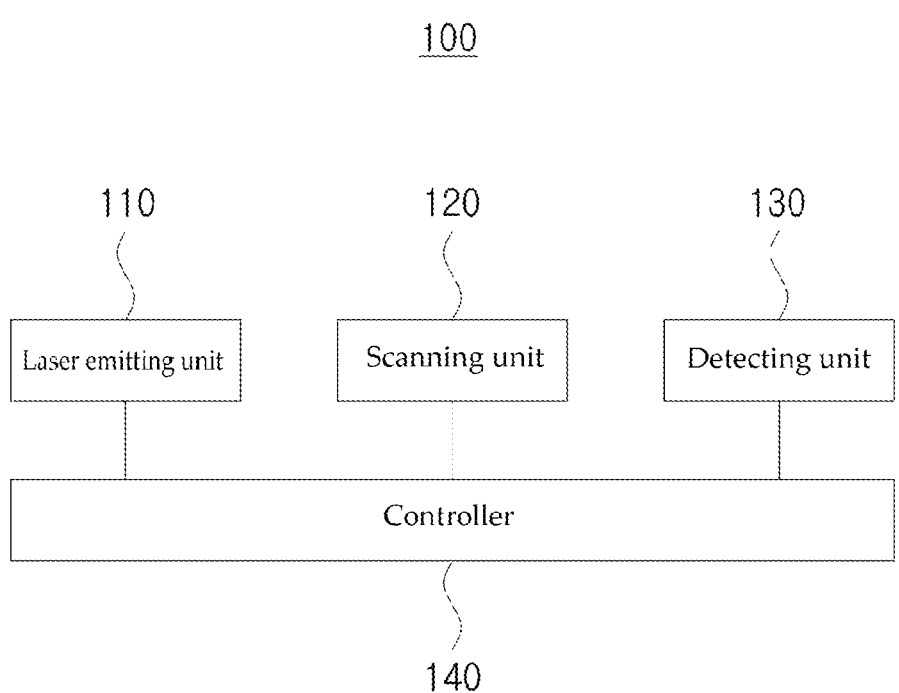
FIG. 1 is a view illustrating a Light Detecting And Ranging (LiDAR) device according to an embodiment.

Embodiments described herein are for clearly explaining the spirit of the present disclosure to those of ordinary skill in the art to which the present disclosure pertains, so the present disclosure is not limited to the embodiments described herein, and a scope should be construed to include modifications or variations that do not depart from the spirit of the present disclosure.

Terms used in the present specification have been selected as widely used general terms as possible in consideration of the functions in the present disclosure, but such terms may vary depending on the intention, precedent, or emergence of new technology of those of ordinary skill in the art to which the present disclosure belongs. However, when a specific term is defined and used in an arbitrary sense, the meaning of the term will be separately described. Therefore, the terms used in the present specification should be interpreted on the basis of the actual meaning of the terms and the contents of the entire specification, rather than the names of simple terms.

The drawings attached to the present specification are for easily explaining the present disclosure, and the shapes described in the drawings may be exaggerated as necessary to help understand the present disclosure, so the present disclosure is not limited by the drawings.

In the present specification, when it is determined that a detailed description of a known configuration or function related to the present disclosure may obfuscate the gist of the present disclosure, a detailed description thereof will be omitted if necessary.

The present invention is directed to providing a Light Detecting And Ranging (LiDAR) device including a plurality of lasers emitting devices.

The present invention is also directed to providing a LiDAR device forming a plurality of Field of Views (FOVs).

The present invention is also directed to providing a LiDAR device having extended FOVs.

According to an embodiment, A LiDAR (Light Detection And Ranging) device for measuring a distance using a laser, comprising: a first laser emitting unit configured to emit a first laser, a second laser emitting unit configured to emit a second laser, a scanning unit configured to form a first FOV (Field of View) using the first laser and form a second FOV (Field of View) using the second laser, a detecting unit for measuring a distance between an object using the first laser and the second laser, wherein the scanning unit includes a first scanning unit configured to form a first vertical FOV using the first laser and form a second vertical FOV using the second laser and a second scanning unit configured to form a first horizontal FOV using the first laser and form a second horizontal FOV using the second laser, wherein the first scanning unit and the second scanning unit are arranged such that a size of the first horizontal FOV is greater than a size of the first vertical FOV, and a size of the second horizontal FOV is greater than a size of the second vertical FOV, wherein an angle between the first laser and the second laser irradiated to the first scanning unit is designed such that a distance between a center of the first vertical FOV and a center of the second vertical FOV is greater than a distance between a center of the first horizontal FOV and a center of the second horizontal FOV.

Here, the scanning unit is arranged such that a size of the first FOV is same as a size of the second FOV.

Here, the scanning unit is arranged such that an angle formed by the first laser irradiated to the first FOV and the second laser irradiated to the second FOV at the same time and the LiDAR device is constant over time.

Here, the first scanning unit includes a nodding mirror configured to rotate in preset angle range, wherein the second scanning unit includes a rotating polygon mirror configured to rotate with respect to a rotation axis, wherein the nodding mirror is repeatedly driven in an angle range "a" wherein when the angle between the first laser and the second laser irradiated to the first scanning unit is "b", the "b" is designed to be at least "2a".

Here, the "b" is designed to be at least "2a" or more so that there is no overlapping point between the first FOV and the second FOV.

Here, the "b" is designed to be at least "2a" or less so that the first FOV and the second FOV overlap at least partially.

According to another embodiment, A LiDAR (Light Detection And Ranging) device for measuring a distance using a laser, comprising: a laser emitting unit configured to emit at least two of lasers, a scanning unit configured to form a first FOV (Field of View) and a second FOV (Field of View) using the at least two of lasers, a detecting unit for measuring a distance between an object using the at least two of lasers, wherein the scanning unit is arranged such that a size of the first FOV and the second FOV is the same and a scan pattern in the first FOV and a scan pattern in the second FOV is the same, wherein an angle between the at least two of lasers irradiated to the scanning unit is designed such that at the same distance from the LiDAR device, a distance between a center of the first FOV and a center of the second FOV in a first direction is greater than a distance between the center of the first FOV and the center of the second FOV in a second direction perpendicular to the first direction.

Here, a size of the first FOV in the first direction is smaller than a size of the first FOV in the second direction, wherein a size of the second FOV in the first direction is smaller than a size of the second FOV in the second direction.

Here, the scanning unit includes a first scanning unit configured to form FOV (Field of View) in the first direction, and a second scanning unit configured to form FOV (Field of View) in the second direction, wherein the at least two of lasers is irradiated to the first scanning unit.

Here, the first scanning unit includes a nodding mirror configured to rotate in preset angle range, wherein the second scanning unit includes a rotating polygon mirror configured to rotate with respect to a rotation axis.

Here, the at least two of lasers include a first laser and a second laser, wherein the nodding mirror is repeatedly driven in an angle range "a", wherein when the angle between the first laser and the second laser irradiated to the first scanning unit is "b", the "b" is designed to be at least "2a".

Here, the at least two of lasers include a first laser and a second laser, wherein the detecting unit includes at least two channels for detecting the first laser and the second laser, wherein the first laser and the second laser emitted at the same time are detected in difference channels of the detecting unit.

Here, the at least two of lasers include a first laser and a second laser, wherein the LiDAR device generates points using the first laser and the second laser, wherein a density of the points in vertical edge region of the first FOV is greater than a density of the points in central region of the first FOV, wherein a density of the points in vertical edge region of the second FOV is greater than a density of the points in central region of the second FOV, wherein the angle between the at least two of lasers irradiated to the scanning unit is designed such that the vertical edge region of the first FOV and the vertical edge region of the second FOV are adjacent to each other.

Here, the laser emitting unit includes a first laser emitting unit configured to emit a first laser and a second laser emitting unit configured to emit a second laser.

Here, the at least two of lasers include a first laser, a second laser, a third laser and a fourth laser, wherein the scanning unit is configured to form the first FOV, the second FOV, a third FOV and a fourth FOV using the first to fourth lasers, wherein the scanning unit includes a first scanning unit a second scanning unit and a third scanning unit, wherein the first and the third scanning unit are arranged to form the first FOV and the second FOV, wherein an angle between the first laser and the second laser irradiated to the first scanning unit is designed such that at the same distance from the LiDAR device, the distance between the center of the first FOV and the center of the second FOV in the first direction is greater than the distance between the center of the first FOV and the center of the second FOV in the second direction perpendicular to the first direction, wherein the second and the third scanning unit are arranged to form the third FOV and the fourth FOV, wherein an angle between the third laser and the fourth laser irradiated to the second scanning unit is designed such that at the same distance from the LiDAR device, a distance between a center of the third FOV and a center of the fourth FOV in the first direction is greater than a distance between the center of the third FOV and the center of the fourth FOV in the second direction perpendicular to the first direction, wherein when viewed along an axis of rotation of the third scanning unit, an angle formed by the first laser irradiated to the third scanning unit through the first scanning unit and the third laser irradiated to the third scanning unit through the second scanning unit is designed such that a location of the first FOV in the second direction is different from a location of the third FOV in the second direction, wherein when viewed along the axis of rotation of the third scanning unit, an angle formed by the second laser irradiated to the third scanning unit through the first scanning unit and the fourth laser irradiated to the fourth scanning unit through the second scanning unit is designed such that a location of the second FOV in the second direction is different from a location of the fourth FOV in the second direction.

According to still another embodiment, A LiDAR (Light Detection And Ranging) device for measuring a distance using a laser, comprising: a first laser emitting unit configured to emit a first laser, a second laser emitting unit configured to emit a second laser, a first scanning unit configured to form a first vertical FOV (Field of view) using the first laser and a second vertical FOV (Field of view) using the second laser and a second scanning unit configured to form a first horizontal FOV using the first laser and a second horizontal FOV using the second laser, wherein an angle between the first laser and the second laser irradiated to the first scanning unit is designed such that an angle formed by a center of the first vertical FOV, a center of the second vertical FOV and the LiDAR device is to be at least a size of the first vertical FOV or a size of the second vertical FOV.

Here, the angle between the first laser and the second laser irradiated to the first scanning unit is designed to be at least the size of the first vertical FOV or the size of the second vertical FOV or more so that there is no overlapping point between the first FOV and the second FOV.

Here, the angle between the first laser and the second laser irradiated to the first scanning unit is designed to be at least the size of the first vertical FOV or the size of the second vertical FOV or less so that the first FOV and the second FOV overlap at least partially.

Here, the first scanning unit and the second scanning unit are arranged such that an angle formed by the first laser irradiated to the first FOV and the second laser irradiated to the second FOV at the same time and the LiDAR device is constant over time.

Here, the LiDAR device further comprises a detecting unit configured to detect the first laser and the second laser, wherein an arrangement of an area for detecting the first laser and an area for detecting the second laser in the detecting unit is opposite to an arrangement of the first vertical FOV and the second vertical FOV.

Here, lasers emitted from the first laser emitting unit and the second laser emitting unit fly along an irradiation path irradiated to outside through the second scanning unit and along a receiving path irradiated to a detecting unit through the second scanning unit, wherein the LiDAR device further comprises back light preventing unit dividing at least a portion of the irradiation path and the receiving path.

A lidar device is a device for detecting a distance from an object and a location of the object using laser light. For example, a distance between the lidar device and the object and a location of the object based on the lidar device may be shown using (R, θ, φ). Also, embodiments are not limited thereto, and for example, the distance between the lidar device and the object and the location of the object based on the lidar device may be shown using an orthogonal coordinate system (X, Y, Z), a cylindrical coordinate system (R, θ, z), and the like.

In addition, to determine a distance R from an object, the lidar device may use laser light reflected from the object.

According to an embodiment, to determine the distance R from the object, the lidar device may use time-of-flight (TOF) which is a time difference between time at which laser light is output and time at which the laser light is detected. For example, the lidar device may include a laser light emitting unit configured to output laser light and a detecting unit configured to detect reflected laser light. The lidar device may check time at which the laser light is output from the laser light emitting unit and check time at which laser light reflected from the object is detected by the detecting unit to determine a distance from the object on the basis of a difference between the time at which the laser light is output and the time at which the laser light is detected.

In addition, according to an embodiment, to determine the distance R from the object, the lidar device may use a triangular surveying method on the basis of a location at which laser light is detected. For example, when laser light output from the laser light emitting unit is reflected from an object which is relatively close to the laser light emitting unit, the reflected laser may be detected at a point of the detecting unit relatively distant from the laser light emitting unit. Also, when laser light output from the laser light emitting unit is reflected from an object which is relatively distant from the laser light emitting unit, the reflected laser may be detected at a point of the detecting unit relatively close to the laser light emitting unit. Accordingly, the lidar device may determine the distance from the object on the basis of a difference between the locations at which the rays of laser light are detected.

In addition, according to an embodiment, to determine the distance R from the object, the lidar device may use a phase shift of detected laser light. For example, the lidar device may modulate an amplitude of laser light output from the laser light emitting unit to sense a phase of the amplitude and sense a phase of an amplitude of laser light reflected from the object present in a scan field to determine the distance from the object present within the scan field on the basis of the phase difference between the output laser light and the detected laser light.

In addition, according to an embodiment, the lidar device may determine a location of an object using an angle at which light is irradiated. For example, when an irradiation angle (θ, φ) of a single ray of laser light which is irradiated from the lidar device toward a scan field of the lidar device is known, if laser light reflected from an object present within the scan field is detected by the detecting unit, the lidar device may determine the location of the object on the basis of the irradiation angle (θ, φ) of the irradiated laser light.

In addition, according to an embodiment, the lidar device may determine a location of an object using an angle at which laser light is received. For example, when a first object and a second object are at the same distance R from the lidar device but are at different locations (θ, φ) on the basis of the lidar device, laser light reflected from the first object and laser light reflected from the second object may be detected at different points of the detecting unit. The lidar device may determine the location of the object on the basis of the points at which the reflected rays of laser light are detected by the detecting unit.

In addition, according to an embodiment, to detect a location of an arbitrary object in the vicinity of the lidar device, the lidar device may have a scan field including the object. Here, the scan field may be a detectable field expressed in a single screen and may refer to a set of points, lines, and surfaces forming a single screen during one frame. Also, the scan field may refer to an irradiation field of laser light irradiated from the lidar device, and the irradiation field may refer to a set of points, lines, and surfaces at which rays of laser light irradiated during one frame meet a spherical surface at the same distance R Also, a field of view (FOV) may refer to a detectable field and may be defined as an angle range of the scan field with the lidar device as the origin.

Hereinafter, each element of the lidar device according to an embodiment will be described in detail.

FIG. 1 is a view illustrating a lidar device according to an embodiment. Referring to FIG. 1, a lidar device 100 according to an embodiment may include a laser light emitting unit 110, a scanning unit 120, a detecting unit 130, and a controller 140. However, the configuration of the lidar device 100 is not limited thereto, and the lidar device 100 may be a device having more or less elements. For example, the lidar device may only include the laser light emitting unit, the detecting unit, and the controller, without the scanning unit.

In addition, each of the laser light emitting unit 110, the scanning unit 120, the detecting unit 130, and the controller 140 included in the lidar device 100 may be provided in plural. For example, the lidar device may include a plurality of laser light emitting units, a plurality of scanning units, and a plurality of detecting units. Of course, the lidar device may also include a single laser light emitting unit, a plurality of scanning units, and a single detecting unit.

Each of the laser light emitting unit 110, the scanning unit 120, the detecting unit 130, and the controller 140 included in the lidar device 100 may include a plurality of sub-elements. For example, in the lidar device, a plurality of laser light outputting elements, which form a single array, may constitute the laser light emitting unit.

The laser light emitting unit 110 may output laser light. The lidar device 100 may measure a distance from an object using the output laser light.

In addition, the laser light emitting unit 110 may include one or more laser light output elements. In one embodiment, the laser light emitting unit 110 may include a single laser light output element or include a plurality of laser light output elements. When the laser light emitting unit 110 includes a plurality of laser light output elements, the plurality of laser light output elements may form a single array.

In addition, the laser light emitting unit 110 may output laser light in a wavelength band of 905 nm or output laser light in a wavelength band of 1550 nm. The laser light emitting unit 110 may output laser light in a wide range of wavelengths, e.g., laser light having a wavelength in the range of 800 nm to 1000 nm, or may output laser light in a specific range of wavelengths.

In addition, when a laser light output element of the laser light emitting unit 110 is provided in plural, each laser light output element may output laser light in the same wavelength band or output laser light in different wavelength bands. For example, in the case of the laser light emitting unit including two laser light output elements, one laser light output element may output laser light in the wavelength band of 905 nm, and the other laser light output element may output laser light in the wavelength band of 1550 nm.

In addition, the laser light output element may include a laser diode (LD), a solid-state laser, a high power laser, a light emitting diode (LED), a vertical cavity surface emitting laser (VCSEL), an external cavity diode laser (ECDL), and the like but is not limited thereto.

The scanning unit 120 may change an irradiation direction and/or size of laser light output from the laser light emitting unit 110. For example, the scanning unit 120 may change a traveling direction of output laser light to steer the irradiation direction of the laser light, may diffuse the output laser light or change a phase thereof to change the size of the laser light or change the irradiation direction thereof, or may diffuse laser light and change a traveling direction of the laser light to change the irradiation direction and size of the laser light.

In addition, the scanning unit 120 may change the irradiation direction and/or size of the laser light irradiated from the laser light emitting unit 110 to expand a scan field of the lidar device 100 or steer a scan direction thereof.

In addition, the scanning unit 120 may include a fixing mirror configured to change a traveling direction of laser light at a fixed angle to steer the traveling direction of the output laser light, a nodding mirror configured to nod within a preset angle range and continuously change a traveling direction of laser light, and a rotary mirror configured to rotate about one axis and continuously change a traveling direction of laser but is not limited thereto.

In addition, the scanning unit 120 may include a lens, a prism, a microfluidic lens, liquid crystal, or the like to diffuse the output laser light but is not limited thereto.

In addition, the scanning unit 120 may include an optical phased array (OPA) or the like to change a phase of the output laser light and steer an irradiation direction of the laser light thereby but is not limited thereto.

In addition, the nodding mirror may nod within a preset angle range by continuously changing a traveling direction of the output laser light to expand or steer an irradiation field of the laser light. Here, the nodding may refer to rotating about one or a plurality of shafts and reciprocating within a predetermined angle range. Also, the nodding mirror may be a resonance scanning unit, a micro-electro mechanical systems (MEMS) mirror, a voice coil motor (VCM) or the like but is not limited thereto.

In addition, the rotary mirror may rotate about one axis by continuously changing a traveling direction of the output laser to expand or steer an irradiation field of the laser light. The rotary mirror may be a cross-section mirror rotating about an axis, a conical mirror rotating about an axis, or a multi-face mirror rotating about an axis but is not limited thereto and may be any mirror rotating about an axis without a limitation in an angle range.

In addition, the scanning unit 120 may be configured with a single scanning unit or configured with a plurality of scanning units. Also, the scanning unit may include one or more optical elements, but the configuration of the scanning unit is not limited thereto.

The detecting unit 130 may detect laser light reflected from an object located in a scan field of the lidar device 100.

In addition, the detecting unit 130 may include one or more detectors. In one embodiment, the detecting unit 130 may include a single detector or include a detecting unit array formed of a plurality of detectors. For example, the detecting unit 130 may include a single avalanche photodiode (APD) or include silicon photomultipliers (SiPM) in which an array is formed of a plurality of single-photon avalanche diodes (SPAD). Also, a plurality of APDs may be formed of a single channel or formed of a plurality of channels.

In addition, the detector may include a PN photodiode, a phototransistor, a PIN photodiode, an APD, a SPAD, SiPM, a charge-coupled device (CCD), or the like but is not limited thereto.

The controller 140 may determine a distance from the lidar device to an object located in a scan field on the basis of detected laser light. Also, the controller 140 may control operations of each element of the lidar device such as the laser light emitting unit 110, the scanning unit 120, and the detecting unit 130.

Hereinafter, the scanning unit 120 will be described in more detail.

Figure 2:
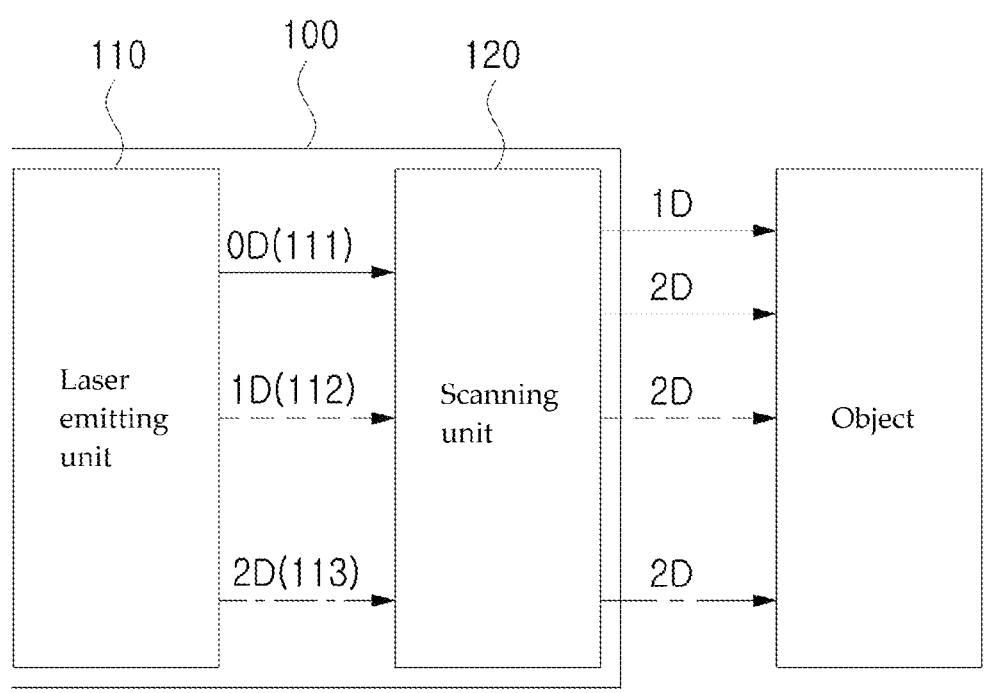
FIG. 2 is a view describing a function of a scanning unit in a LiDAR device according to an embodiment.

FIG. 2 is a view for describing a function of a scanning unit in the lidar device according to an embodiment.

Referring to FIG. 2, a function of the scanning unit 120 may vary according to an irradiation field of laser light output from the laser light emitting unit 110.

According to an embodiment, when the laser light emitting unit 110 has a single laser light output element, an irradiation field of laser light 111 output from the laser light emitting unit may be in the form of a point. In this case, the scanning unit 120 may change an irradiation direction and size of the laser light 111. Accordingly, a scan field of the lidar device may be expanded in the form of a line or a plane.

In addition, the scanning unit 120 may continuously change a traveling direction of the laser light 111 whose irradiation field is in the form of a point to change the irradiation direction of the laser light. Accordingly, the scan field of the lidar device may be expanded in the form of a plane.

In addition, the scanning unit 120 may diffuse the laser light 111 whose irradiation field is in the form of a point to change the size of the laser light. Accordingly, the scan field of the lidar device may be expanded in the form of a line or a plane.

In addition, the scanning unit 120 may change a phase of the laser light 111 whose irradiation field is in the form of a point to change the size and irradiation direction of the laser light. Accordingly, the scan field of the lidar device may be expanded in the form of a line or a plane.

In addition, the scanning unit 120 may, first, continuously change a traveling direction of the laser light 111 whose irradiation field is in the form of a point and then, second, change the traveling direction of the laser light to a direction different from the previous traveling direction to change an irradiation direction of the laser light. Accordingly, the scan field of the lidar device 100 may be expanded in the form of a plane.

In addition, the scanning unit 120 may, first, continuously change a traveling direction of the laser light 111 whose irradiation field is in the form of a point and then, second, diffuse the laser light to change the irradiation direction and size of the laser light. Accordingly, the scan field of the lidar device may be expanded in the form of a plane.

In addition, the scanning unit 120 may, first, diffuse the laser light 111 whose irradiation field is in the form of a point and then, second, continuously change a traveling direction of the diffused laser light to change the irradiation direction and size of the laser light. Accordingly, the scan field of the lidar device may be expanded in the form of a plane.

According to another embodiment, when the laser light emitting unit 110 is formed of a plurality of laser light output elements, an irradiation field of laser light 112 output from the laser light emitting unit may be in the form of a line. Here, the scanning unit 120 may change an irradiation direction and a size of the laser light 112. Accordingly, a scan field of the lidar device may be expanded in the form of a plane.

In this case, the scanning unit 120 may continuously change a traveling direction of the laser light 112 whose irradiation field is in the form of a line to change an irradiation direction of the laser light. Accordingly, the scan field of the lidar device may be expanded in the form of a plane.

In addition, the scanning unit 120 may diffuse the laser light 112 whose irradiation field is in the form of a line to change the size of the laser light. Accordingly, the scan field of the lidar device may be expanded in the form of a plane.

In addition, the scanning unit 120 may change a phase of the laser light 112 whose irradiation field is in the form of a line to change the irradiation direction and size of the laser light. Accordingly, the scan field of the lidar device may be expanded in the form of a plane.

According to another embodiment, when the laser light emitting unit 110 includes an array of laser light output elements arranged in a row, the irradiation field of the laser light 112 output from the laser light emitting unit 110 may be in the form of a line. Here, the scanning unit 120 may change the irradiation direction and size of the laser light 112. Accordingly, the scan field of the lidar device may be expanded in the form of a plane.

In this case, the scanning unit 120 may continuously change a traveling direction of the laser light 112 whose irradiation field is in the form of a line to change the irradiation direction of the laser light. Accordingly, the scan field of the lidar device may be expanded in the form of a plane.

In addition, the scanning unit 120 may diffuse the laser light 112 whose irradiation field is in the form of a line to change the size of the laser light. Accordingly, the scan field of the lidar device may be expanded in the form of a plane.

In addition, the scanning unit 120 may change a phase of the laser light 112 whose irradiation field is in the form of a line to change the irradiation direction and size of the laser light. Accordingly, the scan field of the lidar device may be expanded in the form of a plane.

According to another embodiment, when the laser light emitting unit 110 is formed of a plurality of laser light output elements, an irradiation field of laser light 113 output from the laser light emitting unit 110 may be in the form of a plane. Here, the scanning unit 120 may change an irradiation direction and a size of the laser light. Accordingly, a scan field of the lidar device may be expanded or a scanning direction may be changed.

In this case, the scanning unit 120 may continuously change a traveling direction of the laser light 113 whose irradiation field is in the form of a plane to change an irradiation direction of the laser light. Accordingly, the scan field of the lidar device may be expanded or the scanning direction may be changed.

In addition, the scanning unit 120 may diffuse the laser light 113 whose irradiation field is in the form of a plane to change the size of the laser light. Accordingly, the scan field of the lidar device may be expanded or the scanning direction may be changed.

In addition, the scanning unit 120 may change a phase of the laser light 113 whose irradiation field is in the form of a plane to change the irradiation direction and size of the laser light. Accordingly, the scan field of the lidar device may be expanded or the scanning direction may be changed.

According to another embodiment, when the laser light emitting unit 110 includes laser light output elements forming a planar array, the irradiation field of the laser light 113 output from the laser light emitting unit 110 may be in the form of a plane. Here, the scanning unit 120 may change the irradiation direction and size of the laser light. Accordingly, the scan field of the lidar device may be expanded or the scanning direction may be changed.

In this case, the scanning unit 120 may continuously change a traveling direction of the laser light 113 whose irradiation field is in the form of a plane to change the irradiation direction of the laser light. Accordingly, the scan field of the lidar device may be expanded or the scanning direction may be changed.

In addition, the scanning unit 120 may diffuse the laser light 113 whose irradiation field is in the form of a plane to change the size of the laser light. Accordingly, the scan field of the lidar device may be expanded or the scanning direction may be changed.

In addition, the scanning unit 120 may change a phase of the laser light 113 whose irradiation field is in the form of a plane to change the irradiation direction and size of the laser light. Accordingly, the scan field of the lidar device may be expanded or the scanning direction may be changed.

Hereinafter, the lidar device in which the irradiation field of laser light output from the laser light emitting unit is in the form of a point will be described in detail.

Figure 3:
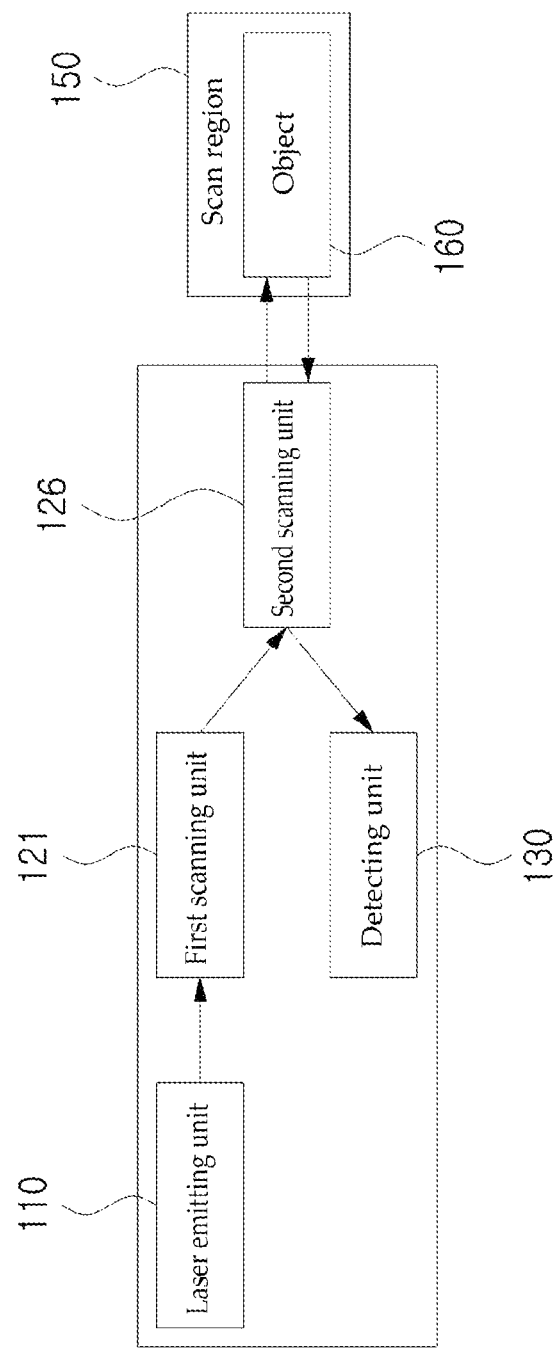
FIG. 3 is a block diagram illustrating a LiDAR device according to another embodiment.

FIG. 3 is a block diagram illustrating a lidar device according to another embodiment.

Referring to FIG. 3, the lidar device according to an embodiment may include a laser light emitting unit 110, a first scanning unit 121, a second scanning unit 126, and a detecting unit 130.

Since the laser light emitting unit 110 and the detecting unit 130 have been described above with reference to FIGS. 1 and 2, detailed description on the laser light emitting unit 110 and the detecting unit 130 will be omitted below.

The scanning unit 120 described above with reference to FIGS. 1 and 2 may include the first scanning unit 121 and the second scanning unit 126.

The first scanning unit 121 may change an irradiation direction and/or a size of the output laser light to expand an irradiation field of the laser light in the form of a line. For example, the first scanning unit 121 may continuously change a traveling direction of the output laser light to expand the irradiation field of the laser light in the form of a line. Also, the first scanning unit 121 may diffuse the output laser light in the form of a line to expand the irradiation field of the laser light in the form of a line.

In addition, the second scanning unit 126 may change the irradiation direction and/or size of the laser light irradiated from the first scanning unit 121 to expand the irradiation field of the laser light in the form of a plane. For example, the second scanning unit 126 may continuously change a traveling direction of the laser light irradiated from the first scanning unit 121 to expand the irradiation field of the laser light in the form of a plane. Also, the second scanning unit 126 may diffuse the laser light irradiated from the first scanning unit to expand the irradiation field of the laser light in the form of a plane. Accordingly, a scan field 150 of the lidar device 100 may be expanded in the form of a plane.

Referring to FIG. 3, an optical path of laser light output from the lidar device 100 is indicated in FIG. 3. Specifically, the laser light emitting unit 110 may output laser light. The laser light output from the laser light emitting unit 110 may reach the first scanning unit 121, and the first scanning unit 121 may irradiate the laser light toward the second scanning unit 126. Also, the laser light may reach the second scanning unit 126, and the second scanning unit 126 may irradiate the laser toward the scan field 150. Also, the laser light irradiated to the scan field 150 of the lidar device 100 may be reflected from an object 160 present within the scan field 150 and be irradiated toward the detecting unit 130 via the second scanning unit 126. The detecting unit 130 may detect the laser light irradiated via the second scanning unit 126.

The lidar device 100 may be a device for measuring a distance from the lidar device 100 to the object 160 using laser light. Therefore, the lidar device 100 should irradiate laser light toward the object 160. Accordingly, the lidar device 100 may have an irradiation method for efficiently measuring the distance from the object. Here, the irradiation method may include a method for determining an irradiation path along which the laser light output from the laser light emitting unit 110 reaches the object 160 located within the scan field 150 and determining the scan field 150. Therefore, the irradiation path and the scan field 150 of the lidar device will be described below.

Specifically, the laser light emitting unit 110 may output laser light toward the first scanning unit 121, the first scanning unit 121 may irradiate the output laser light toward the second scanning unit 126, and the second scanning unit 126 may irradiate the laser light irradiated thereto toward the scan field 150 of the lidar device 100.

More specifically, the irradiation field of the laser light output from the laser light emitting unit 110 may be in the form of a point, and the output laser light may be irradiated toward the second scanning unit 126 via the first scanning unit 121. In this case, the first scanning unit 121 may change the irradiation direction and/or size of the laser light whose irradiation field is in the form of a point to expand the irradiation field of the laser light in the form of a line. That is, the first scanning unit 121 may receive the laser light whose irradiation field is in the form of a point from the laser light emitting unit 110 and irradiate the laser light whose irradiation field is in the form of a line toward the second scanning unit 126.

In this case, the second scanning unit 126 may change the irradiation direction and/or size of the laser whose irradiation field is in the form of a line to expand the irradiation field of the laser light in the form of a plane, and the laser light irradiated from the first scanning unit 121 may be irradiated toward the scan field via the second scanning unit 126. That is, the second scanning unit 126 may receive the laser light whose irradiation field is in the form of a line from the first scanning unit 121 and irradiate the laser light whose irradiation field is in the form of a plane toward the scan field 150. Then, the second scanning unit 126 may irradiate the laser light whose irradiation field is in the form of a plane to expand the scan field 150 of the lidar device 100 in the form of a plane.

The lidar device 100 should detect laser light reflected from an object. Accordingly, the lidar device 100 may have a light reception method for efficiently measuring a distance from an object. Here, the light reception method may include a method for determining a light reception path along which laser light reflected from an object reaches a detecting unit and determining an amount of laser light that reaches the detecting unit. Therefore, the light reception path of the lidar device 100 and the amount of laser light reaching the detecting unit will be described below.

Specifically, laser light irradiated to the scan field 150 of the lidar device 100 may be reflected from the object 160 present within the scan field 150 of the lidar device. Also, the laser light reflected from the object 160 may move toward the second scanning unit 126, and the second scanning unit 126 may receive and reflect the laser light reflected from the object 160 to irradiate the laser light toward the detecting unit 130. In this case, properties of the laser light reflected from the object 160 may vary according to the color, material, or the like of the object 160 or an incident angle or the like of the laser light.

In addition, the laser light reflected from the object 160 may be irradiated toward the detecting unit 130 via the second scanning unit 126. That is, the laser light reflected from the object 160 may be irradiated toward the detecting unit only via the second scanning unit 126 or may pass through both the first scanning unit 121 and the second scanning unit 126 but not be irradiated toward the detecting unit 130. Also, the laser light reflected from the object 160 may be irradiated toward the detecting unit 130 only via the second scanning unit 126 or may pass through neither the first scanning unit 121 nor the second scanning unit 126 nor be irradiated toward the detecting unit 130. Therefore, the amount of laser light reaching the detecting unit 130 may be determined on the basis of the second scanning unit 126.

In addition, although the laser light reflected from the object 160 is indicated as being irradiated toward the detecting unit 130 only via the second scanning unit 126 in FIG. 3, embodiments are not limited thereto. According to circumstances, the laser light reflected from the object 160 may also reach the detecting unit 130 via the first scanning unit 121 and the second scanning unit 126. The laser light reflected from the object 160 may also reach the detecting unit 130 without passing through the first scanning unit 121 and the second scanning unit 126.

As described above, the lidar device including the laser light emitting unit 110 outputting laser light in the form of a point, the first scanning unit 121, and the second scanning unit 126 may expand the scan field 150 in the form of a plane using the first scanning unit 121 and the second scanning unit 126. Therefore, as compared with the lidar device that expands a scan field in the form of a plane through mechanical rotation of the lidar device itself, the lidar device according to the present invention may be more advantageous in terms of durability and stability. Also, as compared with the lidar device that expands a scan field in the form of a plane using diffusion of laser light, the lidar device according to the present invention may measure a longer distance. Also, the lidar device according to the present invention may irradiate laser light to a desired region of interest by controlling operations of the first scanning unit 121 and the second scanning unit 126.

When an irradiation field of laser light output from the laser light emitting unit 110 of the lidar device 100 is in the form of a point, the lidar device 100 may include the first scanning unit 121 and the second scanning unit 126. Here, the irradiation field of the laser light whose irradiation field is in the form of a point may be expanded in the form of a plane by the first scanning unit 121 and the second scanning unit 126. Accordingly, the scan field 150 of the lidar device 100 may be expanded in the form of a plane.

In addition, the FOV required for the lidar device 100 may vary according to purposes of use of the lidar device 100.

For example, as wide a FOV as possible in the vertical and horizontal directions may be required in the case of a fixed type lidar device used for three dimensional (3D) mapping, and a relatively narrower FOV may be required in the vertical direction in comparison to a relatively wide FOV in the horizontal direction in the case of a lidar device disposed in a vehicle. Also, as wide a FOV as possible in the vertical and horizontal directions may be required for a lidar device disposed in a drone. Therefore, when a FOV required in the vertical direction and a FOV required in the horizontal direction are different, the first scanning unit 121 may change a traveling direction of laser light in a direction in which a relatively narrower FOV is required, and the second scanning unit 126 may change a traveling direction of the laser light in a direction in which a relatively wide FOV is required so that the overall size of the lidar device 100 is reduced.

In addition, when laser light irradiated toward the scan field 150 is reflected from the object 160 present within the scan field 150, the lidar device 100 may detect the reflected laser light to measure a distance between the lidar device 100 and the object 160. Here, the laser light may be irregularly reflected in all directions according to the color or material of the object 160 present within the scan field 150 or the incident angle or the like of the laser light irradiated toward the object 160. Therefore, the lidar device 100 may have to reduce diffusion of the laser light to measure a distance between the lidar device 100 and an object 160 disposed at a long distance from the lidar device 100. To this end, the first scanning unit 121 and the second scanning unit 126 may not expand the size of the laser light but expand the irradiation field of the laser light by continuously changing the traveling direction of the laser light.

In addition, to perform 3D scanning, the first scanning unit 121 and the second scanning unit 126 of the lidar device 100 may change the traveling direction of the laser light in different directions. For example, the first scanning unit 121 may continuously change the traveling direction of the laser light in a direction perpendicular to the ground, and the second scanning unit 126 may continuously change the traveling direction of the laser light in a direction horizontal to the ground.

In addition, in the lidar device 100, while the first scanning unit 121 receives laser light whose irradiation field is in the form of a point from the laser light emitting unit 110, the second scanning unit 126 may receive laser light whose irradiation field is in the form of a line from the first scanning unit 121. Therefore, a size of the second scanning unit 126 may be larger than that of the first scanning unit 121. Accordingly, a scanning speed of the first scanning unit 121, whose size is smaller, may be higher than that of the second scanning unit 126, whose size is larger. Here, the scanning speed may refer to a speed at which the traveling direction of the laser light is continuously changed.

In addition, when the laser light irradiated toward the scan field 150 is reflected from the object 160 present within the scan field 150, the lidar device 100 may detect the reflected laser light to measure a distance between the lidar device 100 and the object 160. Here, the laser light may be irregularly reflected in all directions according to the color or material of the object 160 present within the scan field 150 or the incident angle or the like of the laser light irradiated toward the object 160. Therefore, the lidar device 100 may have to increase the amount of laser light detectable by the detecting unit 130 to measure a distance between the lidar device 100 and an object 160 disposed at a long distance from the lidar device 100. To this end, the laser light reflected from the object 160 may be irradiated toward the detecting unit 130 only via the second scanning unit 126, whose size is larger, among the first scanning unit 121 and the second scanning unit 126.

Therefore, for the above-described functions to be smoothly performed, the first scanning unit 121 of the lidar device 100 may include a nodding mirror, and the second scanning unit 126 of the lidar device 100 may include a rotating polygon mirror.

The lidar device in which the first scanning unit 121 includes the nodding mirror and the second scanning unit 126 includes the rotating polygon mirror will be described in detail below.

Figure 4:
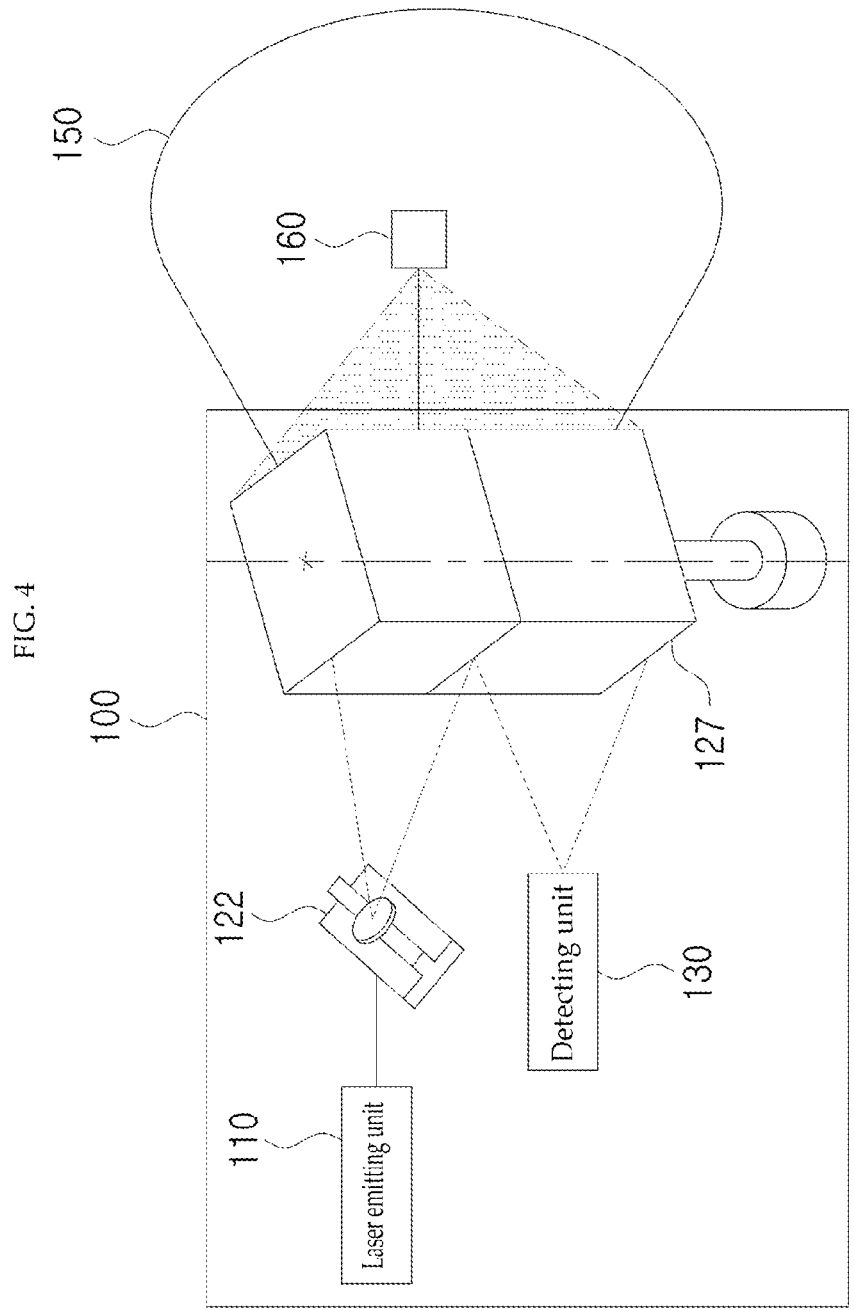
FIG. 4 a view related to a LiDAR device according to an embodiment.

FIG. 4 is a view related to the lidar device according to an embodiment.

Referring to FIG. 4, a lidar device 100 according to an embodiment may include a laser light emitting unit 110, a nodding mirror 122, a rotating polygon mirror 127, and a detecting unit 130.

Since the laser light emitting unit 110 and the detecting unit 130 have been described above with reference to FIGS. 1 and 2, detailed description on the laser light emitting unit 110 and the detecting unit 130 will be omitted below.

The first scanning unit 121 described above with reference to FIG. 3 may include the nodding mirror 122, and the second scanning unit 126 may include the rotating polygon mirror 127.

The nodding mirror 122 may be an implementation of the above-described first scanning unit 121. The nodding mirror 122 may nod within a preset angle range about one axis or may also nod within preset angle ranges about two axes. In this case, when the nodding mirror 122 nods within a present angle range about one axis, an irradiation field of laser light irradiated from the nodding mirror may be in the form of a line. Also, when the nodding mirror 122 nods within present angle ranges about two axes, an irradiation field of laser light irradiated from the nodding mirror may be in the form of a plane.

In addition, a nodding speed of the nodding mirror 122 may be the same throughout the entire preset angle range or may also be different within the entire preset angle range. For example, the nodding mirror 122 may nod at the same angular speed throughout the entire preset angle range. Also, for example, the nodding mirror 122 may nod at a relatively lower angular speed at both ends of the preset angle and may nod at a relatively higher angular speed at a central portion of the preset angle.

In addition, the nodding mirror 122 may receive and reflect laser light output from the laser light emitting unit 110 and may nod within a preset angle range to continuously change a traveling direction of the laser light. Accordingly, an irradiation field of the laser light may be expanded in the form of a line or a plane.

In addition, the rotating polygon mirror 127 may be an implementation of the above-described second scanning unit 126. The rotating polygon mirror 127 may rotate about one axis. Here, the rotating polygon mirror 127 may receive and reflect laser light irradiated from the nodding mirror 122 and may rotate about one axis to continuously change a traveling direction of the laser light. Then, accordingly, an irradiation field of the laser light may be expanded in the form of a plane, and as a result, a scan field 150 of the lidar device 100 may be expanded in the form of a plane.

In addition, a rotating speed of the rotating polygon mirror 127 may be the same throughout the entire rotation angle range or may also be different within the entire rotation angle range. For example, a rotating speed when laser light irradiated from the rotating polygon mirror 127 moves toward a central portion of the scan field 150 may be relatively lower than a rotating speed when laser light irradiated from the rotating polygon mirror 127 moves toward a side portion of the scan field 150. Also, the rotating speed of the rotating polygon mirror 127 may vary according to the number of rotations of the rotating polygon mirror 127.

In addition, when a vertical FOV of the lidar device 100 is set to be narrower than a horizontal FOV thereof, the nodding mirror 122 may continuously change a traveling direction of laser light output from the laser light emitting unit 110 in the direction perpendicular to the ground to expand an irradiation field of the laser light in the form of a line which is perpendicular to the ground. In addition, in this case, the rotating polygon mirror 127 may continuously change a traveling direction of the laser light irradiated from the nodding mirror 122 in the direction horizontal to the ground to expand the irradiation field of the laser light in the form of a plane. Accordingly, the scan field 150 of the lidar device 100 may be expanded in the form of a plane. Therefore, the nodding mirror 122 may expand the scan field 150 vertically, and the rotating polygon mirror 127 may expand the scan field 150 horizontally.

In addition, since the nodding mirror 122 reflects laser light output from the laser light emitting unit 110, the size of the nodding mirror 122 may be similar to a diameter of the laser light. However, since laser light irradiated from the nodding mirror 122 has an irradiation field in the form of a line, the size of the rotating polygon mirror 127 may be larger than or equal to that of the irradiation field so that the rotating polygon mirror 127 reflects the laser light irradiated from the nodding mirror 122. Therefore, the size of the nodding mirror 122 may be smaller than the size of the rotating polygon mirror 127, and the nodding speed of the nodding mirror 122 may be higher than the rotating speed of the rotating polygon mirror 127.

A laser light irradiation method and a laser light reception method of the lidar device 100 having the above-described configuration will be described below.

Referring back to FIG. 4, a traveling path of laser light until the laser light is detected after being output in the lidar device 100 is known. Specifically, laser light output from the laser light emitting unit 110 of the lidar device 100 may be irradiated toward the rotating polygon mirror 127 via the nodding mirror 122, and the laser light irradiated toward the rotating polygon mirror 127 may be irradiated toward the scan field 150 of the lidar device 100 via the rotating polygon mirror 127. Also, the laser light irradiated toward the scan field 150 of the lidar device 100 may be reflected from the object 160 present within the scan field 150 and be irradiated toward the detecting unit 130 via the rotating polygon mirror 127. Also, the detecting unit 130 may detect the laser light irradiated thereto via the rotating polygon mirror 127.

The lidar device 100 may be a device for measuring a distance from the lidar device 100 to the object 160 using laser light. Therefore, the lidar device 100 should irradiate laser light toward the object 160. Accordingly, the lidar device 100 may have an irradiation method for efficiently measuring the distance from the object 160. Here, the irradiation method may include a method for determining an irradiation path along which the laser light output from the laser light emitting unit 110 reaches the object 160 located within the scan field 150 and determining the scan field 150. Therefore, the irradiation path and the scan field 150 of the lidar device 100 will be described below.

Specifically, the laser light emitting unit 110 may output laser light toward the nodding mirror 122, the nodding mirror 122 may receive and reflect the output laser light to irradiate the laser light toward the rotating polygon mirror 127, and the rotating polygon mirror 127 may receive and reflect the laser light irradiated thereto to irradiate the laser light toward the scan field 150 of the lidar device 100.

In this case, the laser light emitting unit 110 may output laser light toward the nodding mirror 122, and, here, an irradiation field of the output laser light may be in the form of a point.

Here, the laser light output from the laser light emitting unit 110 may be irradiated toward the rotating polygon mirror 127 via the nodding mirror 122. In this case, the nodding mirror 122 may change an irradiation direction of the laser light whose irradiation field is in the form of a point to expand the irradiation field of the laser light in the form of a line. That is, the nodding mirror 122 may receive the laser light whose irradiation field is in the form of a point and irradiate laser light whose irradiation field is in the form of a line toward the rotating polygon mirror 127.

In this case, the nodding mirror 122 may continuously change a traveling direction of the laser light output from the laser light emitting unit 110 in a direction perpendicular to the ground to expand the irradiation field of the laser light in the form of a line which is perpendicular to the ground.

In addition, laser light irradiated from the nodding mirror 122 may be irradiated toward the scan field 150 via the rotating polygon mirror 127. In this case, the rotating polygon mirror 127 may change an irradiation direction of the laser light whose irradiation field is in the form of a line to expand an irradiation field of the laser light in the form of a plane. That is, the rotating polygon mirror 127 may receive the laser light whose irradiation field is in the form of a line from the nodding mirror 122 and irradiate laser light whose irradiation field is in the form of a plane toward the scan field 150. Then, the rotating polygon mirror 127 may irradiate the laser light whose irradiation field is in the form of a plane to expand the scan field 150 of the lidar device 100 in the form of a plane.

In addition, the rotating polygon mirror 127 may continuously change a traveling direction of the laser light irradiated from the nodding mirror 122 in a direction horizontal to the ground to expand the irradiation field of the laser light in the form of a plane.

In addition, in this case, the scan field 150 of the lidar device 100 may be determined on the basis of a preset angle of the nodding mirror 122 and the number of reflective surfaces of the rotating polygon mirror 127. Accordingly, a FOV of the lidar device 100 may be determined. For example, when the nodding mirror 122 continuously changes a traveling direction of the laser light in the direction perpendicular to the ground, a vertical FOV of the lidar device 100 may be determined on the basis of the preset angle of the nodding mirror 122. Also, when the rotating polygon mirror 127 continuously changes the traveling direction of the laser light in the direction horizontal to the ground, a horizontal FOV of the lidar device 100 may be determined on the basis of the number of reflective surfaces of the rotating polygon mirror 127.

The lidar device 100 may be a device for measuring a distance from the lidar device 100 to the object 160 using laser light. Therefore, the lidar device 100 should detect laser light reflected from the object 160. Accordingly, the lidar device 100 may have a light reception method for efficiently measuring the distance from the object 160. Here, the light reception method may include a method for determining a light reception path along which laser light reflected from the object 160 reaches the detecting unit 130 and determining an amount of laser light reaching the detecting unit 130. Therefore, the light reception path of the lidar device 100 and the amount of laser light reaching the detecting unit 130 will be described below.

Specifically, laser light irradiated to the scan field 150 of the lidar device 100 may be reflected from the object 160 present within the scan field 150 of the lidar device 100. Also, the laser light reflected from the object 160 may move toward the rotating polygon mirror 127, and the rotating polygon mirror 127 may receive and reflect the laser light reflected from the object 160 to irradiate the laser light toward the detecting unit 130. In this case, properties of the laser light reflected from the object 160 may vary according to the color, material or the like of the object 160 or an incident angle or the like of the laser light.

In addition, the laser light reflected from the object 160 may be irradiated toward the detecting unit 130 via the rotating polygon mirror 127. That is, the laser light reflected from the object 160 may be irradiated toward the detecting unit 130 only via the rotating polygon mirror 127 or may pass through both the nodding mirror 122 and the rotating polygon mirror 127 but not be irradiated toward the detecting unit 130. Also, the laser light reflected from the object 160 may be irradiated toward the detecting unit 130 only via the rotating polygon mirror 127 or may pass through neither the nodding mirror 122 nor the rotating polygon mirror 127 nor be irradiated toward the detecting unit 130. Therefore, the amount of laser light reaching the detecting unit 130 may be determined on the basis of the rotating polygon mirror 127.

Here, irradiating the laser light reflected from the object 160 toward the detecting unit 130 only via the rotating polygon mirror 127 may increase the amount of laser light reaching the detecting unit 130 and cause the amount of laser light reaching the detecting unit 130 to be more even as compared with irradiating the laser light reflected from the object 160 toward the detecting unit 130 via both the nodding mirror 122 and the rotating polygon mirror 127.

Specifically, when the laser light reflected from the object 160 is irradiated toward the detecting unit 130 only via the rotating polygon mirror 127, the amount of laser light reaching the detecting unit 130 may be determined on the basis of a size of the reflective surface of the rotating polygon mirror 127 and a rotating angle of the rotating polygon mirror 127.

Conversely, when the laser light reflected from the object 160 is irradiated toward the detecting unit 130 via both the nodding mirror 122 and the rotating polygon mirror 127, the amount of laser light reaching the detecting unit 130 may be determined on the basis of a size of the nodding mirror 122, a nodding angle of the nodding mirror 122, the size of the reflective surface of the rotating polygon mirror 127, and the rotating angle of the rotating polygon mirror 127. That is, the amount of laser light reaching the detecting unit 130 may be determined on the basis of a smaller size of the size of the nodding mirror 122 and the size of the rotating polygon mirror 127 and may vary according to the nodding angle of the nodding mirror 122 and the rotating angle of the rotating polygon mirror 127. Therefore, the amount of laser light reaching the detecting unit 130 may be smaller and a change in the amount of laser light reaching the detecting unit 130 may be larger as compared with when the laser light is irradiated toward the detecting unit 130 only via the rotating polygon mirror 127.

Figure 5:
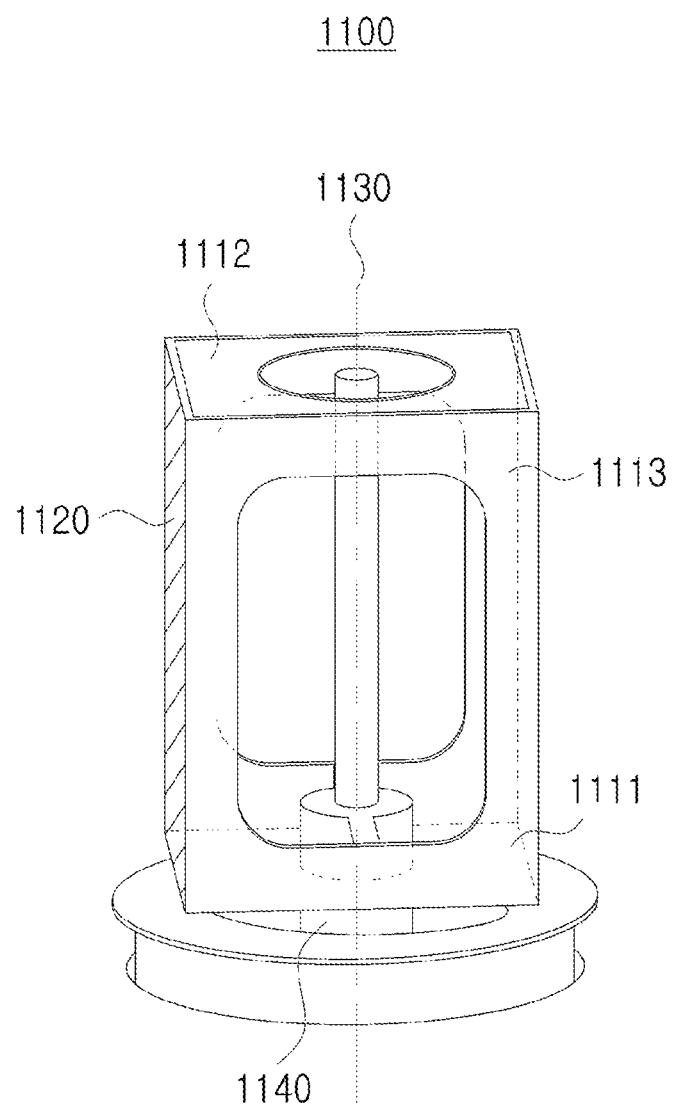
FIG. 5 is a view illustrating a rotating polygon mirror according to an embodiment.

FIG. 5 is a view for describing a rotating polygon mirror according to an embodiment.

Referring to FIG. 5, a rotating polygon mirror 1100 according to an embodiment may include reflective surfaces 1120 and a body 1110 and may rotate about a rotating shaft 1130 which vertically passes through centers of an upper portion 1112 and a lower portion 1111 of the body 1110. However, the rotating polygon mirror 1100 may include only some of the above-described elements or include more elements. For example, the rotating polygon mirror 1100 may include the reflective surfaces 1120 and the body 1110, and the body 1110 may only include the lower portion 1111. In this case, the reflective surfaces 1120 may be supported by the lower portion 1111 of the body 1110.

The reflective surfaces 1120 are surfaces for reflecting received laser light and may include a reflective mirror, reflective plastic, or the like but are not limited thereto.

In addition, the reflective surfaces 1120 may be installed at side surfaces of the body 1110 excluding the lower portion 1111 and the upper portion 1112 thereof and may be installed so that the rotating shaft 1130 and a normal line of each reflective surface 1120 are perpendicular to each other. This may be to cause scan fields of rays of laser light irradiated from the reflective surfaces 1120 to be equal in order to scan the same scan field repeatedly.

In addition, the reflective surfaces 1120 may be installed at the side surfaces of the body 1110 excluding the lower portion 1111 and the upper portion 1112 thereof and may be installed so that normal lines of the reflective surfaces 1120 form different angles with the rotating shaft 1130. This may be to cause scan fields of rays of laser light irradiated from the reflective surfaces 1120 to be different in order to expand the scan field of the lidar device.

In addition, the reflective surfaces 1120 may have a rectangular shape but is not limited thereto and may have various other shapes such as a triangular shape and a trapezoidal shape.

In addition, the body 1110 may be configured to support the reflective surfaces 1120 and may include the upper portion 1112, the lower portion 1111, and a column 1113 connecting the upper portion 1112 and the lower portion 1111. In this case, the column 1113 may be installed to connect centers of the upper portion 1112 and the lower portion 1111 of the body 1110, may be installed to connect each vertex of the upper portion 1112 and the lower portion 1111 of the body 1110, or may be installed to connect each corner of the upper portion 1112 and the lower portion 1111 of the body 1110, but the column 1113 may have any other structure capable of connecting and supporting the upper portion 1112 and the lower portion 1111 of the body 1110 without limitations.

In addition, the body 1110 may be engaged with a driver 1140 to receive a driving force for rotation, may be engaged with the driver 1140 via the lower portion 1111 of the body 1110, or may be engaged with the driver 1140 via the upper portion 1112 of the body 1110.

In addition, the upper portion 1112 and the lower portion 1111 of the body 1110 may have a polygon shape. In this case, the shapes of the upper portion 1112 of the body 1110 and the lower portion 1111 of the body 1110 may be the same, but embodiments are not limited thereto, and the shapes of the upper portion 1112 of the body 1110 and the lower portion 1111 of the body 1110 may also be different from each other.

In addition, sizes of the upper portion 1112 and the lower portion 1111 of the body 1110 may be the same. However, embodiments are not limited thereto, and the sizes of the upper portion 1112 of the body 1110 and the lower portion 1111 of the body 1110 may also be different from each other.

In addition, the upper portion 1112 and/or the lower portion 1111 of the body 1110 may include empty space through which air may pass.

Although the rotating polygon mirror 1100 is illustrated in FIG. 5 to have a hexahedral shape which is in the form of a quadrangular column including four reflective surfaces 1120, the number of reflective surfaces 1120 of the rotating polygon mirror 1100 is not necessarily four, and the rotating polygon mirror 1100 does not necessarily have the hexahedral shape in the form of the quadrangular column.

In addition, to detect a rotating angle of the rotating polygon mirror 1100, the lidar device may further include an encoder. The lidar device may control an operation of the rotating polygon mirror 1100 using the detected rotating angle. In this case, the encoder may be included in the rotating polygon mirror 1100 or disposed to be spaced apart from the rotating polygon mirror 1100.

The FOV required for the lidar device may vary according to purposes of use of the lidar device. For example, as wide a FOV as possible in the vertical and horizontal directions may be required in the case of a fixed type lidar device used for 3D mapping, and a relatively narrower FOV may be required in the vertical direction in comparison to a relatively wide FOV in the horizontal direction in the case of a lidar device disposed in a vehicle. Also, as wide a FOV as possible in the vertical and horizontal directions may be required for a lidar device disposed in a drone.

In addition, the scan field of the lidar device may be determined on the basis of the number of reflective surfaces of the rotating polygon mirror, and accordingly, the FOV of the lidar device may be determined. Therefore, the number of reflective surfaces of the rotating polygon mirror may be determined on the basis of the required FOV of the lidar device.

Figure 6:
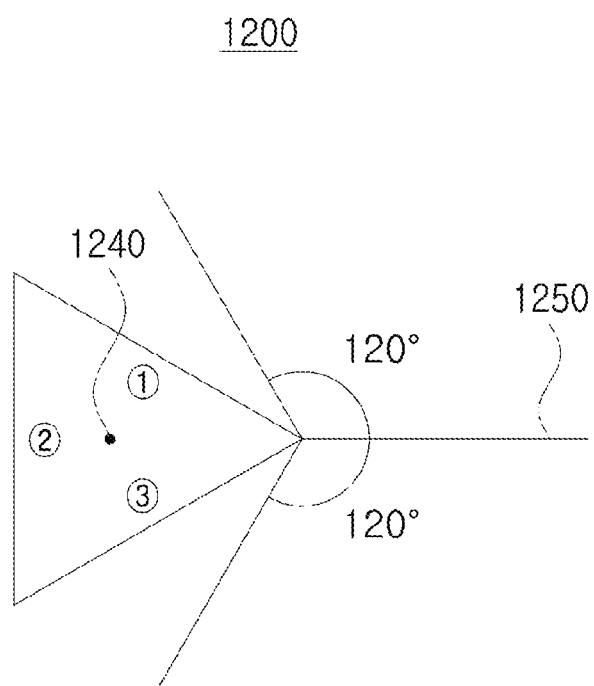
FIGS. 6 to 8 are top views each describing a relationship between numbers of reflection surfaces and a field of view (FOV).
Figure 7:
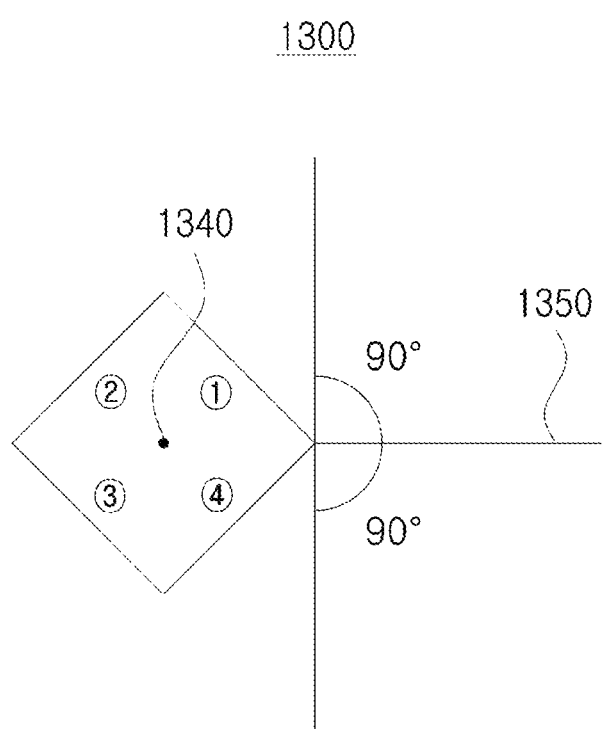
Figure 8:
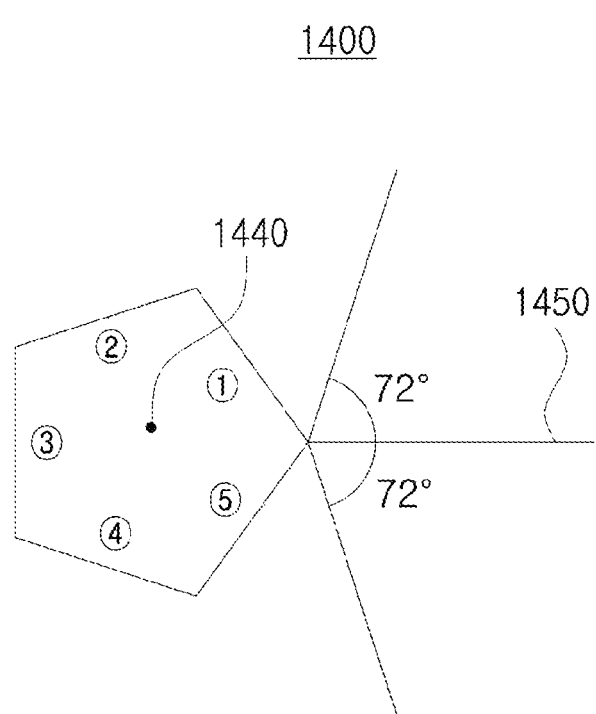

FIGS. 6 to 8 are views for describing the relationship between the number of reflective surfaces and the FOV.

The cases in which the number of reflective surfaces is three, four, and five will be described with reference to FIGS. 6 to 8, respectively, but the number of reflective surfaces is not limited thereto, and the FOV may be easily calculated by analogy with the following description even when the number of reflective surfaces is none of the above. Also, the cases in which the upper portion and the lower portion of the body have a regular polygon shape will be described with reference to FIGS. 6 to 8, but the FOV may be easily calculated by analogy with the following description even when the upper portion and the lower portion of the body do not have a regular polygon shape.

FIG. 6 is a top view for describing a FOV of a rotating polygon mirror 1200 which has three reflective surfaces and a body having an upper portion and a lower portion each formed in the shape of an equilateral triangle.

Referring to FIG. 6, laser light 1250 may be incident in a direction coinciding with a rotating shaft 1240 of the rotating polygon mirror 1200. Here, since an upper portion of the rotating polygon mirror 1200 has the shape of an equilateral triangle, angles formed between the three reflective surfaces may be 60°. Also, referring to FIG. 6, when the rotating polygon mirror 1200 is disposed in a state in which it is slightly rotated clockwise, laser light may be reflected upward in the drawing, and when the rotating polygon mirror 1200 is disposed in a state in which it is slightly rotated counterclockwise, laser light may be reflected downward in the drawing. Therefore, when a path of reflected laser light is calculated by referring to FIG. 6, a maximum FOV of the rotating polygon mirror is known.

For example, when laser light is reflected via a first reflective surface of the rotating polygon mirror 1200, the reflected laser light may be reflected upward at an angle of 120° with the incident laser light 1250. Also, when laser light is reflected via a third reflective surface of the rotating polygon mirror, the reflected laser light may be reflected downward at an angle of 120° with the incident laser light.

Therefore, when the number of reflective surfaces of the rotating polygon mirror 1200 is three and the upper portion and the lower portion of the body have the shape of an equilateral triangle, the maximum FOV of the rotating polygon mirror may be 240°.

FIG. 7 is a top view for describing a FOV of a rotating polygon mirror which has four reflective surfaces and a body having an upper portion and a lower portion each formed in the shape of a square.

Referring to FIG. 7, laser light 1350 may be incident in a direction coinciding with a rotating shaft 1340 of a rotating polygon mirror 1300. Here, since an upper portion of the rotating polygon mirror 1300 has the shape of a square, angles formed between the four reflective surfaces may be 90°. Also, referring to FIG. 7, when the rotating polygon mirror 1300 is disposed in a state in which it is slightly rotated clockwise, laser light may be reflected upward in the drawing, and when the rotating polygon mirror 1300 is disposed in a state in which it is slightly rotated counterclockwise, laser light may be reflected downward in the drawing. Therefore, when a path of reflected laser light is calculated by referring to FIG. 7, a maximum FOV of the rotating polygon mirror 1300 is known.

For example, when laser light is reflected via a first reflective surface of the rotating polygon mirror 1300, the reflected laser light may be reflected upward at an angle of 90° with the incident laser light 1350. Also, when laser light is reflected via a fourth reflective surface of the rotating polygon mirror 1300, the reflected laser light may be reflected downward at an angle of 90° with the incident laser light 1350.

Therefore, when the number of reflective surfaces of the rotating polygon mirror 1300 is four and the upper portion and the lower portion of the body have the shape of a square, the maximum FOV of the rotating polygon mirror 1300 may be 180°.

FIG. 8 is a top view for describing a FOV of a rotating polygon mirror which has five reflective surfaces and a body having an upper portion and a lower portion each formed in the shape of a regular pentagon.

Referring to FIG. 8, laser light 1450 may be incident in a direction coinciding with a rotating shaft 1440 of a rotating polygon mirror 1400. Here, since an upper portion of the rotating polygon mirror 1400 has the shape of a regular pentagon, angles formed between the five reflective surfaces may be 108°. Also, referring to FIG. 8, when the rotating polygon mirror 1400 is disposed in a state in which it is slightly rotated clockwise, laser light may be reflected upward in the drawing, and when the rotating polygon mirror 1400 is disposed in a state in which it is slightly rotated counterclockwise, laser light may be reflected downward in the drawing. Therefore, when a path of reflected laser light is calculated by referring to FIG. 8, a maximum FOV of the rotating polygon mirror is known.

For example, when laser light is reflected via a first reflective surface of the rotating polygon mirror 1400, the reflected laser light may be reflected upward at an angle of 72° with the incident laser light 1450. Also, when laser light is reflected via a fifth reflective surface of the rotating polygon mirror 1400, the reflected laser light may be reflected downward at an angle of 72° with the incident laser light 1450.

Therefore, when the number of reflective surfaces of the rotating polygon mirror 1400 is five and the upper portion and the lower portion of the body have the shape of a regular pentagon, the maximum FOV of the rotating polygon mirror may be 144°.

As a result, referring to FIGS. 6 to 8 described above, in the case in which the number of reflective surfaces of the rotating polygon mirror is N and the upper portion and the lower portion of the body have the shape of a polygon having N sides, if an internal angle of the polygon having N sides is θ, the maximum FOV of the rotating polygon mirror may be (360°-2θ).

However, since the above-described FOV of the rotating polygon mirror is merely a calculated maximum value, a FOV determined by the rotating polygon mirror in the lidar device may be smaller than the calculated maximum value. Also, in this case, the lidar device may only use a portion of each reflective surface of the rotating polygon mirror in scanning.

Figure 9:
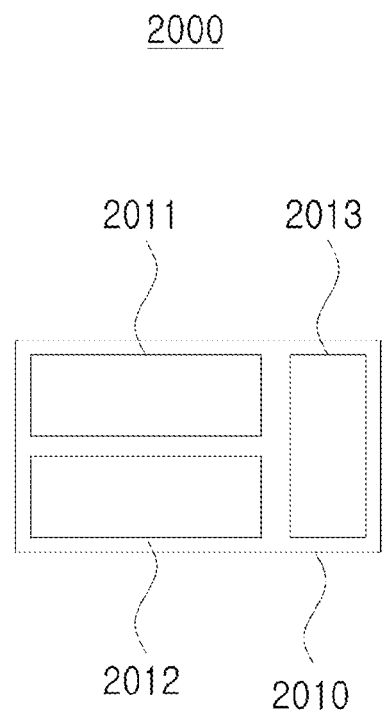
FIG. 9 is a view describing a LiDAR device according to an embodiment.

FIG. 9 is a view describing a LiDAR device according to an embodiment. With reference to FIG. 9, the LiDAR device 2000 according to the embodiment may include a laser emitting unit 2010, wherein the laser emitting unit 2010 may include at least two or more laser output elements 2011 and 2012 and an optic unit 2013.

At this time, the at least two or more laser output elements 2011 and 2012 may include a first laser output element 2011 and a second laser output element 2012 but are not limited thereto and may further include a third laser output element, a fourth laser output element, and the like.

In addition, the first and second laser output elements 2011 and 2012 may output lasers of a specific wavelength band. For example, the first and second laser output elements 2011 and 2012 may output lasers of a 905 nm wavelength band but are not limited thereto and may output lasers of various wavelength bands, such as a 1550 nm wavelength band and the like.

In addition, the first and second laser output elements 2011 and 2012 may output the lasers of the same wavelength band. For example, the first and second laser output elements 2011 and 2012 may equally output the lasers of the 905 nm wavelength band but are not limited thereto and may equally output the lasers of various wavelength bands such as a laser of a 1550 nm wavelength band and the like.

In addition, the first and second laser output elements 2011 and 2012 may output the lasers of different wavelength bands. For example, the first and second laser output elements 2011 and 2012 may output the lasers of 905 nm and 1550 nm wavelength bands, respectively, but are not limited thereto and may also output the lasers of wavelength bands that are different from each other by about 20 to 30 nm, respectively.

In addition, the first and second laser output elements 2011 and 2012 may output the lasers under the same operating conditions. For example, the first and second laser output elements 2011 and 2012 may output lasers having a wavelength of 905 nm at a first temperature, respectively, but is not limited thereto.

In addition, the first and second laser output elements 2011 and 2012 may output the lasers under different operating conditions. For example, the first laser output element 2011 may output a laser of a 905 nm wavelength band at a first temperature, and the second laser output element 2012 may output a laser of a 905 nm wavelength band at a second temperature. However, the present disclosure is not limited thereto.

In addition, the first and second laser output elements 2011 and 2012 may operate to output the lasers at the same time point. For example, the first and second laser output elements 2011 and 2012 may output the first and second lasers, respectively, at a first time point, but is not limited thereto.

In addition, the first and second laser output elements 2011 and 2012 may operate to output the lasers at time points different from each other. For example, the first laser output element 2011 may operate to output a first laser at a first time point, and the second laser may operate to output a second laser at a second time point different from the first time point, but the present disclosure is not limited thereto.

In addition, the optic unit 2013 may collimate the lasers output from the first and second laser output elements 2011 and 2012. For example, the optic unit 2013 includes a bulk lens and, using the bulk lens, may collimate the lasers output from the first and second laser output elements 2011 and 2012, respectively, but is not limited thereto. In other words, the optic unit 2013 may include a first collimation lens configured to collimate the lasers output from the first laser output element 2011 and a second collimation lens configured to collimate the lasers output from the second laser output element 2012 and, using the collimation lenses, may collimate each of the lasers.

In addition, the optic unit 2013 may include an optic element configured to align the lasers output from the first and second laser output elements 2011 and 2012. For example, the optic unit 2013 includes a Risley prism and, using the prism, may align the lasers output from the first and second laser output elements 2011 and 2012, but is not limited thereto.

In addition, the optic unit 2013 may include an optic element for reducing a distance between centers of the lasers output from the first and second laser output elements 2011 and 2012. For example, the optic unit 2013 may include a prism and the like for reducing the distance between the centers of the lasers output from the first and second laser output elements 2011 and 2012.

Figure 10:
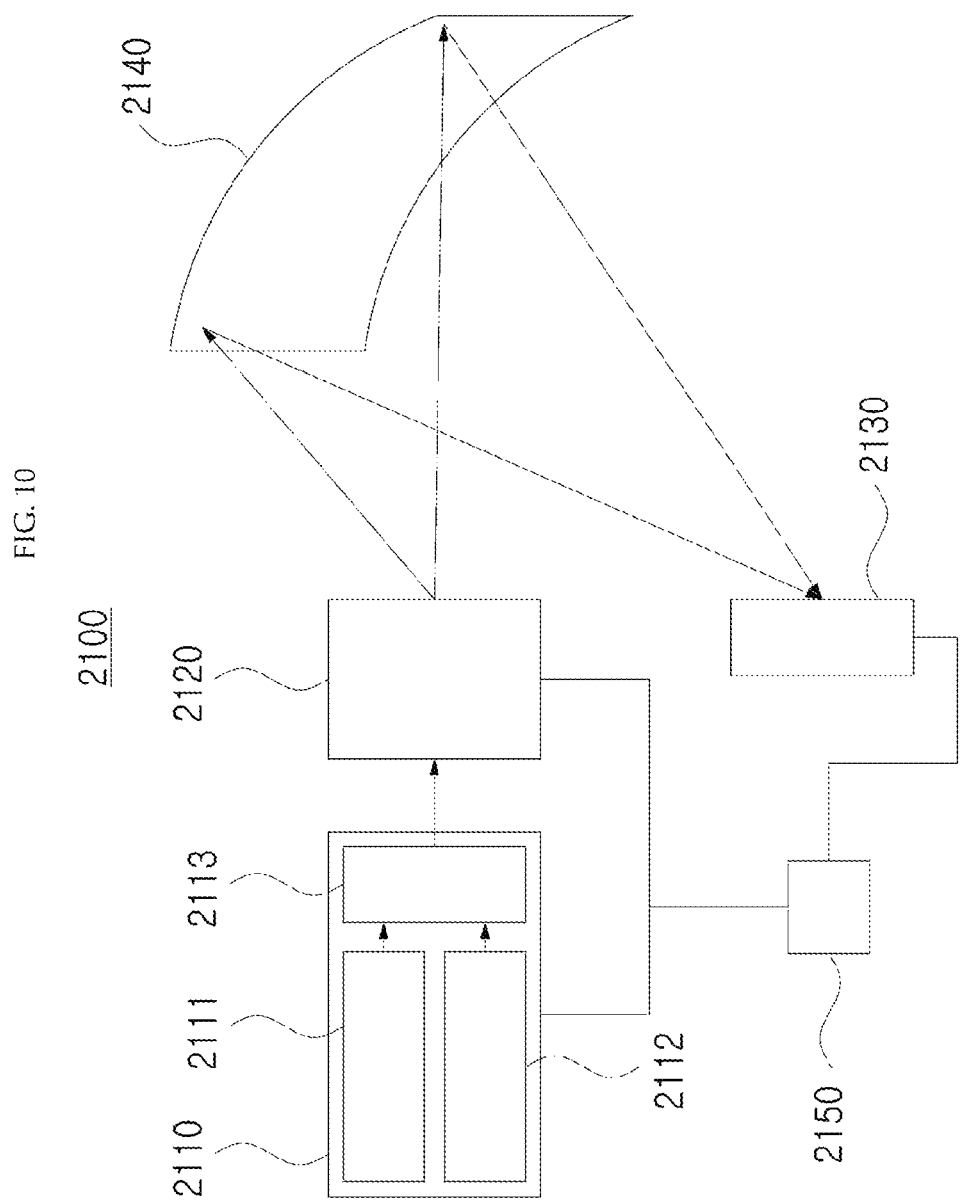
FIG. 10 is a view describing a LiDAR device according to an embodiment.

FIG. 10 is a view describing a LiDAR device according to an embodiment.

With reference to FIG. 10, a LiDAR device 2100 according to an embodiment may include a laser emitting unit 2110, a scanning unit 2120, a detecting unit 2130, and a controller 2150 but is not limited thereto and may include some of such configurations or further include other configurations.

More specifically, the LiDAR device 2100 may include a laser emitting unit 2110, wherein the laser emitting unit 2110 may include a first laser output element 2111, a second laser output element 2112, and an optic unit 2113.

In this case, the above-described contents may be applied to the first laser output element 2111, the second laser output element 2112, and the optic unit 2113, so overlapping descriptions will be omitted.

A first laser output from the first laser output element 2111 may be radiated out to the scanning unit 2120 through the optic unit 2113, and a second laser output from the second laser output element 2112 may be radiated out the scanning unit 2120 through the optic unit 2113.

In this case, the scanning unit 2120 may form a field of view (FOV) 2140 of the LiDAR device using the first and second lasers but is not limited thereto.

For example, the scanning unit 2120 may change a flight path of the first laser having been output at a first time point, thereby irradiating a first position with the first laser and forming a first laser FOV on the first position. In addition, the scanning unit 2120 may change a flight path of the first laser having been output at a second time point, thereby irradiating a second position with the first laser and forming a first laser FOV on the second position.

Accordingly, the scanning unit 2120 may form the first laser FOV using the first laser output at a specific time point and the FOV 2140 of the LiDAR device using the first laser output for a predetermined period of time.

In addition, the scanning unit 2120 may change a flight path of the second laser having been output at the first time point, thereby irradiating the first position with the second laser and forming a second laser FOV on the first position. In addition, the scanning unit 2120 may change a flight path of the second laser having been output at the second time point, thereby irradiating a second position with the second laser and forming a second laser FOV on the second position.

Accordingly, the scanning unit 2120 may form the second laser FOV using the second laser output at a specific time point and the FOV 2140 of the LiDAR device using the second laser output for a predetermined period of time.

In this case, the scanning unit 2120 may include various configurations in order to change the flight paths of the first and second lasers by obtaining the first and second lasers. For example, the scanning unit 2120 may include one or more of a rotating mirror (nodding mirror, polygon mirror, and the like) for changing the flight path by reflecting the first and second lasers, an optical phased array (OPA) for changing the flight path using a phase difference between the first and second lasers, and an optic element for steering the first and second lasers but is not limited thereto.

In addition, the detecting unit 2130 may obtain at least a portion of the laser reflected or scattered from the object located within the FOV 2140 of the LiDAR device.

More specifically, the detecting unit 2130 may include at least one detector, and the at least one detector may form a detecting unit FOV for receiving the laser at a specific time point. For example, the at least one detector may form a detecting unit FOV for receiving the laser reflected from the first position at the first time point.

Accordingly, the detecting unit 2130 may obtain at least a portion of the laser reflected or scattered from at least a portion of the object located within the FOV 2140 of the LiDAR device and located within the detecting unit FOV.

In addition, the first laser output from the first laser output element 2111 at the first time point is radiated out to the scanning unit 2120 through the optic unit 2113, the first laser radiated out to the scanning unit 2120 is radiated out to the first position to form the first laser FOV, and the first laser reflected at the first position may be obtained from the detecting unit having the detecting unit FOV that at least partially overlaps with the first laser FOV.

In addition, the second laser output from the second laser output element 2112 at the second time point is radiated out to the scanning unit 2120 through the optic unit 2113, the second laser radiated out to the scanning unit 2120 is radiated out to the second position to form the second laser FOV, and the second laser reflected at the second position may be obtained from the detecting unit having the detecting unit FOV that at least partially overlaps with the second laser FOV.

In addition, the controller 2150 may control the operation of at least one of the laser emitting unit 2110, the scanning unit 2120, and the detecting unit 2130 or may obtain distance information to the object on the basis of the laser output from the laser emitting unit 2110 and obtained from the detecting unit.

In addition, the controller 2150 may control the operation of the laser emitting unit 2110 on the basis of whether the distance information is obtained. For example, the controller 2150 may operate the first laser output element 2111 at the first time point, thereby allowing the first laser to be output. When the first laser, radiated out to the first position through the scanning unit 2120, is reflected from a first object and obtained by the detecting unit 2130, whereby the distance information to the first object is obtained, the controller 2150 may operate the first laser output element 2111 at the second time point, thereby allowing the first laser to be radiated out to the first position. In addition, when the first laser, radiated out to the first position through the scanning unit 2120, is not obtained by the detecting unit 2130, the controller 2150 may operate the first and second laser output element 2111 and 2112 at the second time point, thereby allowing the first and second lasers to be radiated out to the first position. However, the present disclosure is not limited thereto.

In addition, the controller 2150 may control the operation of the laser emitting unit 2110 on the basis of whether the distance information is obtained. For example, the controller 2150 may operate the first laser output element 2111 at the first time point, thereby allowing the first laser to be output. When the first laser, radiated out to the first position through the scanning unit 2120, is reflected from a first object and obtained by the detecting unit 2130, whereby the distance information to the first object is obtained, the controller 2150 may operate the first laser output element 2111 at the second time point, thereby allowing the first laser to be radiated out to the first position. In addition, when the first laser, radiated out to the first position through the scanning unit 2120, is not obtained by the detecting unit 2130, the controller 2150 may operate the second laser output element 2112 at the second time point, thereby allowing the second laser to be radiated out to the first position. However, the present disclosure is not limited thereto. In this case, the first laser output element 2111 may output a laser of a 905 nm wavelength band, and the second laser output element 2112 may output a laser of a 1550 nm wavelength band, but the present disclosure is not limited thereto.

In addition, the controller 2150 may control the operation of the laser emitting unit 2110 on the basis of temperature information. For example, the controller 2150 may obtain operating temperature information, thereby operating the first laser output element 2111 when the current operating temperature is the first temperature and operating the second laser output element 2112 when the current operating temperature is the second temperature, but the present disclosure is not limited thereto. In this case, the first laser output element 2111 may output the laser of a 905 nm wavelength band at the first temperature, and the second laser output element 2112 may output the laser of a 905 nm wavelength band at the second temperature, but the present disclosure is not limited thereto.

In addition, the controller 2150 may control the operation of the laser emitting unit 2110 on the basis of sequence information. In this case, the sequence information may correspond to frame information forming the FOV of the LiDAR device. For example, the controller 2150 may operate only one of the first and second laser output elements 2111 and 2112 for irradiating the first position with the laser at the first time point within a first sequence, may operate only one of the first and second laser output elements 2111 and 2112 for irradiating the first position with the laser at the second time point within a second sequence, and may operate both the first and second laser output elements 2111 and 2112 for irradiating the first position with the laser at the third time point within a third sequence, but the present disclosure is not limited thereto. In addition, the controller 2150 may, at a plurality of time points within a plurality of sequence, operate only any one or both of the first and second laser output elements 2111 and 2112 for irradiating the first position with the laser.

In addition, the controller 2150 may control the operation of the laser emitting unit 2110 on the basis of sequence information. In this case, the sequence information may correspond to frame information forming the FOV of the LiDAR device. For example, the controller 2150 may operate only one of the first and second laser output elements 2111 and 2112 during the first sequence for forming the first frame and may operate both the first and second laser output elements 2111 and 2112 during the second sequence for forming the second frame. In this case, two figures constituting a ratio of the sequence, of operating one of the first and second laser output elements 2111 and 2112, to the sequence, of operating both the first and second laser output elements 2111 and 2112, may be equal to each other, different from each other, or changed on the basis of surrounding circumstances.

For example, the ratio of the sequence of operating one of the first and second laser output elements 2111 and 2112 to the sequence of operating both the first and second laser output elements 2111 and 2112 may be 1:1, 2:1, 3:1, 4:1, 5:1, 6:1, 7:1, 8:1, 9:1, 10:1, 20:1, 100:1, or the like. However, the present disclosure is not limited thereto and may have various ratios, and the ratio of the sequences may be changed according to the speed of the vehicle, the congestion situation of the road, and the like.

Figure 11:
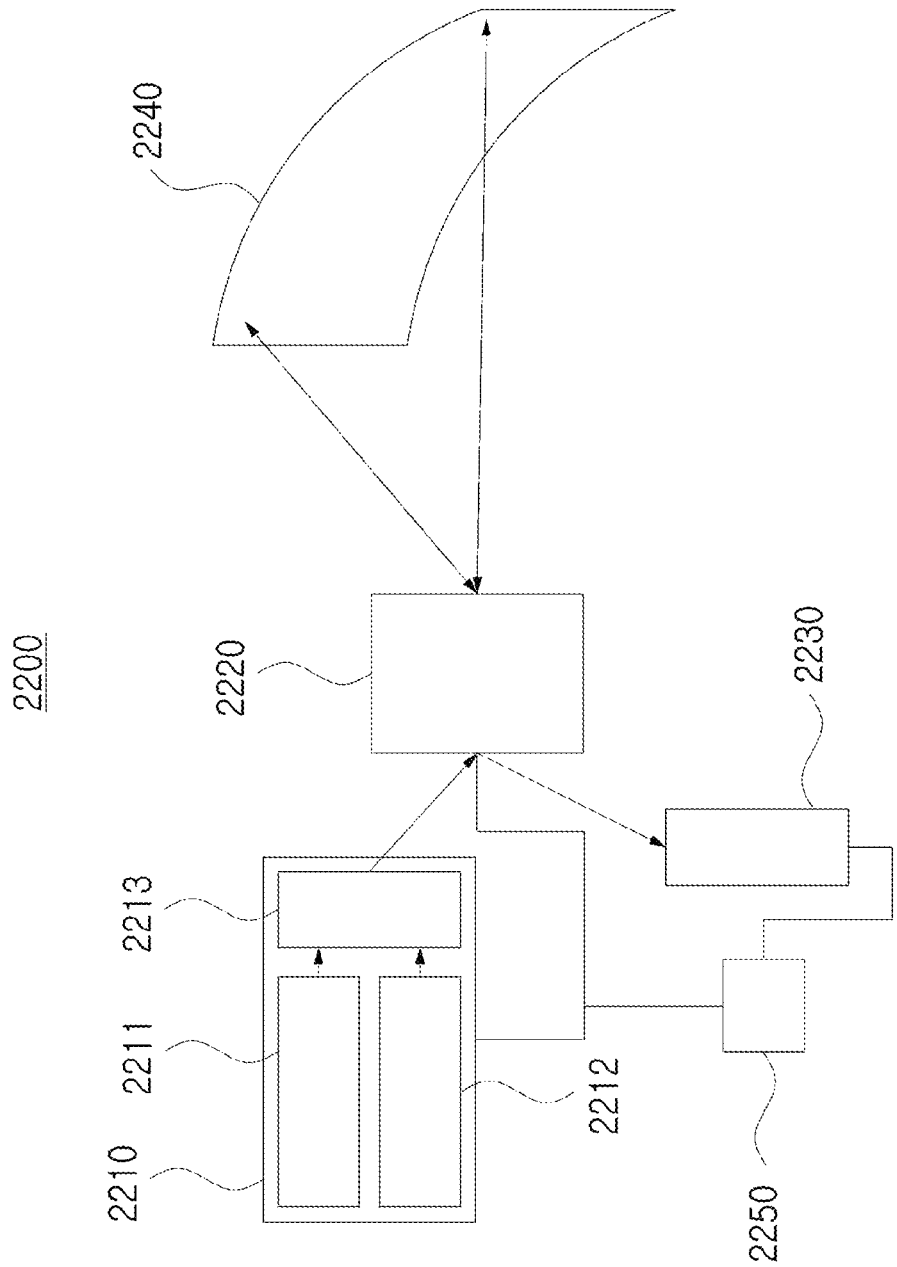
FIG. 11 is a view describing a LiDAR device according to an embodiment.

FIG. 11 is a view describing a LiDAR device according to an embodiment.

With reference to FIG. 11, a LiDAR device 2200 according to an embodiment may include a laser emitting unit 2210, a scanning unit 2220, a detecting unit 2230, and a controller 2250 but is not limited thereto and may include some of such configurations or further include other configurations.

More specifically, the LiDAR device 2200 may include the laser emitting unit 2210, wherein the laser emitting unit 2210 may include a first laser output element 2211, a second laser output element 2212, and an optic unit 2213.

In this case, the above-described contents may be applied to the first laser output element 2211, the second laser output element 2212, and the optic unit 2213, so overlapping descriptions will be omitted.

A first laser output from the first laser output element 2211 may be radiated out to the scanning unit 2220 through the optic unit 2213, and a second laser output from the second laser output element 2212 may be radiated out to the scanning unit 2220 through the optic unit 2213.

In this case, the scanning unit 2220 may form a field of view (FOV) 2240 of the LiDAR device using the first and second lasers but is not limited thereto.

For example, the scanning unit 2220 may change a flight path of the first laser having been output at a first time point, thereby irradiating a first position with the first laser and forming a first laser FOV on the first position. In addition, the scanning unit 2120 may change a flight path of the first laser having been output at a second time point, thereby irradiating a second position with the first laser and forming a first laser FOV on the second position.

Accordingly, the scanning unit 2220 may form the first laser FOV using the first laser output at a specific time point and the FOV 2240 of the LiDAR device using the first laser output for a predetermined period of time.

In addition, the scanning unit 2220 may change a flight path of the second laser having been output at the first time point, thereby irradiating the first position with the second laser and forming a second laser FOV on the first position. In addition, the scanning unit 2120 may change a flight path of the second laser having been output at the second time point, thereby irradiating a second position with the second laser and forming a second laser FOV on the second position.

Accordingly, the scanning unit 2220 may form the second laser FOV using the second laser output at a specific time point and the FOV 2240 of the LiDAR device using the second laser output for a predetermined period of time.

In this case, the scanning unit 2220 may include various configurations in order to change the flight paths of the first and second lasers by obtaining the first and second lasers. For example, the scanning unit 2220 may include one or more of a rotating mirror (nodding mirror, polygon mirror, and the like) for changing the flight path by reflecting the first and second lasers, an optical phased array (OPA) for changing the flight path using a phase difference between the first and second lasers, and an optic element for steering the first and second lasers but is not limited thereto.

In addition, the detecting unit 2230 may obtain at least a portion of the laser reflected or scattered from the object located within the FOV 2240 of the LiDAR device.

More specifically, the detecting unit 2230 may include at least one detector, and the at least one detector may form a detecting unit FOV for receiving the laser at a specific time point. For example, the at least one detector may form a detecting unit FOV for receiving the laser reflected from the first position at the first time point.

Accordingly, the detecting unit 2230 may obtain at least a portion of the laser reflected or scattered from at least a portion of the object located within the FOV 2240 of the LiDAR device and located within the detecting unit FOV.

In addition, the detecting unit 2230 obtains at least a portion of the laser reflected or scattered from the object through the scanning unit 2220, so the detecting unit FOV formed by the at least one detector may be changed by the scanning unit 2220. For example, the detecting unit FOV formed by the first detecting unit at the first time point may be formed at the first position, but the detecting unit FOV formed by the first detecting unit at the second time point may be formed at the second position. In addition, the first position and the second position may become different by the scanning unit 2220.

In addition, the first laser output from the first laser output element 2211 at the first time point is radiated out to the scanning unit 2220 through the optic unit 2213, the first laser radiated out to the scanning unit 2220 is radiated out to the first position to form the first laser FOV, and the first laser reflected at the first position may be obtained from the detecting unit having the detecting unit FOV that at least partially overlaps with the first laser FOV.

In addition, the second laser output from the second laser output element 2212 at the second time point is radiated out to the scanning unit 2220 through the optic unit 2213, the second laser radiated out to the scanning unit 2220 is radiated out to the second position to form the second laser FOV, and the second laser reflected at the second position may be obtained from the detecting unit having the detecting unit FOV that at least partially overlaps with the second laser FOV.

In addition, the controller 2250 may control the operation of at least one of the laser emitting unit 2210, the scanning unit 2220, and the detecting unit 2230 or may obtain distance information to the object on the basis of the laser output from the laser emitting unit 2210 and obtained from the detecting unit.

In addition, the controller 2250 may control the operation of the laser emitting unit 2210 on the basis of whether the distance information is obtained. For example, the controller 2250 may operate the first laser output element 2211 at the first time point, thereby allowing the first laser to be output. When the first laser, radiated out to the first position through the scanning unit 2220, is reflected from a first object and obtained by the detecting unit 2230, whereby the distance information to the first object is obtained, the controller 2250 may operate the first laser output element 2211 at the second time point, thereby allowing the first laser to be radiated out to the first position. In addition, when the first laser, radiated out to the first position through the scanning unit 2220, is not obtained by the detecting unit 2230, the controller 2250 may operate the first and second laser output elements 2211 and 2212 at the second time point, thereby allowing the first and second lasers to be radiated out to the first position. However, the present disclosure is not limited thereto.

In addition, the controller 2250 may control the operation of the laser emitting unit 2210 on the basis of whether the distance information is obtained. For example, the controller 2250 may operate the first laser output element 2211 at the first time point, thereby allowing the first laser to be output. When the first laser, radiated out to the first position through the scanning unit 2220, is reflected from a first object and obtained by the detecting unit 2230, whereby the distance information to the first object is obtained, the controller 2250 may operate the first laser output element 2211 at the second time point, thereby allowing the first laser to be radiated out to the first position. In addition, when the first laser, radiated out to the first position through the scanning unit 2220, is not obtained by the detecting unit 2230, the controller 2250 may operate the second laser output element 2212 at the second time point, thereby allowing the second laser to be radiated out to the first position. However, the present disclosure is not limited thereto. In this case, the first laser output element 2211 may output a laser of a 905 nm wavelength band, and the second laser output element 2212 may output a laser of a 1550 nm wavelength band, but the present disclosure is not limited thereto.

In addition, the controller 2250 may control the operation of the laser emitting unit 2210 on the basis of temperature information. For example, the controller 2150 may obtain operating temperature information, thereby operating the first laser output element 2111 when the current operating temperature is the first temperature and operating the second laser output element 2112 when the current operating temperature is the second temperature, but the present disclosure is not limited thereto. In this case, the first laser output element 2211 may output the laser of a 905 nm wavelength band at the first temperature, and the second laser output element 2212 may output the laser of a 905 nm wavelength band at the second temperature, but the present disclosure is not limited thereto.

In addition, the controller 2250 may control the operation of the laser emitting unit 2210 on the basis of sequence information. In this case, the sequence information may correspond to frame information forming the FOV of the LiDAR device. For example, the controller 2250 may operate only one of the first and second laser output elements 2211 and 2212 for irradiating the first position with the laser at the first time point within a first sequence, may operate only one of the first and second laser output elements 2211 and 2212 for irradiating the first position with the laser at the second time point within a second sequence, and may operate both the first and second laser output elements 2211 and 2212 for irradiating the first position with the laser at the third time point within a third sequence, but the present disclosure is not limited thereto. In addition, the controller 2250 may, at a plurality of time points within a plurality of sequence, operate only any one or both of the first and second laser output elements 2211 and 2212 for irradiating the first position with the laser.

In addition, the controller 2250 may control the operation of the laser emitting unit 2210 on the basis of sequence information. In this case, the sequence information may correspond to frame information forming the FOV of the LiDAR device. For example, the controller 2250 may operate only one of the first and second laser output elements 2211 and 2212 during the first sequence for forming the first frame and may operate both the first and second laser output elements 2211 and 2212 during the second sequence for forming the second frame. In this case, two figures constituting a ratio of the sequence, of operating one of the first and second laser output elements 2211 and 2212, to the sequence, of operating both the first and second laser output elements 2211 and 2212, may be equal to each other, different from each other, or changed on the basis of surrounding circumstances.

For example, the ratio of the sequence of operating one of the first and second laser output elements 2211 and 2212 to the sequence of operating both the first and second laser output elements 2211 and 2212 may be 1:1, 2:1, 3:1, 4:1, 5:1, 6:1, 7:1, 8:1, 9:1, 10:1, 20:1, 100:1, and the like. However, the present disclosure is not limited thereto and may have various ratios, and the ratio of the sequence may be changed according to the speed of the vehicle, the congestion situation of the road, and the like.

Figure 12:
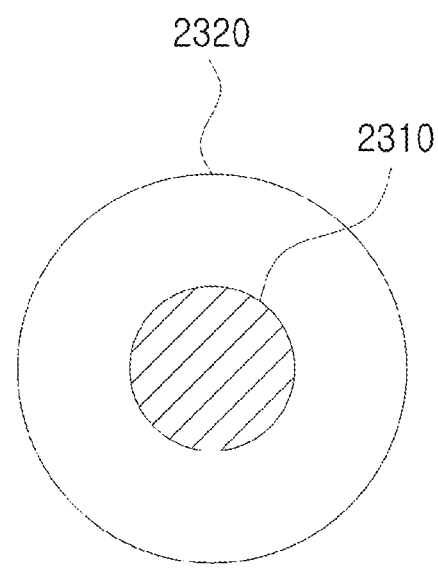
FIG. 12 is a view describing a laser field of view (FOV) and a detecting unit FOV formed at a specific time point.

FIG. 12 is a view describing a laser field of view (FOV) and a detecting unit FOV formed at a specific time point.

With reference to FIG. 12, a field of view (FOV) formed according to an embodiment at a specific time point may include a laser FOV 2310 and a detecting unit FOV 2320.

In this case, the laser FOV 2310 may refer to an area irradiated by the laser the LiDAR device radiated out at a specific time point and may refer to an area where the laser the LiDAR device radiated out may be reflected by an object and the like. However, the present disclosure is not limited thereto.

In addition, the laser FOV 2310 may be formed by the laser radiated out from the LiDAR device and may be formed on the basis of a divergence angle of the laser, a radiation direction of the laser, and the like.

In addition, the detecting unit FOV 2320 may refer to an area capable of receiving light by at least one detecting unit included in the detecting unit, may refer to the area capable of receiving the light by the detecting unit at a specific time point, but is not limited thereto.

In addition, the laser FOV 2310 and the detecting unit FOV 2320 may at least partially overlap with each other. In this case, the laser forming the laser FOV 2310 may be reflected from the object and then received by the detecting unit forming the detecting unit FOV 2320 overlapping at least in part with the laser FOV 2310.

As described in FIG. 12, the detecting unit FOV 2320 may be larger than the laser FOV 2310 but is not limited thereto, and although not described in FIG. 12, the detecting unit FOV 2320 may be the same as or smaller than the laser FOV 2310.

Figure 13:
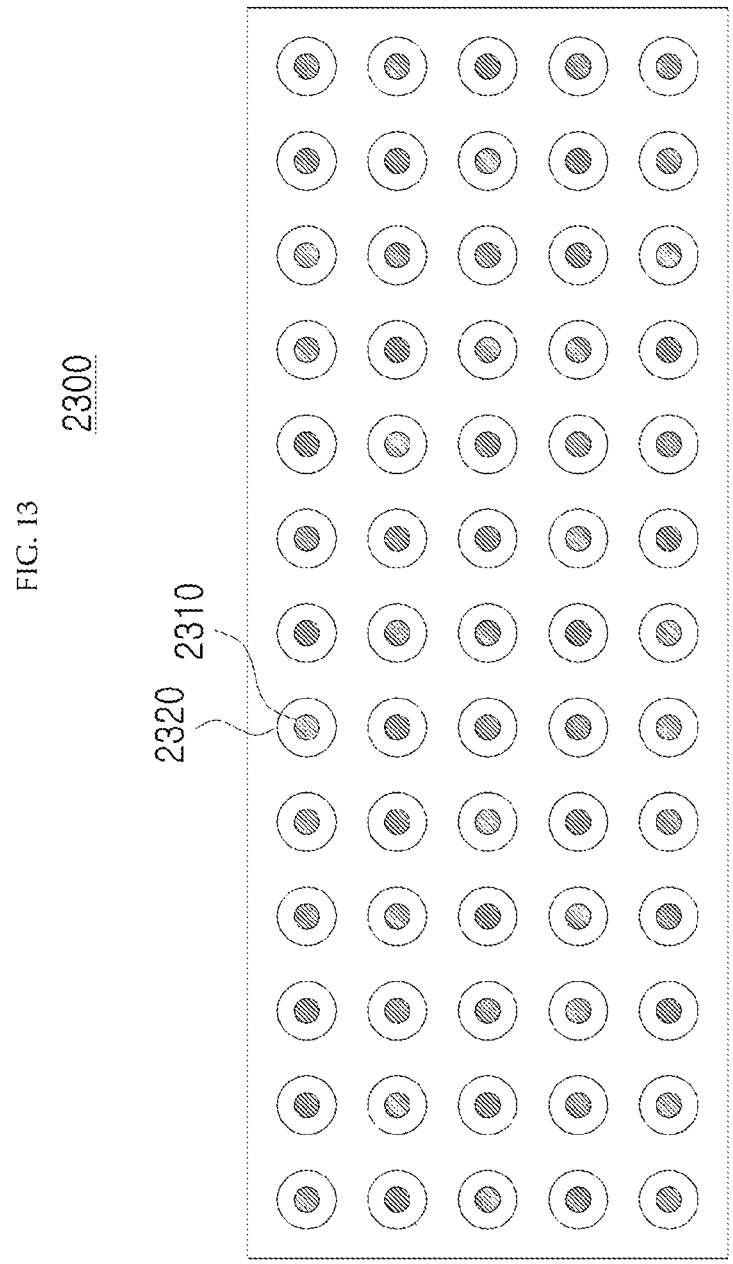
FIG. 13 is a view describing an FOV of a LiDAR device according to an embodiment.

FIG. 13 is a view describing an FOV of a LiDAR device according to an embodiment.

With reference to FIG. 13, an FOV 2300 of the LiDAR device formed according to the embodiment may include at least one laser FOV 2310 and at least one detecting unit FOV 2320.

In this case, the FOV 2300 of the LiDAR device may be formed by the laser FOV 2310 formed by the laser output at one time point and the detecting unit FOV 2320 that at least partially overlaps with the laser FOV 2310.

For example, the LiDAR device may output at least two lasers output in different directions at one time point or diffuse at least one laser to form a laser FOV, thereby forming the laser FOV corresponding to the FOV 2300 of the LIDAR device or forming the detecting unit FOV corresponding to the laser FOV using a detecting unit array and the like, but is not limited thereto.

In addition, the FOV 2300 of the LiDAR device may be formed by the laser FOV 2310 formed by the lasers that are output at, at least, two different time points and the detecting unit FOV 2320 that at least partially overlaps with the laser FOV 2310.

For example, the LiDAR device may output a first laser in a first direction at a first time point and may output a second laser in a second direction at a second time point, thereby, generating a first laser FOV and a second laser FOV using such lasers and generating a first detecting unit FOV and a second detecting unit FOV, respectively, corresponding to the first laser FOV and the second laser FOV. However the present disclosure is not limited thereto.

In addition, the laser FOV 2310 and the detecting unit FOV 2320 may be changed by the movement of the scanning unit but are not limited thereto.

For example, a radiation direction of laser output at one time point may be changed according to the movement of the scanning unit, and thus the laser FOV may be changed.

In addition, for example, an area capable of receiving the laser from the detecting unit at the one time point may be changed according to the movement of the scanning unit, and thus the detecting unit FOV may be changed.

Figure 14:
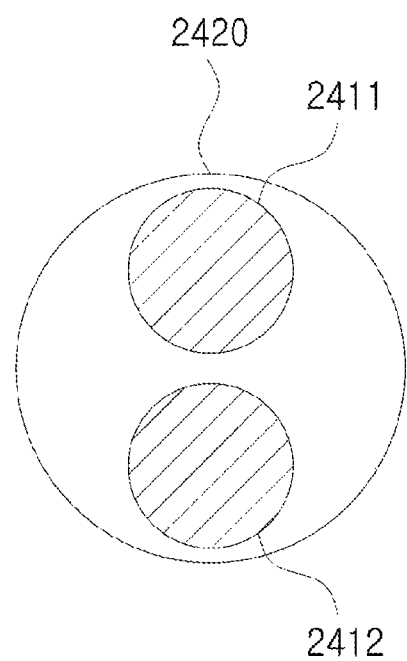
FIG. 14 is a view describing a laser FOV and a detecting unit FOV formed at a specific time point.

FIG. 14 is a view describing a laser FOV and a detecting unit FOV formed at a specific time point.

With reference to FIG. 14, an FOV formed at a specific time point according to an embodiment may include laser FOVs 2411 and 2412 and a detecting unit FOV 2420.

In this case, the above-described contents may be applied to the laser FOVs 2411 and 2412 and the detecting unit FOV 2420, so overlapping descriptions will be omitted.

According to an embodiment, the FOV formed at a specific time point may include one or more laser FOVs 2411 and 2412 and a detecting unit FOV 2420, wherein the detecting unit FOV 2420 may at least partially overlap with the one or more laser FOVs 2411 and 2412.

In addition, a first laser forming a first laser FOV 2411 and a second laser forming a second laser FOV 2412 may be received by a first detecting unit forming the detecting unit FOV 2420.

In addition, as described in FIG. 14, the detecting unit FOV 2420 may be larger than the laser FOVs 2411 and 2412 but is not limited thereto.

In addition, as described in FIG. 14, the first and second laser FOVs 2411 and 2412 may not overlap with each other but are not limited thereto and may at least partially overlap with each other.

Figure 15:
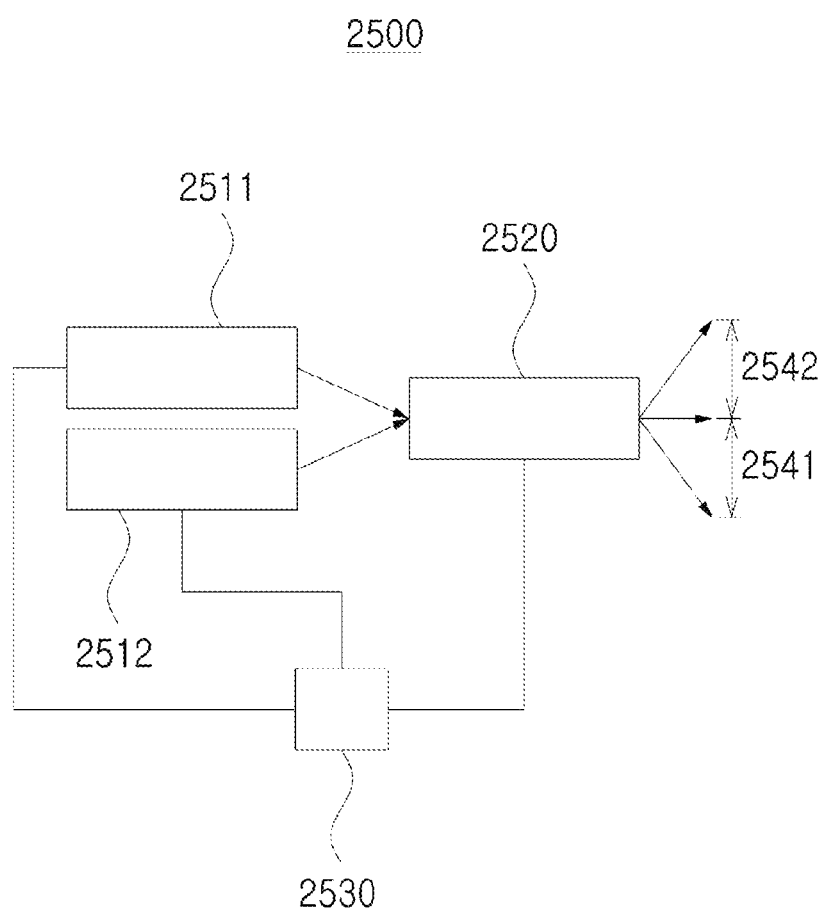
FIG. 15 is a view describing a LiDAR device according to an embodiment.

FIG. 15 is a view describing a LiDAR device according to an embodiment.

With reference to FIG. 15, a LiDAR device 2500 according to an embodiment may include laser emitting units 2511 and 2512, a scanning unit 2520, and a controller 2530 but is not limited thereto and may include some of such configurations or further include other configurations.

More specifically, the laser emitting unit 2511 and 2512 may include a first laser emitting unit 2511 and a second laser emitting unit 2512.

In this case, the first laser emitting unit 2511 and the second laser emitting unit 2512 may be composed of laser emitting devices different from each other but are not limited thereto and may be configured by a method of outputting a plurality of lasers by dividing the laser output from one laser emitting device or may also be configured by a plurality of laser output elements included in one laser emitting device.

The first laser output from the first laser emitting unit 2511 may be radiated out to the scanning unit 2520, and the second laser output from the second laser emitting unit 2512 may be radiated out to the scanning unit 2520.

In this case, the scanning unit 2520 may form a field of view (FOV) 2541 and 2542 of the LiDAR device using the first and second lasers but is not limited thereto.

More specifically, the scanning unit 2520 may form a first FOV 2541 using the first laser and may form a second FOV 2542 using the second laser.

For example, the scanning unit 2520 may change a flight path of the first laser having been output at a first time point, thereby irradiating a first position with the first laser and forming a first laser FOV on the first position. In addition, the scanning unit 2120 may change a flight path of the first laser having been output at a second time point, thereby irradiating a second position with the first laser and forming a first laser FOV on the second position.

Accordingly, the scanning unit 2520 may form the first laser FOV using the first laser output at a specific time point and a first FOV 2541 using the first laser output for a predetermined period of time.

In addition, the scanning unit 2520 may change a flight path of the second laser having been output at a first time point, thereby irradiating the third position with the second laser and forming a second laser FOV on the third position. In addition, the scanning unit 2520 may change a flight path of the second laser having been output at a second time point, thereby irradiating a fourth position with the second laser and forming a second laser FOV on the fourth position.

Accordingly, the scanning unit 2520 may form the second laser FOV using the second laser output at a specific time point and a second FOV 2542 using the second laser output for a predetermined period of time.

In addition, an angle between the first and second lasers radiated out to the scanning unit 2520 may be set so as to allow the first FOV 2541 and the second FOV 2542 to be different from each other.

For example, the angle between the first and second lasers radiated out to the scanning unit 2520 may be set such that the first FOV 2541 and the second FOV 2542 are spaced apart from each other no less than a predetermined distance.

In addition, the scanning unit 2520 may include various configurations in order to change the flight paths of the first and second lasers by obtaining the first and second lasers. For example, the scanning unit 2520 may include one or more of a rotating mirror (nodding mirror, polygon mirror, and the like) for changing the flight path by reflecting the first and second lasers, an optical phased array (OPA) for changing the flight path using a phase difference between the first and second lasers, and an optic element for steering the first and second lasers but is not limited thereto.

In addition, the controller 2530 may control the operation of at least one of the laser emitting units 2511 and 2512 and the scanning unit 2520 or may obtain distance information to the object on the basis of the laser output from the laser emitting units 2511 and 2512.

In addition, the controller 2530 may control the laser emitting units 2511 and 2512 to be independently operated at different time points or to be operated by being synchronized at the same time point.

In addition, the controller 2530 may control at least any one operation of the scanning unit 2520.

For example, when the scanning unit 2520 include a configuration being allowed to be at least partially rotated, the controller 2530 may control the operation of the scanning unit 2520 by changing at least one parameter of the scanning unit 2520 such as a size of a rotation angle, a center of the rotation angle, a rotation speed, and the like of the scanning unit 2520.

Figure 16:
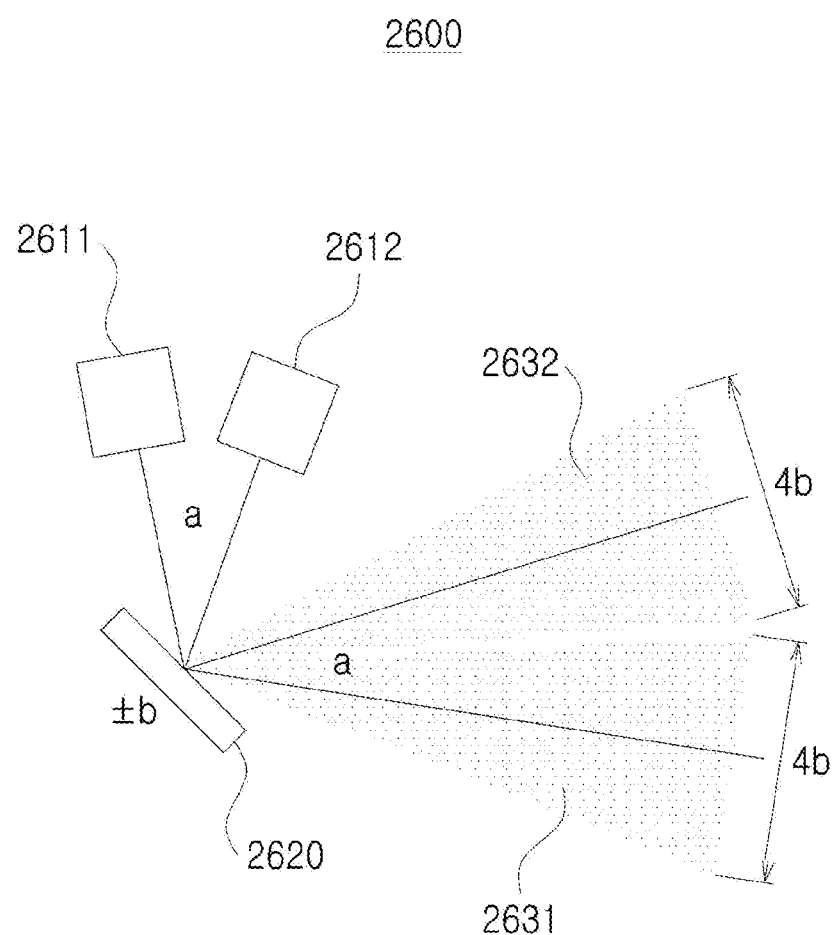
FIG. 16 is a view describing a LiDAR device according to an embodiment.

FIG. 16 is a view describing a LiDAR device according to an embodiment.

With reference to FIG. 16, a LiDAR device 2600 according to an embodiment may include a first laser emitting unit 2611, a second laser emitting unit 2612, and a scanning unit 2620.

In this case, the above-described contents may be applied to the first laser emitting unit 2611 and the second laser emitting unit 2612, so overlapping descriptions will be omitted.

In addition, with reference to FIG. 16, the scanning unit 2620 according to the embodiment may include a nodding mirror configured to rotate within a predetermined angle range but is not limited thereto.

However, for convenience of description, the scanning unit 2620 will be described below using the nodding mirror.

Basically, the scanning unit 2620 may form a field of view (FOV) of the LiDAR device using the first and second lasers output from the first and second laser emitting units 2611 and 2612, respectively. However, the above-described contents may be applied to this, so overlapping descriptions will be omitted.

More specifically, the first laser output from the first laser emitting unit 2611 and the second laser output from the second laser emitting unit 2612 are incident to the scanning unit 2620, and an angle between the first and second lasers incident to the scanning unit 2620 may be at least 'a' angle degrees in a rotation direction of the scanning unit 2620.

This may be to make a difference between the angles at which the first and second lasers are incident, respectively, on the scanning unit 2620 in the rotation direction of the scanning unit 2620 to finally expand the FOV of the LiDAR device.

For example, as described in FIG. 16, when the scanning unit 2620 is nodded in a range of '+b' and '−b' angle degrees based on an offset state, the scanning unit 2620 may form a first FOV 2631 of the LiDAR device having a range of '4b' in the rotation direction of the scanning unit 2620 using the first laser and a second FOV 2632 of the LiDAR device having a range of '4b' in the rotation direction of the scanning unit 2620 using the second laser.

In this case, when the angle formed by the first and second lasers that are incident on the scanning unit 2620 is designed to be at least 'a' angle degrees in the rotation direction of the scanning unit 2620, an angle between a center of the first FOV 2631 and a center of the second FOV 2632 may be spaced apart by at least 'a' angle degrees in the rotation direction of the scanning unit 2620, and through this, the FOV of the LiDAR device may finally be extended.

In addition, for example, as described in FIG. 16, when the scanning unit 2620 is nodded in a range of '+b' and '−b' angle degrees based on the offset state, the scanning unit 2620 may form a first FOV 2631 of the LiDAR device having a range of '4b' angle degrees in a vertical direction using the first laser and a second FOV 2632 of the LiDAR device having a range of '4b' angle degrees in the vertical direction using the second laser.

In this case, when the angle formed by the first and second lasers that are incident on the scanning unit 2620 is designed to be at least 'a' angle degrees in the rotation direction of the scanning unit 2620, an angle between a center of the first FOV 2631 and a center of the second FOV 2632 may be spaced apart by at least 'a' angle degrees in the vertical direction, and through this, the FOV of the LiDAR device may finally be extended.

Figure 17:
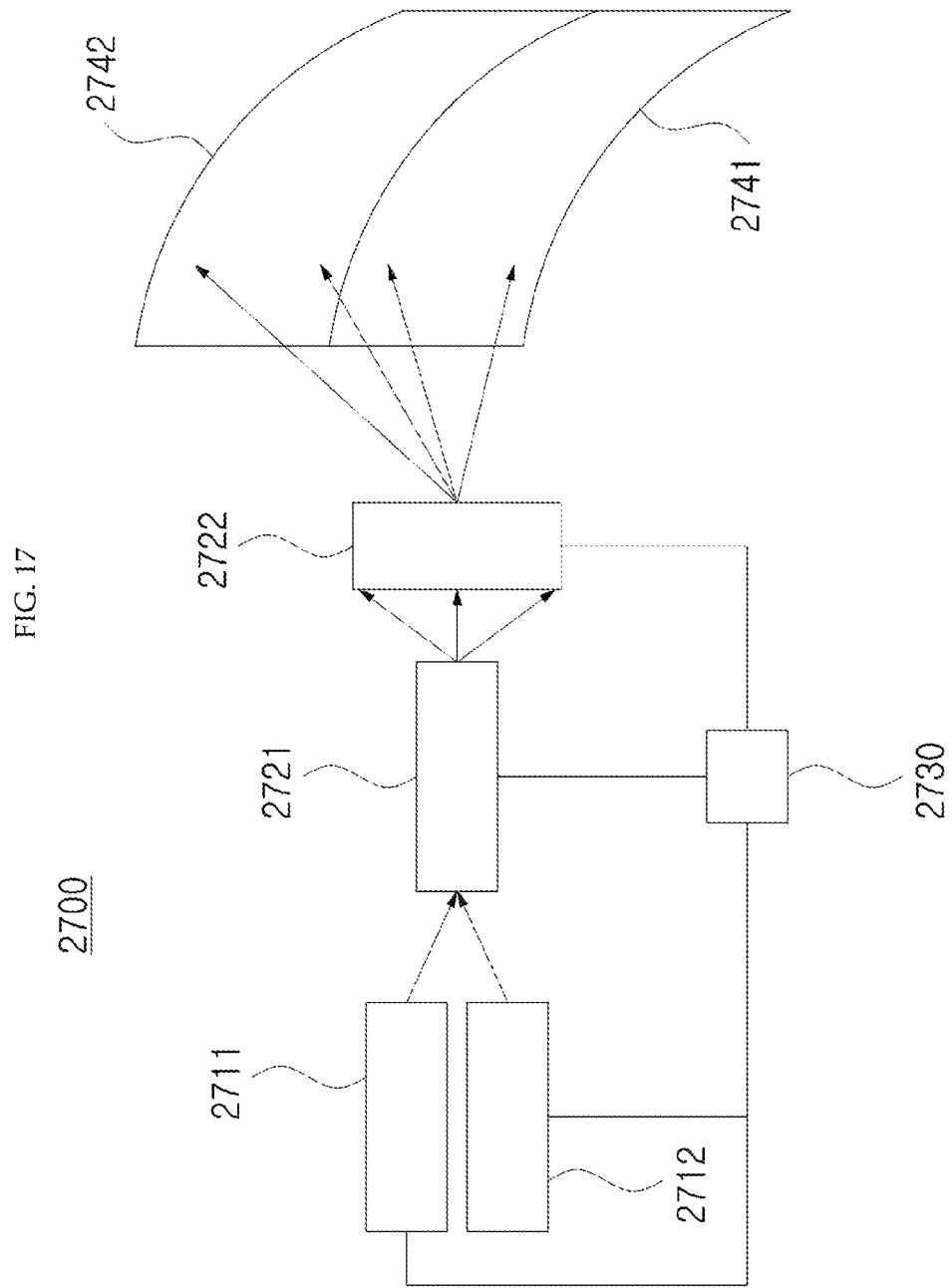
FIG. 17 is a view describing a LiDAR device according to an embodiment.

FIG. 17 is a view describing a LiDAR device according to an embodiment.

With reference to FIG. 17, a LiDAR device 2700 according to an embodiment may include a first laser emitting unit 2711, a second laser emitting unit 2712, a first scanning unit 2721, a second scanning unit 2722, and a controller 2730 but is not limited thereto and may include some of such configurations or further include other configurations.

In this case, the first laser emitting unit 2711 and the second laser emitting unit 2712 may be composed of laser emitting devices different from each other but are not limited thereto and may be configured by a method of outputting a plurality of lasers by dividing the laser output from one laser emitting device or may also be configured by a plurality of laser output elements included in one laser emitting device.

A first laser output from the first laser emitting unit 2711 may be radiated out to the first scanning unit 2721, and the second laser output from the second laser emitting unit 2712 may be radiated out to the first scanning unit 2721.

In addition, the first laser radiated out to the first scanning unit 2721 may be radiated out to the second scanning unit 2722 through the first scanning unit 2721, and the second laser radiated out to the first scanning unit 2721 may be radiated out to the second scanning unit 2722 through the first scanning unit 2721.

In this case, the first and second scanning units 2721 and 2722 may form FOVs 2741 and 2742 of the LiDAR device using the first and second lasers, but are not limited thereto.

More specifically, the first and second scanning units 2721 and 2722 may form a first FOV 2741 using the first laser and may form a second FOV 2742 using the second laser.

For example, the first and second scanning units 2721 and 2722 may change a flight path of the first laser having been output at a first time point, thereby irradiating a first position with the first laser and forming a first laser FOV on the first position. In addition, the first and second scanning units 2721 and 2722 may change a flight path of the first laser having been output at a second time point, thereby irradiating a second position with the first laser and forming a first laser FOV on the second position.

Accordingly, the first and second scanning units 2721 and 2722 may form the first laser FOV using the first laser output at a specific time point and a first FOV 2741 using the first laser output for a predetermined period of time.

In addition, the first and second scanning units 2721 and 2722 may change a flight path of the second laser having been output at a first time point, thereby irradiating the third position with the second laser and forming a second laser FOV on the third position. In addition, the first and second scanning units 2721 and 2722 may change a flight path of the second laser having been output at a second time point, thereby irradiating a fourth position with the second laser and forming a second laser FOV on the fourth position.

Accordingly, the first and second scanning units 2721 and 2722 may form the second laser FOV using the second laser output at a specific time point and the second FOV 2542 using the second laser output for a predetermined period of time.

In addition, sizes of a vertical FOV and a horizontal FOV of the first FOV 2741 and the second FOV 2742, respectively, may be the same as each other but are not limited thereto.

In addition, positions of the horizontal FOVs of the first FOV 2741 and the second FOV 2742, respectively, may be the same as each other but are not limited thereto.

In addition, positions of the vertical FOVs of the first FOV 2741 and the second FOV 2742, respectively, may be different from each other but are not limited thereto.

In this case, an angle between the first and second lasers radiated out to the first scanning unit 2721 may be designed so that, in the first and second FOVs 2741 and 2742, the positions of the vertical FOVs, respectively, are different from each other, but that the positions of the horizontal FOVs, respectively, are the same as each other, and that sizes of the vertical FOV and the horizontal FOV, respectively, are the same as each other.

In addition, the first and second scanning units 2721 and 2722 may include various configurations in order to change the flight paths of the first and second lasers by obtaining the first and second lasers. For example, the first and second scanning units 2721 and 2722 may include one or more of a rotating mirror (nodding mirror, polygon mirror, and the like) for changing the flight path by reflecting the first and second lasers, an optical phased array (OPA) for changing the flight path using a phase difference between the first and second lasers, and an optic element for steering the first and second lasers but are not limited thereto.

In addition, the first and second scanning units 2721 and 2722 may include different types of scanning units but are not limited thereto.

In addition, the controller 2730 may control the operation of at least one of the laser emitting units 2711 and 2712 and the scanning units 2721 and 2722 or may obtain distance information to the object on the basis of the laser output from the laser emitting units 2711 and 2712.

In addition, the controller 2730 may control the laser emitting units 2711 and 2712 to be independently operated at different time points or to be operated by being synchronized at the same time point.

In addition, the controller 2730 may control at least any one operation of the first and second scanning units 2721 and 2722.

For example, when the first and second scanning units 2721 and 2722 include a configuration being allowed to be at least partially rotated, the controller 2730 may control the operation of the first and second scanning units 2721 and 2722 by changing at least one parameter of the first and second scanning units 2721 and 2722 such as a size of a rotation angle, a center of the rotation angle, a rotation speed, and the like of the first and second scanning units 2721 and 2722.

Figure 18:
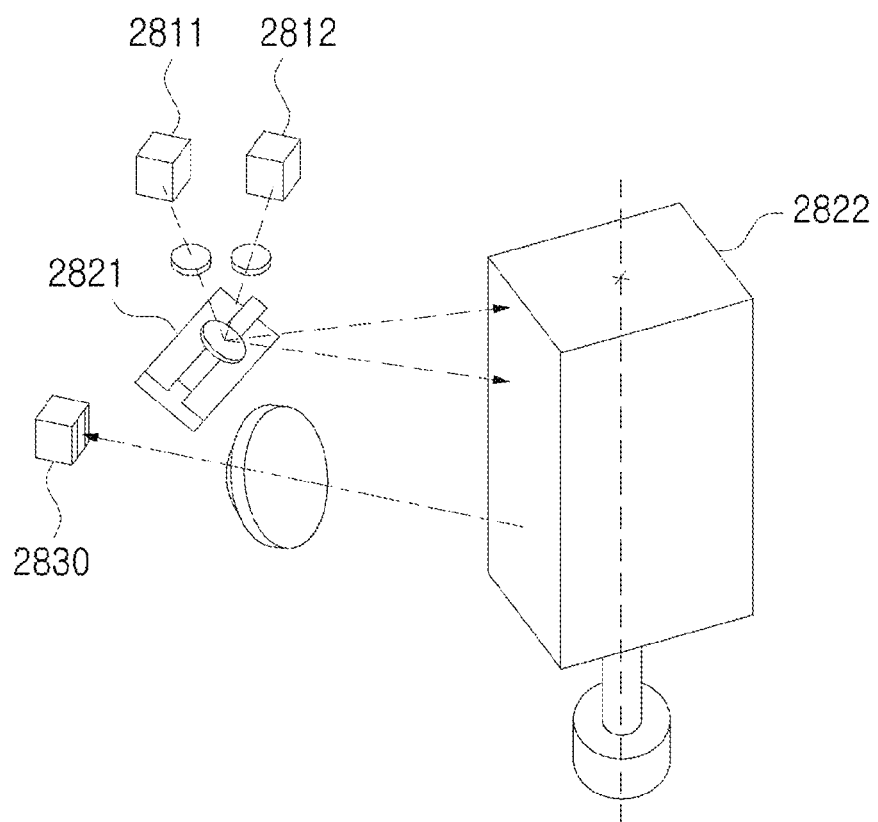
FIG. 18 is a view describing a LiDAR device according to an embodiment.

FIG. 18 is a view describing a LiDAR device according to an embodiment.

With reference to FIG. 18, a LiDAR device 2800 according to an embodiment may include a first laser emitting unit 2811, a second laser emitting unit 2812, a first scanning unit 2821, a second scanning unit 2822, and a detecting unit 2830.

In this case, the above-described contents may be applied to the first and second laser emitting units 2811 and 2812, so overlapping descriptions will be omitted.

In addition, with reference to FIG. 18, the first scanning unit 2821 according to an embodiment may include a nodding mirror rotating within a predetermined angular range, and the second scanning unit 2822 may include a rotating polygon mirror rotating about an axis, but the present disclosure is not limited thereto.

However, for convenience of description, the following description will be made on the basis of the LiDAR device in which the first scanning unit 2821 is implemented as a nodding mirror and the second scanning unit 2822 is implemented as a rotating polygon mirror. However, it is obvious that other configurations may also be applied.

Basically, the first and second scanning units 2821 and 2822 may form a field of view (FOV) of the LiDAR device using the first and second lasers output from the first and second laser emitting units 2811 and 2812, respectively. However, the above-described contents may be applied to this, so overlapping descriptions will be omitted.

More specifically, the first and second scanning units 2821 and 2822 may form a first FOV using the first laser output from the first laser emitting unit 2811 and a second FOV using the second laser output from the second laser emitting unit 2812.

In this case, an angle between the first and second lasers radiated out to the first scanning unit 2821 may be designed so as to allow the positions of the first FOV and the second FOV, respectively, to be different from each other.

For example, the angle between the first and second lasers radiated out to the first scanning unit 2821 may be designed so as to allow the positions in a vertical direction of the first FOV and the second FOV, respectively, to be different from each other.

In addition, sizes of the first FOV and the second FOV, respectively, may be the same as each other but are not limited thereto.

In addition, the angle between the first and second lasers radiated out to the first scanning unit 2821 may be designed so as to allow the positions of the first FOV and the second FOV, respectively, to be the same as each other.

For example, the angle between the first and second lasers radiated out to the first scanning unit 2821 may be designed so as to allow the positions in a horizontal direction of the first FOV and the second FOV, respectively, to be the same as each other.

In addition, the angle between the first and second lasers radiated out to the first scanning unit 2821 may be designed so as to allow the positions in a vertical direction of the first FOV and the second FOV, respectively, to be different from each other but to allow the positions in a horizontal direction of the first FOV and the second FOV, respectively, to be the same as each other.

In addition, the laser radiated out to the outside through the first and second scanning units 2821 and 2822 may be reflected from an object located within an area to be able to scan, thereby being received by the detecting unit 2830.

For example, the laser reflected from the object located in the area to be able to scan may be received by the detecting unit 2830 through the second scanning unit 2822 but is not limited thereto. In addition, although not described in FIG. 18, the laser reflected from the object may be received by the detecting unit 2830 through the first and second scanning units 2821 and 2822 or may also be received by the detecting unit 2830 even without passing through any one of the first and second scanning units 2821 and 2822.

Figure 19:
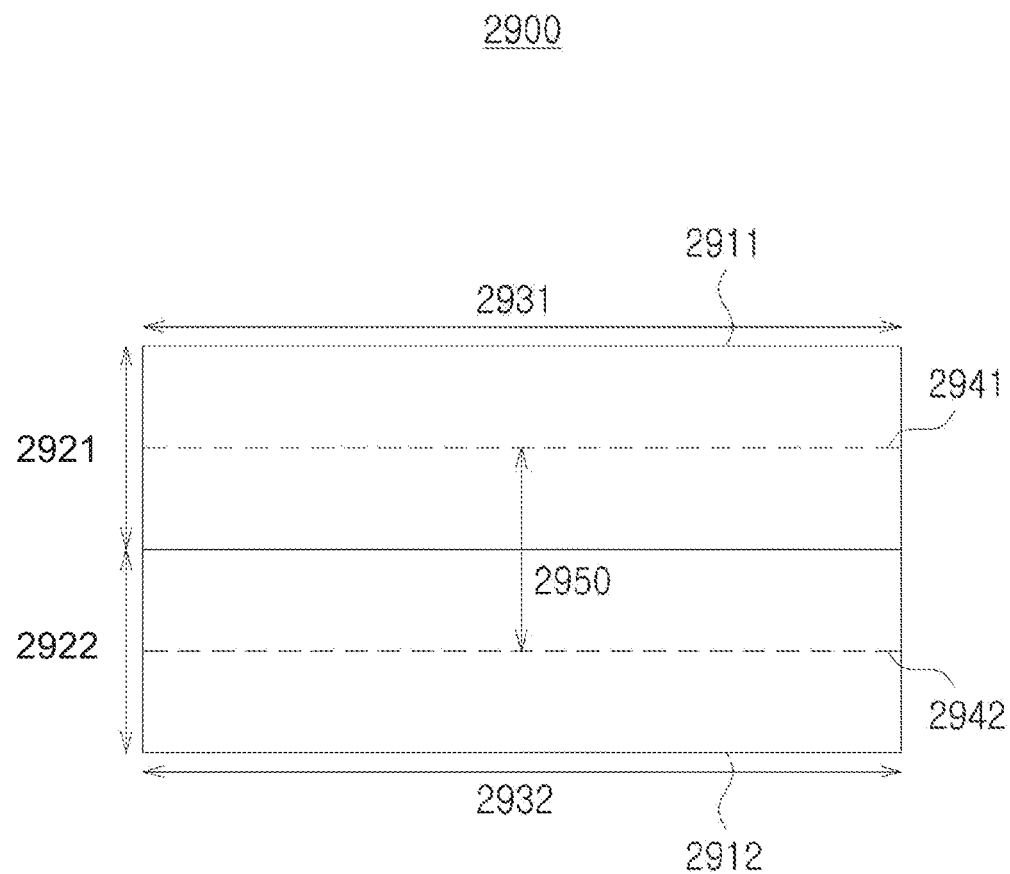
FIG. 19 is a view describing an FOV of a LiDAR device according to an embodiment.

FIG. 19 is a view describing an FOV of a LiDAR device according to an embodiment. With reference to FIG. 19, an FOV 2900 of a LiDAR device according to an embodiment may include a first FOV 2911 and a second FOV 2912.

In this case, the first FOV 2911 may include a first vertical FOV 2921 and a first horizontal FOV 2931, and the second FOV 2912 may include a second vertical FOV 2922 and a horizontal FOV 2932.

In addition, the first vertical FOV 2921 and the second vertical FOV 2922 may have the same size as each other, and the first horizontal FOV 2931 and the second horizontal FOV 2932 may have the same size as each other, but the present disclosure is not limited thereto.

In addition, a center 2941 of the first vertical FOV 2921 and a center 2942 of the second vertical FOV 2922 may be spaced apart from each other.

For example, as described in FIG. 19, the center 2941 of the first vertical FOV 2921 and the center 2942 of the second vertical FOV 2922 may be spaced apart from each other by a first angle 2950, but the present disclosure is not limited thereto.

In this case, in order to allow the first FOV 2911 and the second FOV 2912 to at least partially overlap with each other, a size of the first angle 2950 between the center 2941 of the first vertical FOV 2921 and the center 2942 of the second vertical FOV 2922 may be less than the size of the first vertical FOV 2921 or the size of the second vertical FOV 2922.

In addition, when the first FOV 2911 and the second FOV 2912 at least partially overlap with each other, a density of points of the LiDAR device may be increased in a region where the first FOV 2911 and the second FOV 2912 at least partially overlap with each other.

In addition, when the first FOV 2911 and the second FOV 2912 at least partially overlap with each other, a speed for obtaining information for the same point may become fast in a region where the first FOV 2911 and the second FOV 2912 at least partially overlap with each other.

In addition, in order to extend the FOV 2900 of the LiDAR device by not allowing the first FOV 2911 and the second FOV 2912 to at least partially overlap with each other, a size of the first angle 2950 between the center 2941 of the first vertical FOV 2921 and the center 2942 of the second vertical FOV 2922 may be no less than the size of the first vertical FOV 2921 or the size of the second vertical FOV 2922.

In addition, for a scanning pattern that may refer to an order in which points are generated within the first FOV 2911 and the second FOV 2912, a scanning pattern for forming the first FOV 2911 and a scanning pattern for forming the second FOV 2912 may be the same as each other but are not limited thereto.

Figure 20:
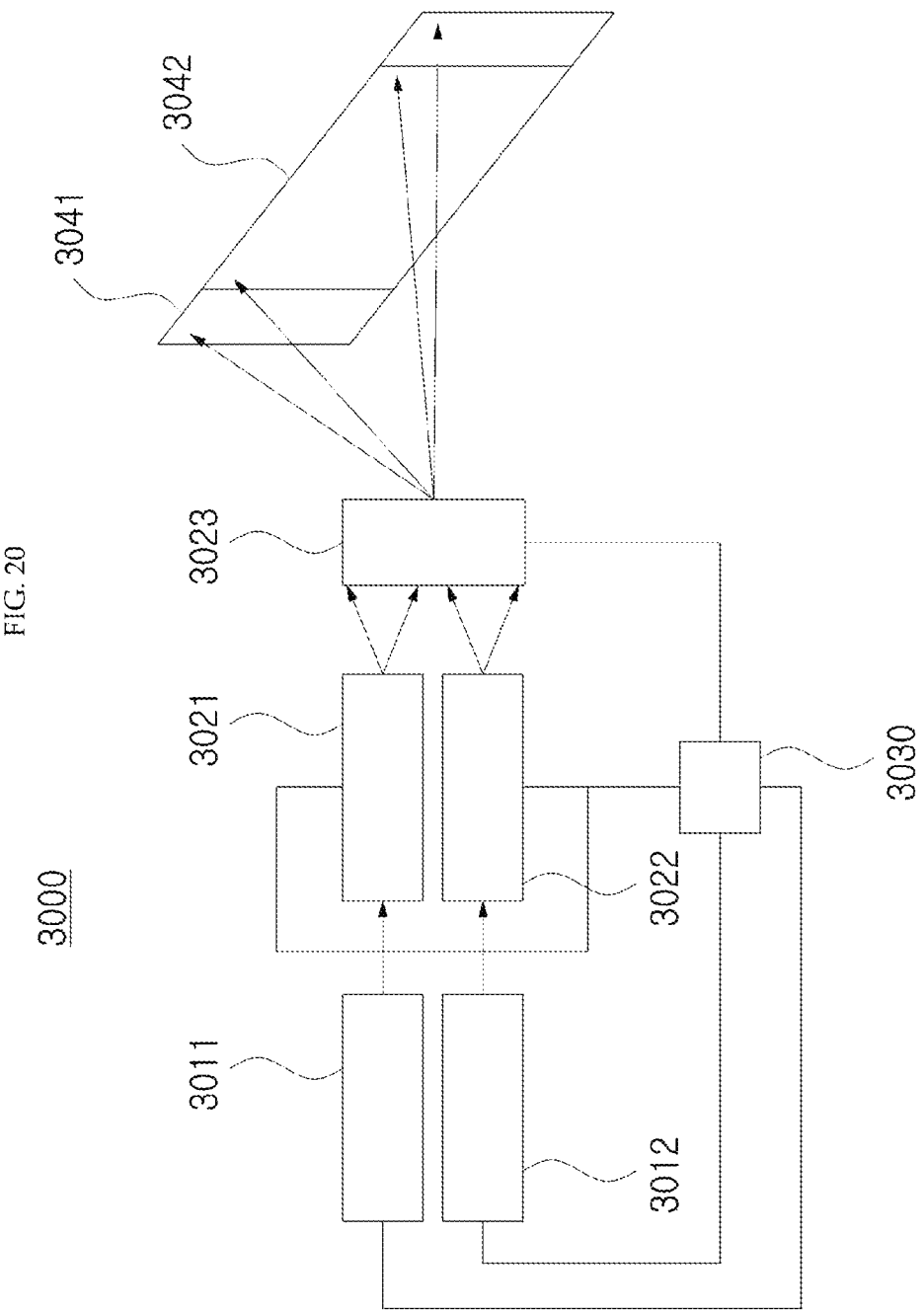
FIG. 20 is a view describing a LiDAR device according to an embodiment.

FIG. 20 is a view describing a LiDAR device according to an embodiment.

With reference to FIG. 20, a LiDAR device 3000 according to an embodiment may include a first laser emitting unit 3011, a second laser emitting unit 3012, a first scanning unit 3021, a second scanning unit 3022, a third scanning unit 3023, and a controller 3030 but is not limited thereto and may include some of such configurations or further include other configurations.

In this case, the first laser emitting unit 3011 and the second laser emitting unit 3012 may be composed of laser emitting devices different from each other but are not limited thereto and may be configured by a method of outputting a plurality of lasers by dividing the laser output from one laser emitting device or may also be configured by a plurality of laser output elements included in one laser emitting device.

A first laser output from the first laser emitting unit 3011 may be radiated out to the first scanning unit 3021, and a second laser output from the second laser emitting unit 3012 may be radiated out to the second scanning unit 3022.

In addition, the first laser radiated out to the first scanning unit 3021 may be radiated out to the third scanning unit 3023 through the first scanning unit 3021, and the second laser radiated out to the second scanning unit 3022 may be radiated out to the third scanning unit 3023 through the second scanning unit 3022.

In this case, the first and third scanning units 3021 and 3023 may form a first FOV 3041 using the first laser, and the second and third scanning units 3022 and 3023 may form a second FOV 3042 using the second laser, but the present disclosure is not limited thereto.

For example, the first and third scanning units 3021 and 3023 may change a flight path of the first laser having been output at a first time point, thereby irradiating a first position with the first laser and forming a first laser FOV on the first position. In addition, the first and third scanning units 3021 and 3023 may change a flight path of the first laser having been output at a second time point, thereby irradiating a second position with the first laser and forming a first laser FOV on the second position.

Accordingly, the first and third scanning units 3021 and 3023 may form the first laser FOV using the first laser output at a specific time point and a first FOV 3041 using the first laser output for a predetermined period of time.

In addition, the second and third scanning units 3022 and 3023 may change a flight path of the second laser having been output at a first time point, thereby irradiating the third position with the second laser and forming a second laser FOV on the third position. In addition, the second and third scanning units 3022 and 3023 may change a flight path of the second laser having been output at a second time point, thereby irradiating a fourth position with the second laser and forming a second laser FOV on the fourth position.

Accordingly, the second and third scanning units 3022 and 3023 may form the second laser FOV using the second laser output at a specific time point and the second FOV 3042 using the second laser output for a predetermined period of time.

In addition, sizes of a vertical FOV and a horizontal FOV of the first FOV 3041 and the second FOV 3042, respectively, may be the same as each other but are not limited thereto.

In addition, positions of the vertical FOVs of the first FOV 3041 and the second FOV 3042, respectively, may be the same as each other but are not limited thereto.

In addition, positions of the horizontal FOVs of the first FOV 3041 and the second FOV 3042, respectively, may be different from each other but are not limited thereto.

In this case, when viewed along an axis of rotation of the third scanning unit 3023, an angle formed by the first laser radiated out to the third scanning unit 3023 through the first scanning unit 3021 and the second laser radiated out to the third scanning unit 3023 through the second scanning unit 3022 may be designed so that, in the first and second FOVs 3041 and 3042, the positions of the horizontal FOVs, respectively, are different from each other, but that the positions of the vertical FOVs, respectively, are the same as each other, and that sizes of the vertical and horizontal FOVs, respectively, are the same as each other. However, the present disclosure is not limited thereto.

In addition, the first, second, and third scanning units 3021, 3022, and 3023 may include various configurations in order to change the flight paths of the first and second lasers by obtaining the first and second lasers. For example, the first, second, and third scanning units 3021, 3022, and 3023 may include one or more of a rotating mirror (nodding mirror, polygon mirror, and the like) for changing the flight path by reflecting the first and second lasers, an optical phased array (OPA) for changing the flight path using a phase difference between the first and second lasers, and an optic element for steering the first and second lasers but are not limited thereto.

In addition, the first, second, and third scanning units 3021, 3022, and 3023 may include different types of scanning units but are not limited thereto.

In addition, the controller 3030 may control the operation of at least one of the laser emitting units 3011 and 3012 and the first, second, and third scanning units 3021, 3022, and 3023 or may obtain distance information to the object on the basis of the laser output from the laser emitting units 3011 and 3012.

In addition, the controller 3030 may control the laser emitting units 3011 and 3012 to be independently operated at different time points or to be operated by being synchronized at the same time point.

In addition, the controller 3030 may control an operation of at least any one of the first, second, and third scanning units 3021, 3022, and 3023.

For example, when the first, second, and third scanning units 3021, 3022, and 3023 include a configuration being allowed to be at least partially rotated, the controller 3030 may control the operation of the first, second, and third scanning units 3021, 3022, and 3023 by changing at least one parameter of the first, second, and third scanning units 3021, 3022, and 3023 such as a size of a rotation angle, a center of the rotation angle, a rotation speed, and the like of the first, second, and third scanning units 3021, 3022, and 3023.

FIG. 21 is a view describing a LiDAR device according to an embodiment.

With reference to FIG. 21, a LiDAR device 3100 according to an embodiment may include a first laser emitting unit 3111, a second laser emitting unit 3112, a first scanning unit 3121, a second scanning unit 3122, a third scanning unit 3123, a first detecting unit 3131, and a second detecting unit 3132.

In this case, the above-described contents may be applied to the first and second laser emitting units 3111 and 3112, so overlapping descriptions will be omitted.

In addition, with reference to FIG. 21, according to an embodiment, the first scanning unit 3121 may include a nodding mirror rotating within a predetermined angular range, the second scanning unit 3122 may include a nodding mirror rotating within a predetermined angular range, and the third scanning unit 3123 may include a rotating polygon mirror rotating about an axis, but the present disclosure is not limited thereto.

However, for convenience of description, the following description will be made on the basis of the LiDAR device in which the first scanning unit 3121 is implemented as a nodding mirror, the second scanning unit 3122 is implemented as a nodding mirror, and the third scanning unit 3123 is implemented as a rotating polygon mirror. However, it is obvious that other configurations may also be applied.

Basically, the first, second, and third scanning units 3121, 3122, and 3123 may form a field of view (FOV) of the LiDAR device using the first and second lasers output from the first and second laser emitting units 3111 and 3112, respectively. However, the above-described contents may be applied to this, so overlapping descriptions will be omitted.

More specifically, the first and third scanning units 3121 and 3123 may form a first FOV using the first laser output from the first laser emitting unit 3111, and the second and third scanning units 3122 and 3123 may form a second FOV using the second laser output from the second laser emitting unit 3112.

In this case, when viewed along an axis of rotation of the third scanning unit 3123, an angle formed by the first laser radiated out to the third scanning unit 3123 through the first scanning unit 3121 and the second laser radiated out to the third scanning unit 3123 through the second scanning unit 3122 may be designed so as to allow the positions of the first and second FOVs, respectively, to be different from each other.

For example, when viewed along the axis of rotation of the third scanning unit 3123, an angle formed by the first laser radiated out to the third scanning unit 3123 through the first scanning unit 3121 and the second laser radiated out to the third scanning unit 3123 through the second scanning unit 3122 may be designed so as to allow the positions in a horizontal direction of the first and second FOVs, respectively, to be different from each other.

In addition, sizes of the first FOV and the second FOV, respectively, may be the same as each other but are not limited thereto.

In this case, when viewed along an axis of rotation of the third scanning unit 3123, an angle formed by the first laser radiated out to the third scanning unit 3123 through the first scanning unit 3121 and the second laser radiated out to the third scanning unit 3123 through the second scanning unit 3122 may be designed so as to allow the positions of the first and second FOVs, respectively, to be the same as each other.

For example, when viewed along an axis of rotation of the third scanning unit 3123, an angle formed by the first laser radiated out to the third scanning unit 3123 through the first scanning unit 3121 and the second laser radiated out to the third scanning unit 3123 through the second scanning unit 3122 may be designed so as to allow the positions in a vertical direction of the first and second FOVs, respectively, to be the same as each other.

In addition, when viewed along an axis of rotation of the third scanning unit 3123, an angle formed by the first laser radiated out to the third scanning unit 3123 through the first scanning unit 3121 and the second laser radiated out to the third scanning unit 3123 through the second scanning unit 3122 may be designed so as to allow, in the first and second FOVs, the positions in a vertical direction to be the same as each other but the positions in a horizontal direction to be different from each other.

In addition, the laser radiated out to the outside through the first, second, and third scanning units 3121, 3122, and 3123 may be reflected from an object located within an area to be able to scan, thereby being received by the first and second detecting units 3131 and 3132.

For example, the first laser reflected from a first object located in the area to be able to scan may be received by the first detecting unit 3131 through the third scanning unit 3123, and the second laser reflected from a second object located in the area to be able to scan may be received by the second detecting unit 3132 through the third scanning unit 3123, but the present disclosure is not limited thereto. In addition, although not described in FIG. 21, the first laser reflected from the first object may be received by the first detecting unit 3131 through the first and third scanning units 3121 and 3123, and the second laser reflected from the second object may be received by the second detecting unit 3132 through the second and third scanning units 3122 and 3123. Alternatively, the first and second lasers reflected above may be received by the detecting units without passing through any of the first, second, and third scanning units 3121, 3122, and 3123.

Figure 22:
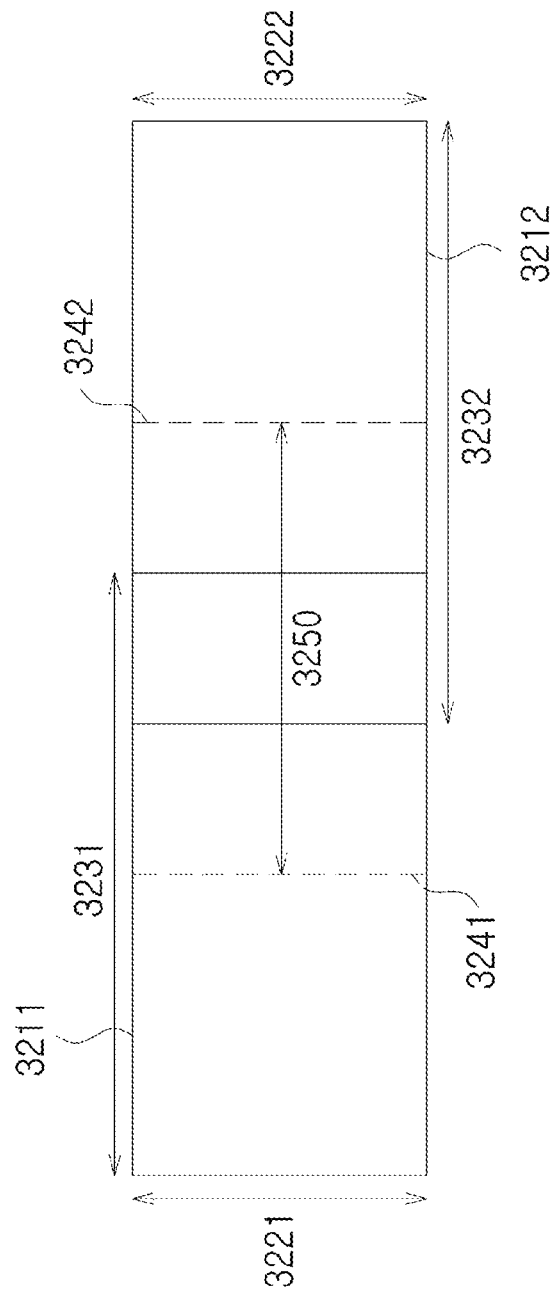
FIG. 22 is a view describing an FOV of a LiDAR device according to an embodiment.

FIG. 22 is a view describing an FOV of a LiDAR device according to an embodiment. With reference to FIG. 22, an FOV 3200 of a LiDAR device according to an embodiment may include a first FOV 3211 and a second FOV 3212.

In this case, the first FOV 3211 may include a first vertical FOV 3221 and a first horizontal FOV 3231, and the second FOV 3212 may include a second vertical FOV 3222 and a second horizontal FOV 3232.

In addition, the first vertical FOV 3221 and the second vertical FOV 3222 may have the same size as each other, and the first horizontal FOV 3231 and the second horizontal FOV 3232 may have the same size as each other, but the present disclosure is not limited thereto.

In addition, a center 3241 of the first horizontal FOV 3231 and a center 3242 of the second horizontal FOV 3232 may be spaced apart from each other.

For example, as described in FIG. 22, the center 3241 of the first horizontal FOV 3231 and the center 3242 of the second horizontal FOV 3232 may be spaced apart from each other by a first angle 3250, but the present disclosure is not limited thereto.

In this case, in order to allow the first FOV 3211 and the second FOV 3212 to at least partially overlap with each other, a size of the first angle 3250 between the center 3241 of the first horizontal FOV 3231 and the center 3242 of the second horizontal FOV 3232 may be less than the size of the first horizontal FOV 3231 or the size of the second horizontal FOV 3232.

In addition, when the first FOV 3211 and the second FOV 3212 at least partially overlap with each other, a density of points of the LiDAR device may be increased in a region where the first FOV 3211 and the second FOV 3212 at least partially overlap with each other.

In addition, when the first FOV 3211 and the second FOV 3212 at least partially overlap with each other, a speed for obtaining information for the same point may become fast in a region where the first FOV 3211 and the second FOV 3212 at least partially overlap with each other.

In addition, in order to extend the FOV 3200 of the LiDAR device by not allowing the first FOV 3211 and the second FOV 3212 to at least partially overlap with each other, a size of the first angle 3250 between the center 3241 of the first horizontal FOV 3231 and the center 3242 of the second horizontal FOV 3232 may be no less than the size of the first horizontal FOV 3231 or the size of the second horizontal FOV 3232.

In addition, for a scanning pattern that may refer to an order in which points are generated within the first FOV 3211 and the second FOV 3212, a scanning pattern for forming the first FOV 3211 and a scanning pattern for forming the second FOV 3212 may be the same as each other but are not limited thereto.

FIGS. 23A to 23H is views describing arrangements and FOVs of a LiDAR device according to an embodiment.

FIG. 23A is a view describing an arrangement of a LiDAR device according to the embodiment, and FIG. 23B is a view describing a FOV of the LiDAR device formed according to FIG. 23A.

Specifically, FIG. 23A is a view describing at least one path of laser radiated out to a scanning unit when viewed from a part above the scanning unit. With reference to this, it may be seen that the LiDAR device according to the embodiment may form a first FOV and a second FOV using a first laser and a second laser.

In addition, with reference to FIG. 23B, the first FOV and the second FOV may overlap with each other to form one FOV.

FIG. 23C is a view describing an arrangement of the LiDAR device according to the embodiment, and FIG. 23D is a view describing a FOV of the LiDAR device formed according to FIG. 23C.

In addition, FIG. 23C is a view describing at least one path of laser radiated out to a scanning unit when viewed from a part above the scanning unit. With reference to this, it may be seen that the LiDAR device according to the embodiment may form a first FOV and a second FOV using a first laser and a second laser.

In addition, with reference to FIG. 23D, the first FOV and the second FOV may at least partially overlap with each other to form one FOV.

For example, when the horizontal FOV of the LiDAR device according to FIG. 23C is 150 angle degrees, the horizontal FOVs of the first FOV and the second FOV may each be 120 angle degrees and may overlap with each other in a range of 90 angle degrees. However, the present disclosure is not limited thereto.

FIG. 23E is a view describing an arrangement of the LiDAR device according to the embodiment, and FIG. 23F is a view describing a FOV of the LiDAR device formed according to FIG. 23E.

In addition, FIG. 23E is a view describing at least one path of laser radiated out to a scanning unit when viewed from a part above the scanning unit. With reference to this, it may be seen that the LiDAR device according to the embodiment may form a first FOV and a second FOV using a first laser and a second laser.

In addition, with reference to FIG. 23F, the first FOV and the second FOV may at least partially overlap with each other to form one FOV.

For example, when the horizontal FOV of the LiDAR device according to FIG. 23E is 180 angle degrees, the horizontal FOVs of the first FOV and the second FOV may each be 120 angle degrees and may overlap with each other in a range of 60 angle degrees. However, the present disclosure is not limited thereto.

In addition, FIG. 23G is a view describing an arrangement of the LiDAR device according to the embodiment, and FIG. 23H is a view describing a FOV of the LiDAR device formed according to FIG. 23G.

In addition, FIG. 23G is a view describing at least one path of laser radiated out to a scanning unit when viewed from a part above the scanning unit. With reference to this, it may be seen that the LiDAR device according to the embodiment may form a first FOV and a second FOV using a first laser and a second laser.

In addition, with reference to FIG. 23H, the first FOV and the second FOV may not at least partially overlap with each other and, more specifically, may be formed on a forward side and a rearward side based on the LiDAR, respectively.

For example, when the horizontal FOV of the LiDAR device according to FIG. 23G is 240 angle degrees, the horizontal FOVs of the first FOV and the second FOV may each be 120 angle degrees; and the first FOV may be formed in a range of 120 angle degrees forward, and the second FOV may be formed in a range of 120 angle degrees rearward. However, the present disclosure is not limited thereto.

FIG. 24 is a view describing a LiDAR device according to an embodiment.

With reference to FIG. 24, a LiDAR device 3300 according to an embodiment may include a first laser emitting unit 3311, a second laser emitting unit 3312, a third laser emitting unit 3313, a fourth laser emitting unit 3314, a first scanning unit 3321, a second scanning unit 3322, a third scanning unit 3323, and a controller 3330 but is not limited thereto and may include some of such configurations or further include other configurations.

In this case, the first laser emitting unit 3311, the second laser emitting unit 3312, a third laser emitting unit 3313, and a fourth laser emitting unit 3314 may be composed of laser emitting devices different from each other but are not limited thereto and may be configured by a method of outputting a plurality of lasers by dividing the laser output from one laser emitting device or may also be configured by a plurality of laser output elements included in one laser emitting device.

A first laser output from the first laser emitting unit 3311 may be radiated out to the first scanning unit 3321, a second laser output from the second laser emitting unit 3312 may be radiated out to the first scanning unit 3321, a third laser output from the third laser emitting unit 3313 may be radiated out to the second scanning unit 3322, and a fourth laser output from the fourth laser emitting unit 3314 may be radiated out to the second scanning unit 3322.

In addition, the first laser radiated out to the first scanning unit 3321 may be radiated out to the third scanning unit 3323 through the first scanning unit 3321, the second laser radiated out to the first scanning unit 3321 may be radiated out to the third scanning unit 3323 through the first scanning unit 3321, the third laser radiated out to the second scanning unit 3322 may be radiated out to the third scanning unit 3323 through the second scanning unit 3322, and the fourth laser radiated out to the second scanning unit 3322 may be radiated out to the third scanning unit 3323 through the second scanning unit 3322.

In this case, the first and third scanning units 3321 and 3323 may form a first FOV 3341 and a second FOV 3342 using the first laser and second laser, and the second and third scanning units 3322 and 3323 may form a third FOV 3343 and a fourth FOV 3344 using the third laser and fourth laser, but the present disclosure is not limited thereto.

For example, the first and third scanning units 3321 and 3323 may change a flight path of the first laser having been output at a first time point, thereby irradiating a first position with the first laser and forming a first laser FOV on the first position. In addition, the first and third scanning units 3321 and 3323 may change a flight path of the first laser having been output at a second time point, thereby irradiating a second position with the first laser and forming the first laser FOV on the second position.

Accordingly, the first and third scanning units 3321 and 3323 may form a second laser FOV using the second laser output at a specific time point and the second FOV 3342 using the second laser output for a predetermined period of time.

In addition, the first and third scanning units 3321 and 3323 may change a flight path of the second laser having been output at a first time point, thereby irradiating a third position with the second laser and forming the second laser FOV on the third position. In addition, the first and third scanning units 3321 and 3323 may change a flight path of the second laser having been output at a second time point, thereby irradiating a fourth position with the second laser and forming the second laser FOV on the fourth position.

Accordingly, the first and third scanning units 3321 and 3323 may form the second laser FOV using the second laser output at a specific time point and a second FOV 3342 using the second laser output for a predetermined period of time.

In addition, the second and third scanning units 3322 and 3323 may change a flight path of the third laser having been output at a first time point, thereby irradiating a fifth position with the third laser and forming a third laser FOV on the fifth position. In addition, the second and third scanning units 3322 and 3323 may change a flight path of the third laser having been output at a second time point, thereby irradiating a sixth position with the third laser and forming the third laser FOV on the sixth position.

Accordingly, the second and third scanning units 3322 and 3323 may form the third laser FOV using the third laser output at a specific time point and the third FOV 3343 using the third laser output for a predetermined period of time.

In addition, the second and third scanning units 3322 and 3323 may change a flight path of the fourth laser having been output at a first time point, thereby irradiating a seventh position with the fourth laser and forming a fourth laser FOV on the seventh position. In addition, the second and third scanning units 3322 and 3323 may change a flight path of the fourth laser having been output at a second time point, thereby irradiating an eighth position with the fourth laser and forming a fourth laser FOV on the eighth position.

Accordingly, the second and third scanning units 3322 and 3323 may form a fourth laser FOV using the fourth laser output at a specific time point and a fourth FOV 3344 using the fourth laser output for a predetermined period of time.

In addition, sizes of the vertical FOVs and horizontal FOVs of the first FOV 3341, second FOV 3342, third FOV 3343, and fourth FOV 3344, respectively, may be the same as each other but are not limited thereto.

In addition, positions of the horizontal FOVs of the first FOV 3341 and second FOV 3342, respectively, may be the same as each other but are not limited thereto.

In addition, positions of the vertical FOVs of the first FOV 3341 and second FOV 3342, respectively, may be different from each other but are not limited thereto.

In addition, positions of the vertical FOVs of the first FOV 3341 and third FOV 3343, respectively, may be the same as each other but are not limited thereto.

In addition, positions of the horizontal FOVs of the first FOV 3341 and third FOV 3343, respectively, may be different from each other but are not limited thereto.

In addition, positions of the vertical and horizontal FOVs of the first FOV 3341 and fourth FOV 3344, respectively, may be different from each other but are not limited thereto.

In addition, positions of the vertical and horizontal FOVs of the second FOV 3342 and third FOV 3343, respectively, may be different from each other but are not limited thereto.

In addition, positions of the vertical FOVs of the second FOV 3342 and fourth FOV 3344, respectively, may be the same as each other but are not limited thereto.

In addition, positions of the horizontal FOVs of the second FOV 3342 and fourth FOV 3344, respectively, may be different from each other but are not limited thereto.

In this case, when viewed along an axis of rotation of the third scanning unit 3323, an angle formed by the first laser radiated out to the third scanning unit 3323 through the first scanning unit 3321 and the third laser radiated out to the third scanning unit 3323 through the second scanning unit 3322 may be designed so that, in the first and third FOVs 3341 and 3343, the positions of the horizontal FOVs, respectively, are different from each other, but that the positions of the vertical FOVs, respectively, are the same as each other, and that sizes of the vertical and horizontal FOVs, respectively, are the same as each other. However, the present disclosure is not limited thereto.

In addition, when viewed along an axis of rotation of the third scanning unit 3323, an angle formed by the second laser radiated out to the third scanning unit 3323 through the first scanning unit 3321 and the fourth laser radiated out to the third scanning unit 3323 through the second scanning unit 3322 may be designed so that, in the second and fourth FOVs 3342 and 3344, the positions of the horizontal FOVs, respectively, are different from each other, but that the positions of the vertical FOVs, respectively, are the same as each other, and that sizes of the vertical and horizontal FOVs, respectively, are the same as each other. However, the present disclosure is not limited thereto.

In this case, when viewed along the axis of rotation of the third scanning unit 3323, an angle formed by the first laser radiated out to the third scanning unit 3323 through the first scanning unit 3321 and the fourth laser radiated out to the third scanning unit 3323 through the second scanning unit 3322 may be designed so that, in the first and fourth FOVs 3341 and 3344, the positions of the horizontal FOVs, respectively, are different from each other, and that the positions of the vertical FOVs, respectively, are also different from each other, but that sizes of the vertical and horizontal FOVs, respectively, are the same as each other. However, the present disclosure is not limited thereto.

In this case, when viewed along an axis of rotation of the third scanning unit 3323, an angle formed by the second laser radiated out to the third scanning unit 3323 through the first scanning unit 3321 and the third laser radiated out to the third scanning unit 3323 through the second scanning unit 3322 may be designed so that, in the second and third FOVs 3342 and 3343, the positions of the horizontal FOVs, respectively, are different from each other, and that the positions of the vertical FOVs, respectively, are also different from each other, but that sizes of the vertical and horizontal FOVs, respectively, are the same as each other. However, the present disclosure is not limited thereto.

In addition, the first, second, and third scanning units 3321, 3322, and 3323 may include various configurations in order to change the flight paths of the first, second, third, or fourth laser by obtaining the first, second, third, or fourth laser. For example, the first, second, and third scanning units 3321, 3322, and 3323 may include one or more of a rotating mirror (nodding mirror, polygon mirror, and the like) for changing the flight path by reflecting the first, second, third, or fourth laser, an optical phased array (OPA) for changing the flight path using a phase difference of the first, second, third, or fourth laser, and an optic element for steering the first, second, third, or fourth laser, but the present disclosure is not limited thereto.

In addition, the first, second, and third scanning units 3321, 3322, and 3323 may include different types of scanning units but are not limited thereto.

In addition, the controller 3330 may control the operation of at least one of the laser emitting units 3311, 3312, 3313, and 3314 and the first, second, and third scanning units 3321, 3322, and 3323 or may obtain distance information to the object on the basis of the laser output from the laser emitting units 3311, 3312, 3313, and 3314.

In addition, the controller 3330 may control the laser emitting units 3311, 3312, 3313, and 3314 to be independently operated at different time points or to be operated by being synchronized at the same time point.

In addition, the controller 3330 may control an operation of at least any one the first, second, and third scanning units 3321, 3322, and 3323.

For example, when the first, second, and third scanning units 3321, 3322, and 3323 include a configuration being allowed to be at least partially rotated, the controller 3330 may control the operation of the first, second, and third scanning units 3321, 3322, and 3323 by changing at least one parameter of the first, second, and third scanning units 3321, 3322, and 3323 such as a size of a rotation angle, a center of the rotation angle, a rotation speed, and the like of the first, second, and third scanning units 3321, 3322, and 3323.

Figure 25:
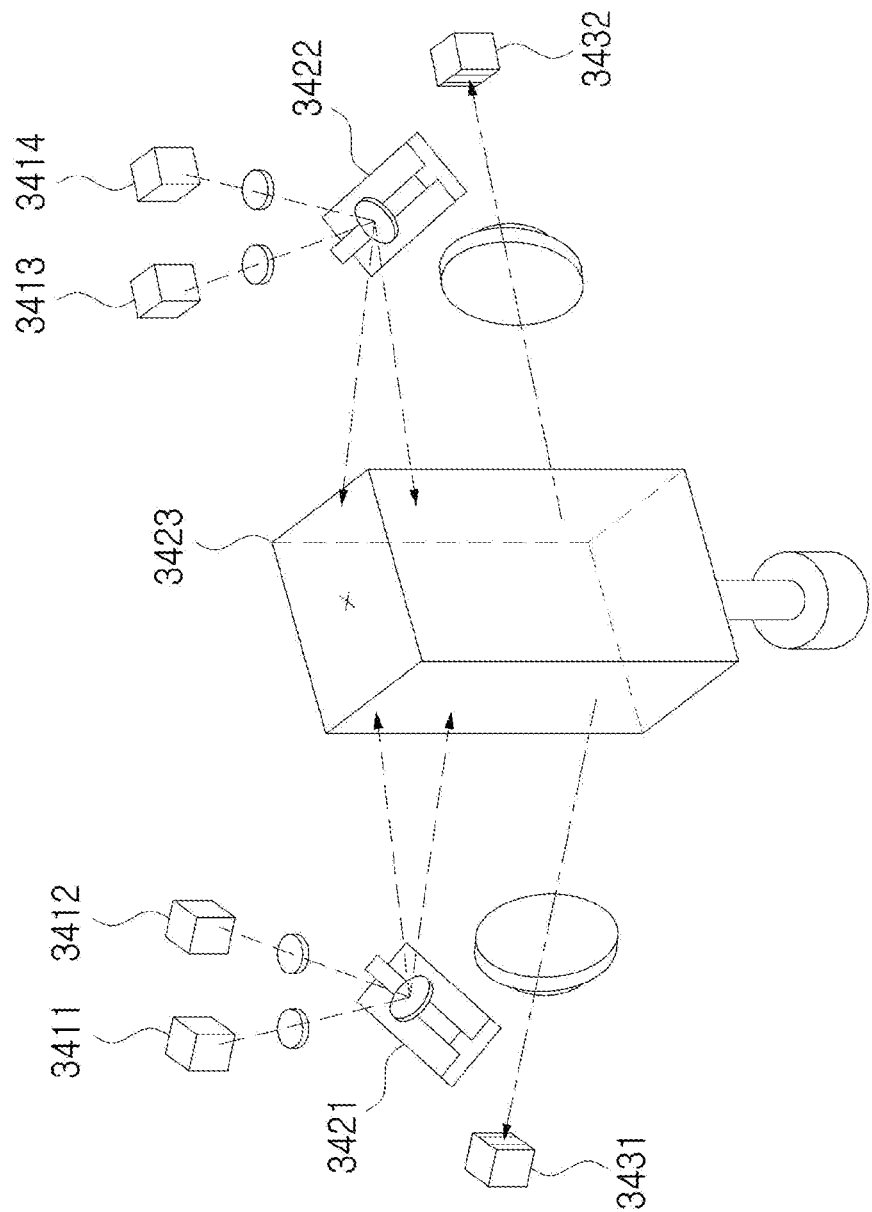
FIG. 25 is a view describing a LiDAR device according to an embodiment.

FIG. 25 is a view describing a LiDAR device according to an embodiment.

With reference to FIG. 25, a LiDAR device 3400 according to an embodiment may include a first laser emitting unit 3411, a second laser emitting unit 3412, a third laser emitting unit 3413, a fourth laser emitting unit 3414, a first scanning unit 3421, a second scanning unit 3422, a third scanning unit 3423, a first detecting unit 3431, and a second detecting unit 3432.

In this case, the above-described contents may be applied to the first to fourth laser output elements 3411, 3412, 3413, and 3414, so overlapping descriptions will be omitted.

In addition, with reference to FIG. 25, according to an embodiment, the first scanning unit 3421 may include a nodding mirror rotating within a predetermined angular range, the second scanning unit 3422 may include a nodding mirror rotating within a predetermined angular range, and the third scanning unit 3423 may include a rotating polygon mirror rotating about an axis, but the present disclosure is not limited thereto.

However, for convenience of description, the following description will be made on the basis of the LiDAR device in which the first scanning unit 3421 is implemented as a nodding mirror, the second scanning unit 3422 is implemented as a nodding mirror, and third scanning unit 3423 is implemented as a rotating polygon mirror. However, it is obvious that other configurations may also be applied.

Basically, the first, second, and third scanning units 3421, 3422, and 3423 may form a field of view (FOV) of the LiDAR device using the first to fourth lasers output from the first to fourth laser emitting units 3411, 3412, 3413, and 3414, respectively. However, the above-described contents may be applied to this, so overlapping descriptions will be omitted.

More specifically, the first and third scanning units 3421 and 3423 may form a first FOV and a second FOV using the first and second lasers output from the first laser emitting unit 3411 and the second laser emitting unit 3412, respectively, and the second and third scanning units 3422 and 3423 may form a third FOV and a fourth FOV using the third and fourth lasers output from the third laser emitting unit 3413 and the fourth laser emitting unit 3414, respectively.

In this case, an angle between the first laser and the second laser radiated out to the first scanning unit 3421 may be designed so as to allow the positions of the first FOV and second FOV, respectively, to be different from each other.

For example, the angle between the first laser and the second laser radiated out to the first scanning unit 3421 may be designed so as to allow the positions in a vertical direction of the first FOV and second FOV, respectively, to be different from each other.

In addition, the angle between the first laser and the second laser radiated out to the first scanning unit 3421 may be designed so as to allow the positions of the first FOV and second FOV, respectively, to be the same as each other.

For example, the angle between the first laser and the second laser radiated out to the first scanning unit 3421 may be designed so as to allow the positions in a horizontal direction of the first FOV and second FOV, respectively, to be the same as each other.

In addition, the angle between the first laser and the second laser radiated out to the first scanning unit 3421 may be designed so that, in the first FOV and second FOV, the positions in a horizontal direction are the same as each other, but that the positions in a vertical direction are different from each other.

In addition, an angle between the third laser and the fourth laser radiated out to the second scanning unit 3422 may be designed so as to allow the positions of the third FOV and fourth FOV, respectively, to be different from each other.

For example, an angle between the third laser and the fourth laser radiated out to the second scanning unit 3422 may be designed so as to allow the positions in a vertical direction of the third FOV and fourth FOV, respectively, to be different from each other.

In addition, an angle between the third laser and the fourth laser radiated out to the second scanning unit 3422 may be designed so as to allow the positions of the third FOV and fourth FOV, respectively, to be the same as each other.

For example, an angle between the third laser and the fourth laser radiated out to the second scanning unit 3422 may be designed so as to allow the positions in a horizontal direction of the third FOV and fourth FOV, respectively, to be the same as each other.

In addition, an angle between the third laser and the fourth laser radiated out to the second scanning unit 3422 may be designed so that, in the third FOV and fourth FOV, the positions in a horizontal direction are the same as each other, but that the positions in a vertical direction are different from each other.

In addition, when viewed along an axis of rotation of the third scanning unit 3423, an angle formed by the first laser radiated out to the third scanning unit 3423 through the first scanning unit 3421 and the third laser radiated out to the third scanning unit 3423 through the second scanning unit 3422 may be designed so as to allow the positions of the first and third FOVs, respectively, to be different from each other.

For example, when viewed along an axis of rotation of the third scanning unit 3423, an angle formed by the first laser radiated out to the third scanning unit 3423 through the first scanning unit 3421 and the third laser radiated out to the third scanning unit 3423 through the second scanning unit 3422 may be designed so as to allow the positions in a horizontal direction of the first and third FOVs, respectively, to be different from each other.

In addition, when viewed along an axis of rotation of the third scanning unit 3423, an angle formed by the second laser radiated out to the third scanning unit 3423 through the first scanning unit 3421 and the fourth laser radiated out to the third scanning unit 3423 through the second scanning unit 3422 may be designed so as to allow the positions of the second and fourth FOVs, respectively, to be different from each other.

For example, when viewed along an axis of rotation of the third scanning unit 3423, an angle formed by the second laser radiated out to the third scanning unit 3423 through the first scanning unit 3421 and the fourth laser radiated out to the third scanning unit 3423 through the second scanning unit 3422 may be designed so as to allow the positions in a horizontal direction of the second and fourth FOVs, respectively, to be different from each other.

In addition, the sizes of the first, second, third, and fourth FOVs may be the same as each other but are not limited thereto.

In addition, the laser radiated out to the outside through the first, second, and third scanning units 3421, 3422, and 3423 may be reflected from an object located within an area to be able to scan, thereby being received by the first and second detecting units 3431 and 3432.

For example, the first laser reflected from a first object located in the area to be able to scan may be received by the first detecting unit 3431 through the third scanning unit 3423, the second laser reflected from a second object located in the area to be able to scan may be received by the first detecting unit 3431 through the third scanning unit 3423, the third laser reflected from a third object located in the area to be able to scan may be received by the second detecting unit 3432 through the third scanning unit 3423, and the fourth laser reflected from a fourth object located in the area to be able to scan may be received by the second detecting unit 3432 through the third scanning unit 3423, but the present disclosure is not limited thereto. In addition, although not described in FIG. 25, each of the lasers may be received by the detecting unit through at least some of the scanning units of the first to third scanning units 3421, 3422, and 3423 or may also be received by the detecting unit even without passing through any one of the scanning units.

Figure 26:
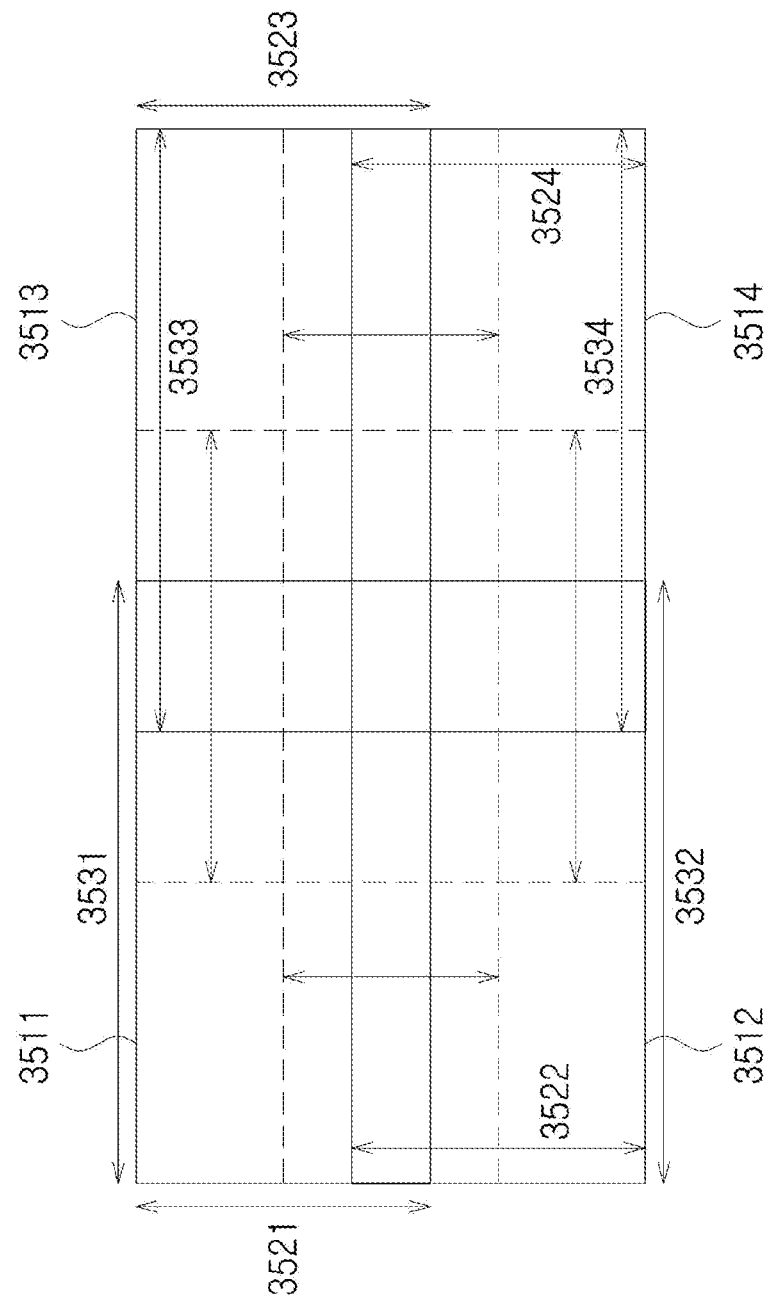
FIG. 26 is a view describing an FOV of a LiDAR device according to an embodiment.

FIG. 26 is a view describing an FOV of a LiDAR device according to an embodiment.

With reference to FIG. 26, an FOV 3500 of a LiDAR device according to an embodiment may include a first FOV 3511, a second FOV 3512, a third FOV 3513, and a fourth FOV 3514.

In this case, the first FOV 3511 may include a first vertical FOV 3521 and a first horizontal FOV 3531, the second FOV 3512 may include a second vertical FOV 3522 and a second horizontal FOV 3532, the third FOV 3513 may include a third vertical FOV 3523 and a third horizontal FOV 3533, and the fourth FOV 3512 may include a fourth vertical FOV 3524 and a fourth horizontal FOV 3534.

In addition, the first and second vertical FOVs 3521 and 3522 may have the same size as each other, and the third and fourth vertical FOVs 3523 and 3524 may have the same size as each other, but the first or second vertical FOV 3521 or 3522 and the third or fourth vertical FOV 3523 or 3524 may have the sizes the same as or different from each other. However, the present disclosure is not limited thereto.

In addition, the first to fourth horizontal FOVs 3531, 3532, 3533, and 3534 may have the same size as each other, but are not limited thereto.

In addition, a center of the first vertical FOV 3521 and a center of the second vertical FOV 3522 may be spaced apart from each other.

For example, as described in FIG. 26, the center of the first vertical FOV 3521 and the center of the second vertical FOV 3522 may be spaced apart from each other by a first angle but are not limited thereto.

In this case, in order to allow the first FOV 3511 and the second FOV 3512 to at least partially overlap with each other, a size of the first angle between the center of the first vertical FOV 3521 and the center of the second vertical FOV 3522 may be less than the size of the first vertical FOV 3521 or the size of the second vertical FOV 3522.

In addition, when the first FOV 3511 and the second FOV 3512 at least partially overlap with each other, a density of points of the LiDAR device may be increased in a region where the first FOV 3511 and the second FOV 3512 at least partially overlap with each other.

In addition, when the first FOV 3511 and the second FOV 3512 at least partially overlap with each other, a speed for obtaining information for the same point may be increased in a region where the first FOV 3511 and the second FOV 3512 at least partially overlap with each other.

In addition, in order to extend the FOV 3500 of the LiDAR device by not allowing the first FOV 3511 and the second FOV 3512 to at least partially overlap with each other, a size of the first angle between the center of the first vertical FOV 3521 and the center of the second vertical FOV 3522 may be no less than the size of the first vertical FOV 3521 or the size of the second vertical FOV 3522.

In addition, a center of the third vertical FOV 3523 and a center of the fourth vertical FOV 3524 may be spaced apart from each other.

For example, as described in FIG. 26, the center of the third vertical FOV 3223 and the center of the fourth vertical FOV 3524 may be spaced apart from each other by a second angle but are not limited thereto.

In this case, in order to allow the third FOV 3513 and the fourth FOV 3514 to at least partially overlap with each other, a size of the first angle between the center of the third vertical FOV 3523 and the center of the fourth vertical FOV 3524 may be less than the size of the third vertical FOV 3523 or the size of the fourth vertical FOV 3524.

In addition, when the third FOV 3513 and the fourth FOV 3514 at least partially overlap with each other, a density of points of the LiDAR device may be increased in a region where the third FOV 3513 and the fourth FOV 3514 at least partially overlap with each other.

In addition, when the third FOV 3513 and the fourth FOV 3514 at least partially overlap with each other, a speed for obtaining information for the same point may be increased in a region where the third FOV 3513 and the fourth FOV 3514 at least partially overlap with each other.

In addition, in order to extend the FOV 3500 of the LiDAR device by not allowing the third FOV 3513 and the fourth FOV 3514 to at least partially overlap with each other, a size of a second angle between the center of the third vertical FOV 3523 and the center of the fourth vertical FOV 3524 may be no less than the size of the third vertical FOV 3523 or the size of the fourth vertical FOV 3524.

In addition, a center of the first horizontal FOV 3531 and a center of the third horizontal FOV 3533 may be spaced apart from each other.

For example, as described in FIG. 26, the center of the first horizontal FOV 3531 and the center of the third horizontal FOV 3533 may be spaced apart from each other by a third angle but are not limited thereto.

In this case, in order to allow the first FOV 3511 and the third FOV 3513 to at least partially overlap with each other, a size of the third angle between the center of the first horizontal FOV 3531 and the center of the third horizontal FOV 3533 may be less than the size of the first horizontal FOV 3531 or the size of the third horizontal FOV 3533.

In addition, when the first FOV 3511 and the third FOV 3513 at least partially overlap with each other, a density of points of the LiDAR device may be increased in a region where the first FOV 3511 and the first FOV 3513 at least partially overlap with each other.

In addition, when the first FOV 3511 and the third FOV 3513 at least partially overlap with each other, a speed for obtaining information for the same point may be increased in a region where the first FOV 3511 and the first FOV 3513 at least partially overlap with each other.

In addition, in order to extend the FOV 3500 of the LiDAR device by not allowing the first FOV 3511 and the third FOV 3513 to at least partially overlap with each other, a size of a third angle between the center of the first horizontal FOV 3531 and the center of the third horizontal FOV 3533 may be no less than the size of the first horizontal FOV 3531 or the size of the third horizontal FOV 3533.

In addition, a center of the second horizontal FOV 3532 and a center of the fourth horizontal FOV 3534 may be spaced apart from each other.

For example, as described in FIG. 26, the center of the second horizontal FOV 3532 and the center of the fourth horizontal FOV 3534 may be spaced apart from each other by a fourth angle but are not limited thereto.

In this case, in order to allow the second FOV 3512 and the fourth FOV 3514 to at least partially overlap with each other, a size of the fourth angle between the center of the second horizontal FOV 3532 and the center of the fourth horizontal FOV 3534 may be less than the size of the second horizontal FOV 3532 or the size of the fourth horizontal FOV 3534.

In addition, when the second FOV 3512 and the fourth FOV 3514 at least partially overlap with each other, a density of points of the LiDAR device may be increased in a region where the second FOV 3512 and the fourth FOV 3514 at least partially overlap with each other.

In addition, when the second FOV 3512 and the fourth FOV 3514 at least partially overlap with each other, a speed for obtaining information for the same point may be increased in a region where the second FOV 3512 and the fourth FOV 3514 at least partially overlap with each other.

In addition, in order to extend the FOV 3500 of the LiDAR device by not allowing the first FOV 3511 and the third FOV 3513 to at least partially overlap with each other, a size of a fourth angle between the center of the second horizontal FOV 3532 and the center of the fourth horizontal FOV 3534 may be no less than the size of the second horizontal FOV 3532 or the size of the fourth horizontal FOV 3534.

FIGS. 27A to 27F and 28A to 28F are views describing various scan patterns of a LiDAR device according to an embodiment.

Figure 27A:
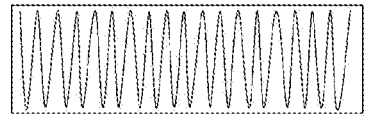
FIGS. 27A to 27F and 28A to 28F are views describing various scan patterns of a LiDAR device according to an embodiment.
Figure 28A:
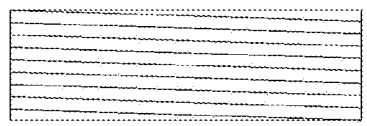

With reference to FIGS. 27A and 28A, the LiDAR device according to the embodiment may form at least one FOV and may form various scan patterns in addition to the scan patterns described in FIGS. 27A and 28A.

In addition, in this case, the above-described contents may be applied to form a scan pattern in which the respective FOVs do not overlap with each other, so the overlapping description will be omitted.

Figure 27B:
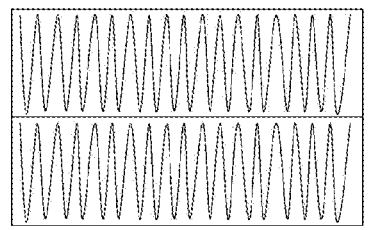
Figure 28B:
Figure 28C:
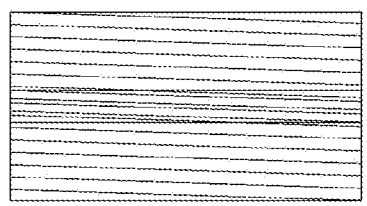

In addition, with reference to FIGS. 27B and 28B, the LiDAR device according to the embodiment may form at least two FOVs, wherein each of vertical positions of the FOVs is different from each other, but each of the FOVs may not overlap with each other. In addition, the LiDAR device may form various scan patterns in addition to the scan patterns described in FIGS. 27B and 28B.

In addition, in this case, the above-described contents may be applied to form a scan pattern in which the respective FOVs do not overlap with each other, so the overlapping description will be omitted.

Figure 27C:
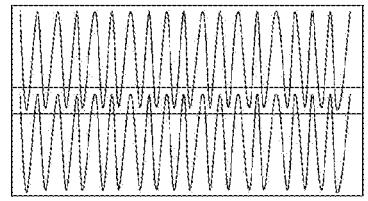

In addition, with reference to FIGS. 27C and 28 C, the LiDAR device according to the embodiment may form at least two FOVs, wherein each of the vertical positions of the FOVs is different from each other, but each of the FOVs may at least partially overlap with each other. In addition, the LiDAR device may form various scan patterns in addition to the scan patterns described in FIGS. 27C and 28C.

In addition, in this case, the above-described contents may be applied to form a scan pattern in which each of FOVs at least partially overlaps with each other, so the overlapping description will be omitted.

Figure 27D:
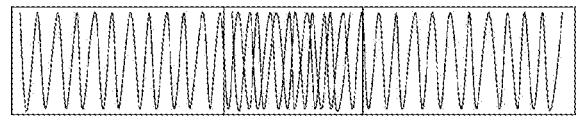
Figure 28D:

In addition, with reference to FIGS. 27D and 28D, the LiDAR device according to the embodiment may form at least two FOVs, wherein each of horizontal positions of the FOVs is different from each other, but each of the FOVs may at least partially overlap with each other. In addition, the LiDAR device may form various scan patterns in addition to the scan patterns described in FIGS. 27D and 28D.

In addition, in this case, the above-described contents may be applied to form a scan pattern in which each of FOVs at least partially overlaps with each other, so the overlapping description will be omitted.

Figure 27E:
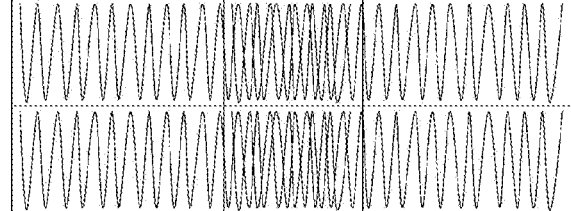
Figure 28E:
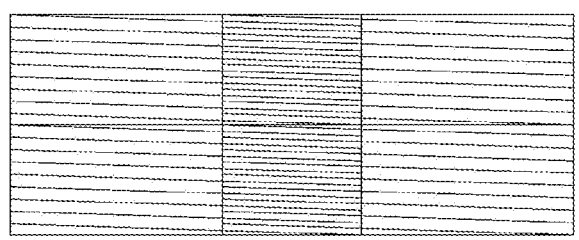

In addition, with reference to FIGS. 27E and 28E, the LiDAR device according to the embodiment may form at least four FOVs, wherein each of the horizontal or vertical positions of the FOVs are different from each other, but at least some of the plurality of FOVs may at least partially overlap with each other. In addition, the LiDAR device may form various scan patterns in addition to the scan patterns described in FIGS. 27E and 28E.

In addition, in this case, the above-described contents may be applied to form a scan pattern in which at least some of FOVs at least partially overlap with each other, so the overlapping description will be omitted.

Figure 27F:
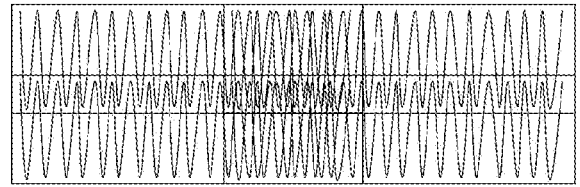
Figure 28F:
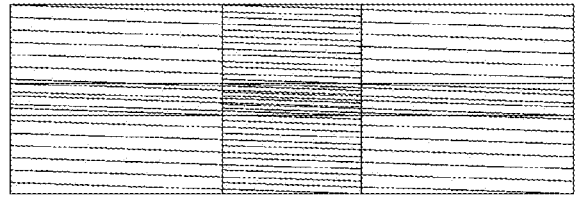

In addition, with reference to FIGS. 27F and 28F, the LiDAR device according to the embodiment may form at least four FOVs, wherein each of the horizontal or vertical positions of the FOVs is different from each other, but each of the FOVs may at least partially overlap with each other. In addition, the LiDAR device may form various scan patterns in addition to the scan patterns described in FIGS. 27F and 28F.

In addition, in this case, the above-described contents may be applied to form a scan pattern in which each of the horizontal or vertical positions of the FOVs is different from each other but each of the FOVs may at least partially overlap with each other, so the overlapping description will be omitted.

In addition, although not described in FIGS. 27A to 27F and 28A to 28F, the above-described arrangement of a scanning unit, arrangement of a laser, a radiation angle of the laser, and the like may be applied to form various scan patterns and positions and sizes of FOVs.

Figure 29:
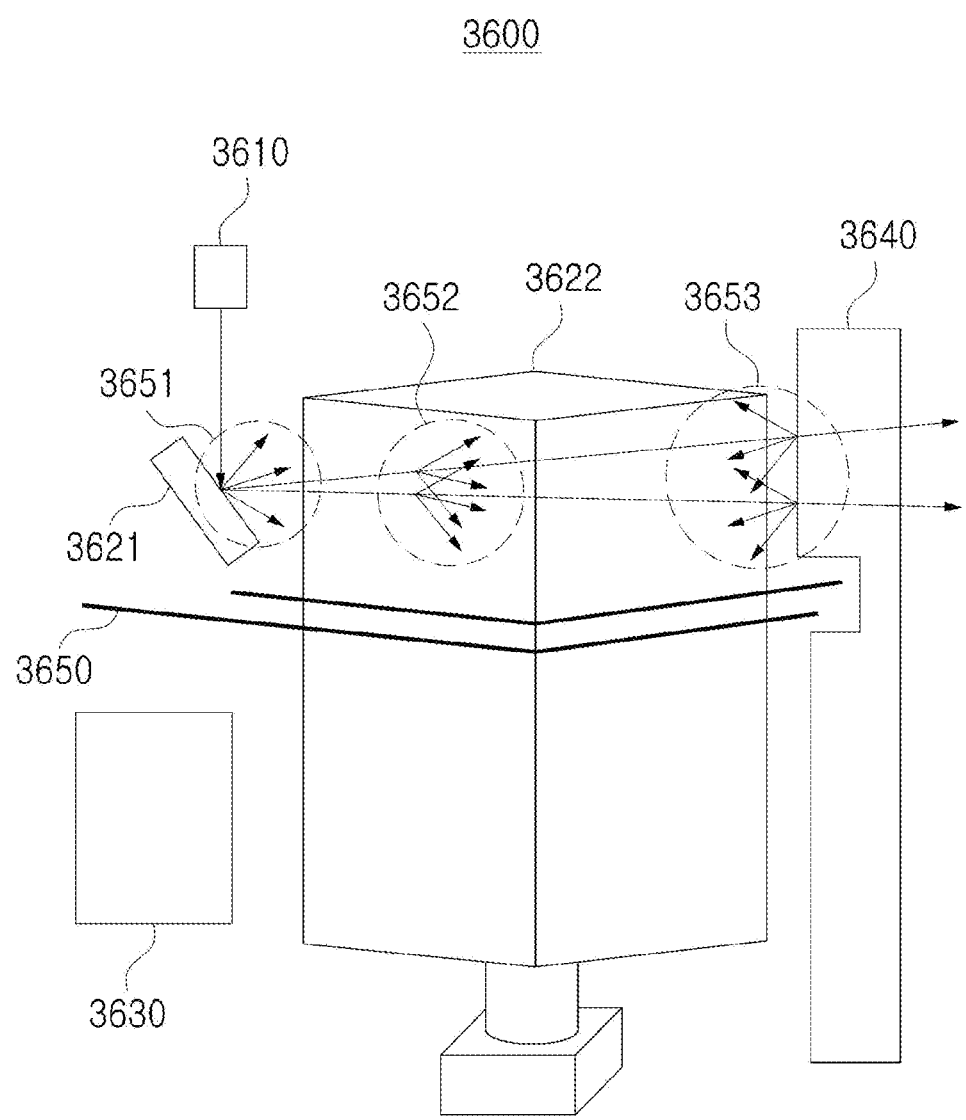
FIG. 29 is a view describing a LiDAR device according to an embodiment.

FIG. 29 is a view describing a LiDAR device according to an embodiment.

With reference to FIG. 29, a LiDAR device 3600 according to an embodiment may include a laser emitting unit 3610, a first scanning unit 3621, a second scanning unit 3622, and a detecting unit 3630 and may further include a window 3640 and a back beam prevention unit 3650 but is not limited thereto.

More specifically, a laser output from the laser emitting unit 3610 may be scattered at an interface between different materials. For example, the laser output from the laser emitting unit 3610 may be scattered at an interface between the air and the first scanning unit 3621, may be scattered at a boundary between the air and the second scanning unit 3622, and may be scattered at an interface between the window 3640 and air. However the present disclosure is not limited thereto.

In addition, the laser scattered inside the LiDAR device may be received by a detecting unit 3630, thereby inducing an error in a distance measured by the LiDAR device. For example, first beams of scattered laser 3651 scattered at an interface between the first scanning unit 3621 and air may be received by the detecting unit 3630 through an internal reflection of the LiDAR device, whereby the detecting unit 3630 saturated due to the first beams of scattered laser 3651 may not receive laser reflected by an object at a short distance.

In addition, second beams of scattered laser 3652 scattered at the interface between the second scanning unit 3622 and air and third beams of scattered laser 3653 scattered at the interface between the window 3640 and air may also be received by the detecting unit 3630, whereby distance measurement of the LiDAR device may be interfered with.

Accordingly, the LiDAR device 3600 may include the back beam prevention unit 3650 for blocking such scattered laser from being received by the detecting unit 3630 through an internal path.

In this case, the back beam prevention unit 3650 may be formed to surround the second scanning unit 3622.

More specifically, the back beam prevention unit 3650 may include a first back beam prevention member surrounding the second scanning unit 3622 and a second back beam prevention member formed to engage with the first back beam prevention member.

In addition, the back beam prevention unit 3650 may be located on a virtual plane perpendicular to a rotation axis of the second scanning unit 3622.

In addition, the back beam prevention unit 3650 may be formed in contact with a reflection surface of the second scanning unit 3622.

In addition, the back beam prevention unit 3650 may be formed to divide a light-radiating path and a light-receiving path inside the LiDAR device.

In addition, the back beam prevention unit 3650 may be formed to block a part of the scattering path, which means the inner path along which the scattered lasers 3651, 3652, and 3653 are transmitted toward the detecting unit.

In addition, the back beam prevention unit 3650 may be formed to divide the LiDAR device into at least two parts.

For example, the back beam prevention unit 3650 may be formed to divide the LiDAR device into a first part including the laser emitting unit 3610 and the first scanning unit 3621 and a second part including the detecting unit 3630, and in this case, the first part and the second part may share the second scanning unit 3622.

In addition, as described above, when the LiDAR device 3600 includes the back beam prevention unit 3650 capable of physically blocking the scattered lasers 3651, 3652, and 3653, the scattered lasers 3651, 3652, and 3653 prevent the detecting unit 3630 from being saturated, so that the near-field measurement of the LiDAR device 3600 may be made more accurately.

Figure 30:
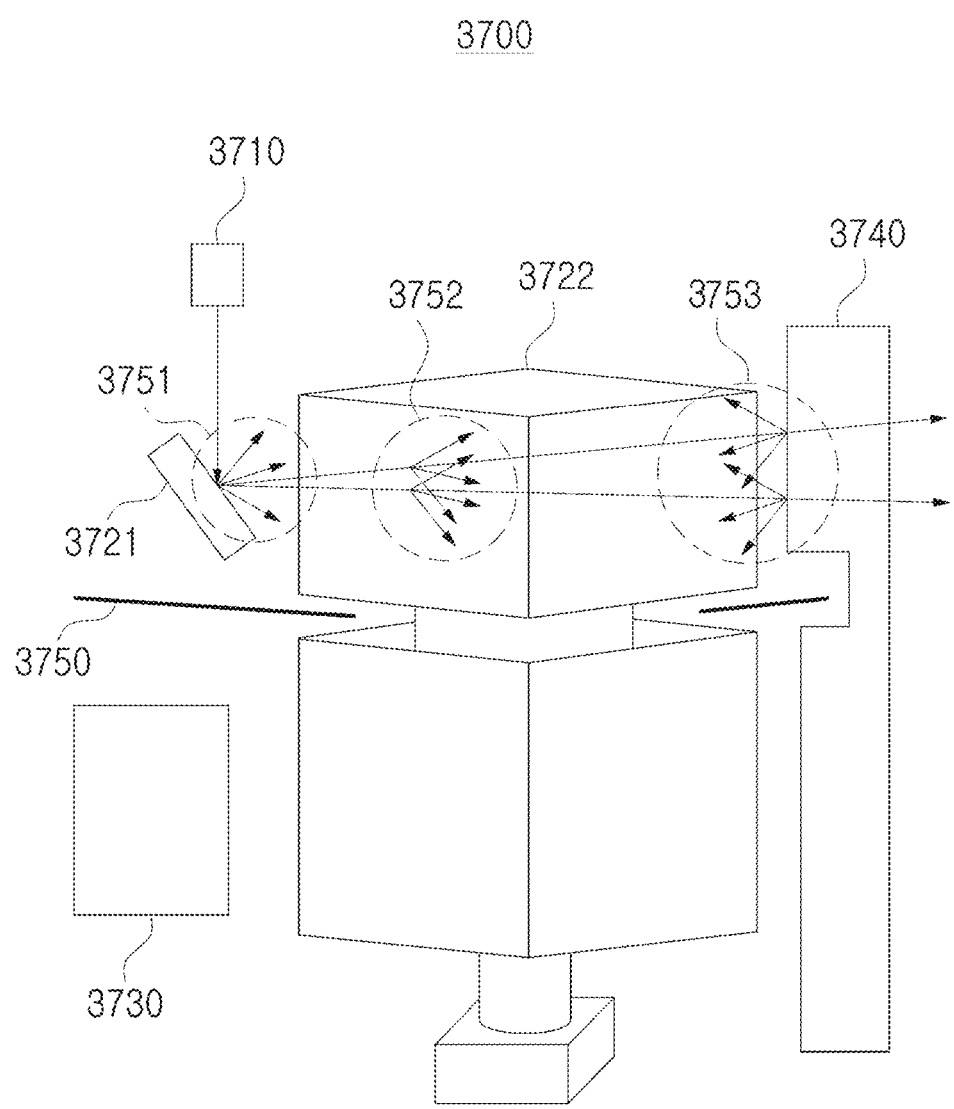
FIG. 30 is a view describing a LiDAR device according to an embodiment.

FIG. 30 is a view describing a LiDAR device according to an embodiment.

With reference to FIG. 30, a LiDAR device 3700 according to an embodiment may include a laser emitting unit 3710, a first scanning unit 3721, a second scanning unit 3722, and a detecting unit 3730 and may further include a window 3740 and a back beam prevention unit 3750 but is not limited thereto.

More specifically, a laser output from the laser emitting unit 3710 may be scattered at an interface between different materials. For example, the laser output from the laser emitting unit 3710 may be scattered at an interface between the air and the first scanning unit 3721, may be scattered at a boundary between the air and the second scanning unit 3722, and may be scattered at an interface between the window 3740 and air but is not limited thereto.

In addition, the laser scattered inside the LiDAR device may be received by a detecting unit 3730, thereby inducing an error in a distance measured by the LiDAR device. For example, first beams of scattered laser 3751 scattered at an interface between the first scanning unit 3721 and air may be received by the detecting unit 3730 through an internal reflection of the LiDAR device, whereby the detecting unit 3730 saturated due to the first beams of scattered laser 3751 may not receive laser reflected by an object at a short distance.

In addition, second beams of scattered laser 3752 scattered at an interface between the second scanning unit 3722 and air and third beams of scattered laser 3753 scattered at an interface between the window 3740 and air may also be received by the detecting unit 3730, whereby distance measurement of the LiDAR device may be interfered with.

Accordingly, the LiDAR device 3700 may include the back beam prevention unit 3750 for blocking such scattered laser from being received by the detecting unit 3730 through an internal path.

In this case, the back beam prevention unit 3750 may be formed to surround the second scanning unit 3722.

More specifically, the back beam preventing unit 3750 may divide at least a portion of the second scanning unit 3722 and extend to the inside of the second scanning unit 3722, thereby being formed.

In addition, the back beam prevention unit 3750 may be located on a virtual plane perpendicular to a rotation axis of the second scanning unit 3722.

In addition, the back beam prevention unit 3750 may be formed to divide a light-radiating path and a light-receiving path inside the LiDAR device.

In addition, the back beam prevention unit 3750 may be formed to block a part of the scattering path, which means the inner path along which the scattered lasers 3751, 3752, and 3753 are transmitted toward the detecting unit.

In addition, the back beam prevention unit 3750 may be formed to divide the LiDAR device into at least two parts.

For example, the back beam prevention unit 3750 may be formed to divide the LiDAR device into a first part including a laser emitting unit 3710 and a first scanning unit 3721 and a second part including a detecting unit 3730, and in this case, the first part and the second part may share the second scanning unit 3722.

In addition, as described above, when the LiDAR device 3700 includes the back beam prevention unit 3750 capable of physically blocking the scattered lasers 3751, 3752, and 3753, the scattered lasers 3751, 3752, and 3753 prevent the detecting unit 3730 from being saturated, so that the near-field measurement of the LiDAR device 3700 may be made more accurately.

FIG. 31 is a view describing a LiDAR device according to an embodiment.

With reference to FIG. 31, a LiDAR device 3800 according to an embodiment may include a first laser emitting unit 3811, a second laser emitting unit 3812, a first scanning unit 3821, a second scanning unit 3822, a third scanning unit 3823, a first detecting unit 3831, a second detecting unit 3832, a first filter 3841, and a second filter 3842.

In this case, the above-described contents may be applied to the first laser emitting unit 3811, second laser emitting unit 3812, first scanning unit 3821, second scanning unit 3822, third scanning unit 3823, first detecting unit 3831, and second detecting unit 3832, so overlapping descriptions will be omitted.

In addition, with reference to FIG. 31, the first laser emitting unit 3811 and the second laser emitting unit 3812 may output lasers of different wavelength bands, respectively.

For example, when a center wavelength of the first laser output from the first laser emitting unit 3811 is a first wavelength, and a center wavelength of the second laser output from the second laser emitting unit 3812 is a second wavelength, the first wavelength and the second wavelength may differ by at least 30 nm, but is not limited thereto.

In addition, when the first wavelength and the second wavelength are different from each other, mutual interference between the first laser and the second laser may be reduced.

In addition, in order to effectively prevent mutual interference between the first laser and the second laser, transmission center wavelengths of the first filter unit 3841 and the second filter unit 3842 may be different from each other.

For example, the first filter 3841 may be designed such that the first wavelength becomes a transmission center wavelength with respect to a laser incident at 0 angle degree, and the second filter 3842 may be designed such that the second wavelength becomes a transmission center wavelength with respect to a laser incident at 0 angle degree. However, the present disclosure is not limited thereto.

In addition, for example, a range of the transmission center wavelength and a passband of the first filter 3841 may be designed with respect to the laser incident at 0 angle degree so as to allow the laser of the first wavelength to be transmitted but not to allow the laser of the second wavelength to be transmitted. However, the present disclosure is not limited thereto.

In addition, for example, the first filter 3841 may be designed so that transmittance of the laser of the first wavelength incident at 0 angle degree is higher than transmittance of the laser of the second wavelength incident at 0 angle degree. In addition, the second filter 3842 may be designed so that transmittance of the laser of the second wavelength incident at 0 angle degree is higher than transmittance of the laser of the first wavelength incident at 0 angle degree. However, the present disclosure is not limited thereto.

In addition, for example, the first filter unit 3841 may be designed so as not to transmit the laser of the second wavelength with respect to the laser incident at 0 degrees to 30 degrees, and the second filter unit 3842 may be designed so as not to transmit the laser of the first wavelength with respect to the laser incident at 0 degrees to 30 degrees. However, the present disclosure is not limited thereto.

In addition, for example, the first filter 3841 may be designed, with respect to the laser incident in an FOV range, to block at least a portion of the laser of the second wavelength, and the second filter 3842 may be designed, with respect to the laser incident in an FOV range, to block at least a portion of the laser of the first wavelength. However, the present disclosure is not limited thereto.

In addition, each of the first and second filters 3841 and 3842 may be positioned between the condensing lens and the detecting unit as described in FIG. 31 but is not limited thereto and may be disposed at various positions for filtering the laser received from the detecting unit.

In addition, the first and second filters 3841 and 3842 may be designed as described above but may be designed in various ways to prevent mutual interference between the first laser and the second laser.

In addition, the first and second filters 3841 and 3842 may be designed to be inclined at a predetermined angle according to temperatures of the first laser emitting unit 3811 and the second laser emitting unit 3812, respectively, but are not limited thereto.

In addition, the first and second filters 3841 and 3842 may be designed to be inclined at a predetermined angle according to changes in the wavelengths of the first laser and the second laser, respectively, but are not limited thereto.

The method according to the embodiments may be implemented in the form of program instructions that may be executed through various computer means, thereby being recorded in a computer-readable medium. The computer-readable medium may include program instructions, data files, data structures, and the like alone or in combination. The program instructions recorded on the medium may be specially designed and configured for the embodiment or may be known and available to those skilled in the art of computer software. Examples of the computer-readable recording medium includes magnetic media such as hard disks, floppy disks, and magnetic tapes, optical media such as CD-ROMs and DVDs, and magneto-optical media such as floptical disks, and hardware devices specially configured to store and execute program instructions such as ROM, RAM, flash memory, and the like. Examples of program instructions include not only machine language codes such as those generated by a compiler, but also high-level language codes that may be executed by a computer using an interpreter and the like. The hardware devices described above may be configured to operate as one or more software modules to perform the operations of the embodiments, and vice versa.

As described above, although the embodiments have been described with reference to the limited embodiments and drawings, various modifications and variations are possible from the above description by those skilled in the art. For example, even when the described techniques are performed in an order different from the described method, and/or even when the described components of the system, structure, apparatus, circuit, and the like are coupled or combined in a different form than the described method or are replaced or substituted by other components or equivalents, an appropriate result may be achieved.

Therefore, other implementations, other embodiments, and equivalents to the claims are also within the scope of the following claims.

What is claimed is:

1. A LiDAR (Light Detection And Ranging) device for measuring a distance using a laser, comprising:
    a first laser emitting unit configured to emit a first laser;
    a second laser emitting unit configured to emit a second laser;
    a scanning unit configured to form a first FOV (Field of View) using the first laser and form a second FOV using the second laser, the first FOV comprising a first horizontal FOV and a first vertical FOV, the second FOV comprising a second horizontal FOV and a second vertical FOV; and
    a detecting unit configured to measure a distance between an object using the first laser and the second laser,
    wherein the scanning unit includes a first scanning unit configured to form the first vertical FOV using the first laser and form the second vertical FOV using the second laser and a second scanning unit configured to form the first horizontal FOV using the first laser and form the second horizontal FOV using the second laser,
    wherein the first scanning unit and the second scanning unit are arranged such that a size of the first horizontal FOV is greater than a size of the first vertical FOV, and a size of the second horizontal FOV is greater than a size of the second vertical FOV,
    wherein an angle between the first laser and the second laser irradiated to the first scanning unit is designed such that a distance between a center of the first vertical FOV and a center of the second vertical FOV is greater than a distance between a center of the first horizontal FOV and a center of the second horizontal FOV,
    wherein the first scanning unit includes a nodding mirror configured to rotate in a preset angle range,
    wherein the second scanning unit includes a rotating polygon mirror configured to rotate with respect to a rotation axis,
    wherein the nodding mirror is configured to be repeatedly driven in an angle range "a", and
    wherein, in response to the angle between the first laser and the second laser irradiated to the first scanning unit being "b", the "b" is designed to be at least "2a".

2. The LiDAR device of claim 1,
    wherein the scanning unit is arranged such that a size of the first FOV is same as a size of the second FOV.

3. The LiDAR device of claim 1,
    wherein the scanning unit is arranged such that an angle formed by the first laser irradiated to the first FOV and the second laser irradiated to the second FOV at a same time and the LiDAR device is constant over time.

4. The LiDAR device of claim 1, wherein the "b" is designed to be at least "2a" or more so that there is no overlapping point between the first FOV and the second FOV.

5. A LiDAR (Light Detection And Ranging) device for measuring a distance using a laser, comprising:
    a laser emitting unit configured to emit at least two lasers;
    a scanning unit configured to form a first FOV (Field of View) and a second FOV using the at least two lasers;
    a detecting unit configured to measure a distance between an object using the at least two lasers;
    wherein the scanning unit is arranged such that a size of the first FOV and the second FOV is the same and a scan pattern in the first FOV and a scan pattern in the second FOV is the same,
    wherein an angle between the at least two lasers irradiated to the scanning unit is designed such that at a same distance from the LiDAR device, a distance between a center of the first FOV and a center of the second FOV in a first direction is greater than a distance between the center of the first FOV and the center of the second FOV in a second direction perpendicular to the first direction,
    wherein the scanning unit includes a first scanning unit configured to form a FOV in the first direction, and a second scanning unit configured to form a FOV in the second direction,
    wherein the at least two lasers are configured to be irradiated to the first scanning unit,
    wherein the first scanning unit includes a nodding mirror configured to rotate in a preset angle range,
    wherein the second scanning unit includes a rotating polygon mirror configured to rotate with respect to a rotation axis, wherein the at least two lasers include a first laser and a second laser, wherein the nodding mirror is configured to be repeatedly driven in an angle range "a", and wherein, in response to the angle between the first laser and the second laser irradiated to the first scanning unit being "b", the "b" is designed to be at least "2a".

6. The LiDAR device of claim 5, wherein a size of the first FOV in the first direction is smaller than a size of the first FOV in the second direction, and wherein a size of the second FOV in the first direction is smaller than a size of the second FOV in the second direction.

7. The LiDAR device of claim 5, wherein the detecting unit includes at least two channels configured to detect the first laser and the second laser, and wherein the first laser and the second laser emitted at a same time are configured to be detected in difference channels of the detecting unit.

8. The LiDAR device of claim 5, wherein the LiDAR device is configured to generate points using the first laser and the second laser, wherein a density of the points in vertical edge region of the first FOV is greater than a density of the points in central region of the first FOV, wherein a density of the points in vertical edge region of the second FOV is greater than a density of the points in central region of the second FOV, and wherein the angle between the at least two lasers irradiated to the scanning unit is designed such that the vertical edge region of the first FOV and the vertical edge region of the second FOV are adjacent to each other.

9. The LiDAR device of claim 5, wherein the laser emitting unit includes a first laser emitting unit configured to emit the first laser and a second laser emitting unit configured to emit the second laser.

10. The LiDAR device of claim 5, wherein the at least two lasers further include a third laser and a fourth laser, wherein the scanning unit is configured to form the first FOV, the second FOV, a third FOV and a fourth FOV using the first to fourth lasers, wherein the scanning unit further includes a third scanning unit, wherein the first scanning unit and the third scanning unit are arranged to form the first FOV and the second FOV, wherein an angle between the first laser and the second laser irradiated to the first scanning unit is designed such that at a same distance from the LiDAR device, the distance between the center of the first FOV and the center of the second FOV in the first direction is greater than the distance between the center of the first FOV and the center of the second FOV in the second direction perpendicular to the first direction, wherein the second scanning unit and the third scanning unit are arranged to form the third FOV and the fourth FOV, wherein an angle between the third laser and the fourth laser irradiated to the second scanning unit is designed such that at a same distance from the LiDAR device, a distance between a center of the third FOV and a center of the fourth FOV in the first direction is greater than a distance between the center of the third FOV and the center of the fourth FOV in the second direction perpendicular to the first direction, wherein when viewed along an axis of rotation of the third scanning unit, an angle formed by the first laser irradiated to the third scanning unit through the first scanning unit and the third laser irradiated to the third scanning unit through the second scanning unit is designed such that a location of the first FOV in the second direction is different from a location of the third FOV in the second direction, and wherein when viewed along the axis of rotation of the third scanning unit, an angle formed by the second laser irradiated to the third scanning unit through the first scanning unit and the fourth laser irradiated to the third scanning unit through the second scanning unit is designed such that a location of the second FOV in the second direction is different from a location of the fourth FOV in the second direction.

* * * * *